US008930520B2

(12) United States Patent  
Bechtel et al.

(10) Patent No.: US 8,930,520 B2
(45) Date of Patent: Jan. 6, 2015

(54) SYSTEM FOR ANALYZING USER ACTIVITY IN A COLLABORATIVE ENVIRONMENT

(71) Applicant: Accenture Global Services Limited, Dublin (IE)

(72) Inventors: Michael E. Bechtel, Naperville, IL (US); Brian H. Richards, Chicago, IL (US)

(73) Assignee: Accenture Global Services Limited, Dublin (IE)

( * ) Notice: Subject to any disclaimer, the term of this patent is extended or adjusted under 35 U.S.C. 154(b) by 0 days.

(21) Appl. No.: 14/136,821

(22) Filed: Dec. 20, 2013

(65) Prior Publication Data

US 2014/0122615 A1    May 1, 2014

Related U.S. Application Data

(60) Division of application No. 12/474,457, filed on May 29, 2009, now Pat. No. 8,645,516, which is a continuation-in-part of application No. 12/036,012, filed on Feb. 22, 2008.

(51) Int. Cl.
| | |
|---|---|
| *G06F 15/173* | (2006.01) |
| *H04L 29/06* | (2006.01) |
| *H04L 12/58* | (2006.01) |
| *G06F 17/30* | (2006.01) |
| *G06Q 10/10* | (2012.01) |

(52) U.S. Cl.
CPC .............. *H04L 65/403* (2013.01); *H04L 51/04* (2013.01); *G06F 17/30994* (2013.01); *G06Q 10/10* (2013.01)
USPC .............................. 709/223; 709/203; 709/224

(58) Field of Classification Search
CPC .............................. H04L 65/403; H04L 51/04
USPC .......................... 709/223, 224, 203, 217, 219
See application file for complete search history.

(56) References Cited

U.S. PATENT DOCUMENTS

| | | |
|---|---|---|
| 5,251,294 A | 10/1993 | Abelow |
| 5,628,009 A | 5/1997 | Kikuta et al. |

(Continued)

FOREIGN PATENT DOCUMENTS

| | | |
|---|---|---|
| EP | 1286276 | 2/2003 |
| WO | WO 2004/097627 | 11/2004 |

OTHER PUBLICATIONS

Marwan Abi-Antoun et al., "Differencing and Merging of Architectural Views," pp. 35-74, Dec. 22, 2007, Springer Science + Business Media, LLC.

(Continued)

*Primary Examiner* — Lashonda Jacobs
(74) *Attorney, Agent, or Firm* — Brinks Gilson & Lione

(57) ABSTRACT

A system is described for analyzing user activity in a collaborative environment. The system may include a memory, an interface, and a processor. The memory may store a plurality of data items. Each data item may be related to at least one other data item. The processor may receive a request to alert the user when an action is performed on a selected data item. The processor may also receive a relation threshold identifying at least one other data item related to the selected data item. The processor may detect the action being performed on the data item identified by the relation threshold. The processor may transform data describing the action into an alert. The alert may include the data describing the action, the data item, and a description of the relationship between the data items. The processor may provide the alert to the user via the device.

24 Claims, 31 Drawing Sheets

(56) References Cited

U.S. PATENT DOCUMENTS

| | | | |
|---|---|---|---|
| 5,790,426 A | 8/1998 | Robinson | |
| 5,812,773 A | 9/1998 | Norin | |
| 5,835,085 A | 11/1998 | Eick et al. | |
| 5,878,214 A | 3/1999 | Gilliam et al. | |
| 5,884,282 A | 3/1999 | Robinson | |
| 6,064,980 A | 5/2000 | Jacobi et al. | |
| 6,484,190 B1 | 11/2002 | Cordes et al. | |
| 7,076,736 B2 | 7/2006 | Hugh | |
| 7,181,438 B1 | 2/2007 | Szabo | |
| 7,219,307 B2 | 5/2007 | Senay | |
| 7,305,419 B1 | 12/2007 | Cosby et al. | |
| 7,356,772 B2 | 4/2008 | Brownholtz et al. | |
| 7,458,019 B2 | 11/2008 | Gumz et al. | |
| 7,480,696 B2 | 1/2009 | Kirkland et al. | |
| 7,519,562 B1 | 4/2009 | Vander Mey et al. | |
| 7,548,873 B2 | 6/2009 | Veeningen et al. | |
| 7,565,534 B2 | 7/2009 | Starbuck et al. | |
| 7,657,404 B2 | 2/2010 | Thurner et al. | |
| 7,788,237 B2 | 8/2010 | Voronov et al. | |
| 7,793,219 B1 | 9/2010 | Stratton et al. | |
| 7,822,848 B2 | 10/2010 | Muller et al. | |
| 7,853,880 B2 | 12/2010 | Porter | |
| 7,899,694 B1 | 3/2011 | Marshall et al. | |
| 7,953,720 B1 | 5/2011 | Rohde et al. | |
| 8,065,193 B2 | 11/2011 | Bullock | |
| 8,161,108 B2* | 4/2012 | Choi et al. | 709/204 |
| 8,195,617 B2 | 6/2012 | Callanan et al. | |
| 8,239,228 B2* | 8/2012 | Bechtel et al. | 705/7.11 |
| 8,631,021 B2* | 1/2014 | Palmer et al. | 707/754 |
| 8,645,516 B2* | 2/2014 | Bechtel et al. | 709/223 |
| 2001/0033296 A1 | 10/2001 | Fullerton et al. | |
| 2002/0023271 A1 | 2/2002 | Augenbraun et al. | |
| 2002/0075320 A1 | 6/2002 | Kurapati | |
| 2003/0033179 A1 | 2/2003 | Katz et al. | |
| 2003/0036947 A1 | 2/2003 | Smith, III et al. | |
| 2003/0101197 A1 | 5/2003 | Sorensen et al. | |
| 2003/0167443 A1 | 9/2003 | Meunier et al. | |
| 2003/0172025 A1 | 9/2003 | Gallina | |
| 2003/0216962 A1 | 11/2003 | Heller et al. | |
| 2005/0060222 A1 | 3/2005 | White | |
| 2005/0114781 A1 | 5/2005 | Brownholtz et al. | |
| 2005/0149622 A1 | 7/2005 | Kirkland et al. | |
| 2005/0159932 A1 | 7/2005 | Thurner | |
| 2005/0165859 A1 | 7/2005 | Geyer et al. | |
| 2005/0177388 A1 | 8/2005 | Moskowitz et al. | |
| 2005/0228983 A1 | 10/2005 | Starbuck et al. | |
| 2005/0267875 A1 | 12/2005 | Bentley, III | |
| 2006/0026502 A1 | 2/2006 | Dutta | |
| 2006/0026509 A1 | 2/2006 | Porter | |
| 2006/0053382 A1 | 3/2006 | Gardner et al. | |
| 2006/0095443 A1 | 5/2006 | Kumar et al. | |
| 2006/0101324 A1 | 5/2006 | Goldberg et al. | |
| 2006/0121434 A1 | 6/2006 | Azar | |
| 2006/0136510 A1 | 6/2006 | Voronov et al. | |
| 2007/0011204 A1 | 1/2007 | Sorensen et al. | |
| 2007/0055674 A1 | 3/2007 | Sunada | |
| 2007/0078670 A1 | 4/2007 | Dave et al. | |
| 2007/0124698 A1 | 5/2007 | Majumder | |
| 2007/0143281 A1 | 6/2007 | Smirin et al. | |
| 2007/0226296 A1 | 9/2007 | Lowrance et al. | |
| 2007/0245380 A1 | 10/2007 | Dommer et al. | |
| 2007/0256033 A1 | 11/2007 | Hiler | |
| 2007/0288416 A1 | 12/2007 | Ferguson et al. | |
| 2008/0120339 A1 | 5/2008 | Guan et al. | |
| 2008/0133671 A1 | 6/2008 | Kalaboukis | |
| 2008/0172407 A1 | 7/2008 | Sacks | |
| 2008/0189724 A1 | 8/2008 | Tien et al. | |
| 2008/0208898 A1 | 8/2008 | Salo et al. | |
| 2008/0222279 A1 | 9/2008 | Cioffi et al. | |
| 2008/0228827 A1 | 9/2008 | Perlman | |
| 2008/0243729 A1 | 10/2008 | Icenoggle | |
| 2008/0243807 A1 | 10/2008 | Gaucas et al. | |
| 2008/0270949 A1 | 10/2008 | Liang | |
| 2008/0281610 A1 | 11/2008 | Yoshida et al. | |
| 2008/0301091 A1 | 12/2008 | Hibbets et al. | |
| 2009/0037414 A1 | 2/2009 | Olivier et al. | |
| 2009/0132651 A1 | 5/2009 | Roger et al. | |
| 2009/0216680 A1* | 8/2009 | McCown et al. | 705/75 |
| 2009/0271708 A1 | 10/2009 | Peters et al. | |
| 2012/0023113 A1* | 1/2012 | Ferren et al. | 707/751 |
| 2012/0203590 A1* | 8/2012 | Deb et al. | 705/7.28 |
| 2014/0156379 A1* | 6/2014 | Pani et al. | 705/14.41 |

OTHER PUBLICATIONS

Frank G. Halasz et al., "Notecards in a Nutshell," pp. 45-52, 1987, Intelligent Systems Laboratory, Xerox Palo Alto Research Center.

Cliff Lampe et al., "Follow the Reader: Filtering Comments on Slashdot," pp. 1253-1262, Apr. 28-May 3, 2007, CHI 2007 proceedings.

Office Action issued in counterpart U.S. Appl. No. 12/489,824, dated Mar. 24, 2014, pp. 1-48.

Vbulletin (Distance), Advanced Report Post Management System, (Mar. 8, 2007) http://web.archive.org/web/20071019022335/http://www.vbulletin.org/forum/showthread.php?t=137031, pp. 1-10.

phpBB Academy at Star Trek Guide—EXreaction, Soft Delete (Sep. 2007) http://startrekguide.com/community/viewtopic.php?f=84&t=3409. , pp. 1-9.

RCGroups, Warning Types (Oct. 13, 2007) http://web.archive.org/web/20071013080645/http//www.rcgroups.com/forums/wlist.php , pp. 1-4.

European Search Report for European Patent Application No. EP 09002450 dated Jul. 20, 2009.

First Examiner's Report from the Canadian Patent Office for Canadian Patent Application No. 2,652,734 dated Mar. 7, 2012.

United States Patent and Trademark non-final Office Action dated Feb. 17, 2012 for co-pending U.S. Appl. No. 12/707,464.

United States Patent and Trademark non-final Office Action dated Oct. 6, 2011 for co-pending U.S. Appl. No. 12/474,468.

United States Patent and Trademark non-final Office Action dated Apr. 5, 2012 for co-pending U.S. Appl. No. 12/489,824.

United States Patent and Trademark non-final Office Action dated Mar. 29, 2012 for co-pending U.S. Appl. No. 12/491,321.

United States Patent and Trademark non-final Office Action dated Apr. 22, 2013 for co-pending U.S. Appl. No. 12/489,824.

United States Patent and Trademark Final Office Action dated Aug. 30, 2013 for co-pending U.S. Appl. No. 12/489,824.

Notification of Third Office Action, the State Intellectual Property Office of the People's Republic of China, Application No. 200910007397.6, Dec. 8, 2013, pp. 1-9.

English Translation of the Abstract and portions of "Research on and Implementation of QA Technique based on Forum Data Source," Chinese Master Thesis, Luo Bin, Beijing Jiaotong University, Dec. 31, 2007, pp. 1-4, http:www.doc88.com/p-643858895701.html.

"Research on and Implementation of QA Technique based on Forum Data Source," Chinese Master Thesis, Luo Bin, Beijing Jiaotong University, Dec. 31, 2007, pp. 1-7, http:www.doc88.com/p-643858895701.html.

United States Patent and Trademark Final Office Action dated Oct. 21, 2013 for co-pending U.S. Appl. No. 12/035,988.

Schematic View, 3D Max-Tutorials.com, https://web.archive.org/web/20070731032921/http://www.3dmax-tutorials.com/Schematic_View.html, dated Jul. 31, 2007, 10 pages.

* cited by examiner

SYSTEM FOR ANALYZING USER ACTIVITY IN A COLLABORATIVE ENVIRONMENT

CROSS REFERENCE TO RELATED APPLICATIONS

This application is a divisional of U.S. patent application Ser. No. 12/474,457, filed on May 29, 2009, now U.S. Pat. No. 8,645,516, which is a continuation-in-part of U.S. patent application Ser. No. 12/036,012, filed on Feb. 22, 2008. Each of the above stated applications is incorporated by reference herein.

TECHNICAL FIELD

The present description relates generally to a system and method, generally referred to as a system, for analyzing user activity in a collaborative environment, and more particularly, but not exclusively, to analyzing user activity in a collaborative innovation environment in order to monitor and increase the effectiveness of the collaborative innovation.

BACKGROUND

Collaborative software may allow users to cooperatively build off an initial idea or topic. The topic may continually evolve as additional users provide insight to the topic; however, the collaborative software may only be capable of displaying linear revisions of the topic. For example, a collaborative software system may provide users with an interface for creating and expanding articles on topics. The interface may provide users with the most recent version of the article, and may allow the users to post modifications to the most recent version of the article. However, in some instances there may be topics where there is not one clear answer to a given question. There may be competing, and equally valid, opinions to what the content of such an article should contain.

SUMMARY

A system for analyzing user activity in a collaborative environment may include a memory, an interface, and a processor. The memory may be connected to the processor and the interface and may store a plurality of data items. Each data item may be related to at least one other data item in the plurality of data items. The interface may communicate with a device of a user. The processor may receive a request to alert a user when an action is performed on a selected data item of the plurality of data items. The processor may also receive a relation threshold. The relation threshold may identify at least one other data item of the plurality of data items which is related to the selected data item. The processor may detect the action being performed on the data item identified by the relation threshold. The processor may transform a data describing the detected action into an alert. The alert may include the data describing the detected action, the at least one other data item, and a description of the relationship between the at least one other data item and the selected data item. The processor may provide the alert to the user via the device.

Other systems, methods, features and advantages will be, or will become, apparent to one with skill in the art upon examination of the following figures and detailed description. It is intended that all such additional systems, methods, features and advantages be included within this description, be within the scope of the embodiments, and be protected by the following claims and be defined by the following claims. Further aspects and advantages are discussed below in conjunction with the description.

BRIEF DESCRIPTION OF THE DRAWINGS

The system and/or method may be better understood with reference to the following drawings and description. Non-limiting and non-exhaustive descriptions are described with reference to the following drawings. The components in the figures are not necessarily to scale, emphasis instead being placed upon illustrating principles. In the figures, like referenced numerals may refer to like parts throughout the different figures unless otherwise specified.

FIG. 7A is a screenshot of an alternative initial item results screen in the system of FIG. 1, or other systems for analyzing user activity in a collaborative environment.

FIG. 9B is a screenshot of an alternative administrator interface in the system of FIG. 1, or other systems for analyzing user activity in a collaborative environment.

DETAILED DESCRIPTION

Figure 1:
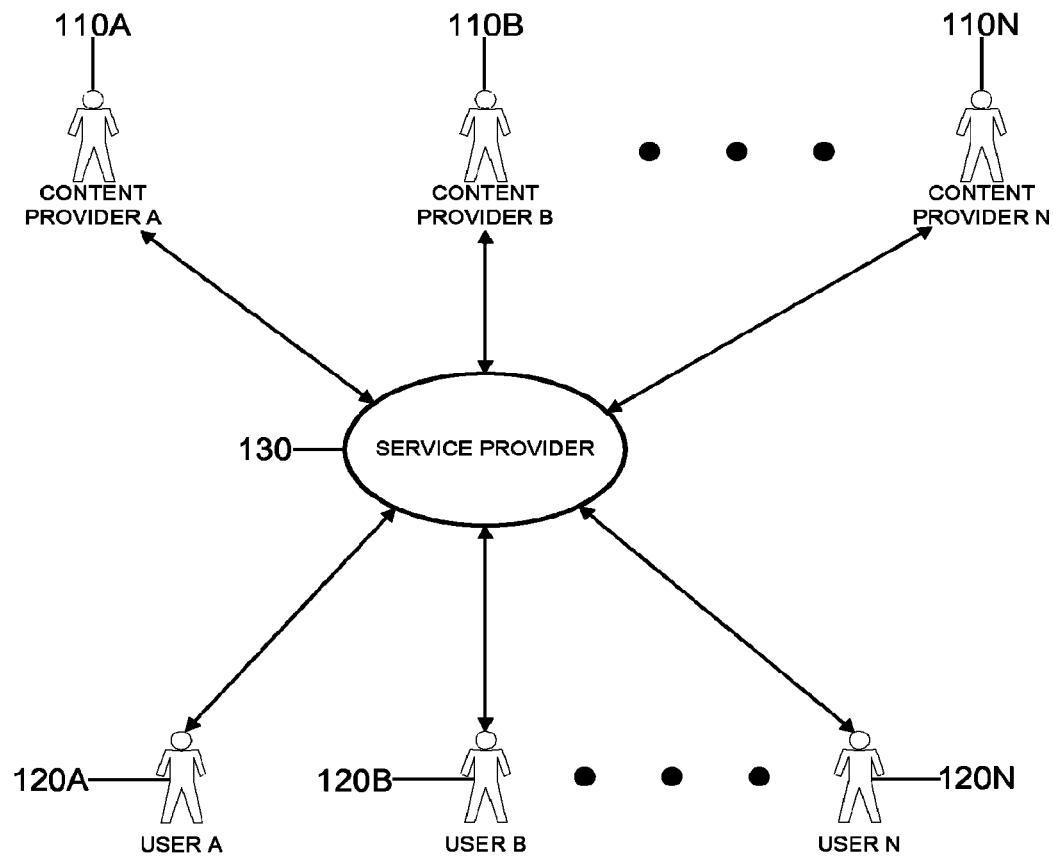
FIG. 1 is a block diagram of an overview of a system for analyzing user activity in a collaborative environment.

A system and method, generally referred to as a system, may relate to analyzing user activity in a collaborative environment, and more particularly, but not exclusively, to analyzing user activity in a collaborative innovation system in order to monitor and increase the effectiveness of the collaborative innovation. The principles described herein may be embodied in many different forms.

The system may allow an organization to monitor user activity in a collaborative innovation system to ensure the collaborative innovation system is being used effectively. The system may allow an administrator to monitor and access the collaborative innovation system without the activities of the administrator affecting statistics related to user activity in the collaborative innovation system. By excluding the administrator's activity from the statistics, the system ensures the statistics accurately reflect the activity of the users and not the activity of the administrator. For example, an administrator may access the collaborative innovation system to view user content, monitor user activity in realtime, and/or provide guidance to users in the collaborative innovation process. Since the administrator is accessing the collaborative innovation system for the purpose of monitoring user activity, the activity of the administrator should not be reflected in statistics related to user activity, such as the number of users accessing the system, the number of user logins, the number of page views, or generally any data used to analyze user activity.

The system may monitor user activity and alert a user of actions which are performed on content in a collaborative innovation system, such as modifications to the content. By alerting the user to actions performed on the content, the system may keep the user engaged in the collaborative innovation system. For example, the collaborative innovation system may include several ideas which are related to one another. The system may alert the user to actions performed on an idea provided by the user, and/or to action performed on ideas related to the idea provided by the user. The user may select an idea to be alerted to and may identify a relation threshold. The relation threshold may identify ideas related to the selected idea, which the user also wishes to be alerted to. For example, the user may wish to be alerted when an action is performed on any idea which is a child idea of the selected idea. When the system detects an action being performed on a related idea, the system may provide the user with an alert which includes the related idea, a description of the action being performed, and the relationship between the idea of the user and the related idea.

The system may analyze an organization's user activity in a collaborative innovation system to determine whether the organization is effectively utilizing the collaborative innovation system. The system may provide an organization with an assessment indicating whether the organization is effectively utilizing the collaborative innovation system. If the assessment indicates that the organization is not effectively utilizing the collaborative innovation system, the system may identify the areas of collaborative innovation where the organization is not effective. The system may also provide suggestions on how to improve the organization's effectiveness in the deficient areas of collaborative innovation.

The system may provide an interface to one or more users within an organization. The interface may allow the users to create one or more ideas associated with an initial idea. The initial idea may be a topic or issue of relevance to the organization. The interface may also allow the users to rate the one or more ideas. The system may allow any number of ideas to be associated with the initial idea and/or with the other ideas, thereby allowing for multiple concurrent revisions of each initial idea. The system may provide an interface displaying a graphical representation of the ideas and the associations between the ideas to the users. The graphical representation may allow the users to easily determine where to add an additional idea to an existing idea. The system may order the ideas based on the ratings received for the ideas, and may display the ordered ideas to the creator of the initial idea. The creator of the initial idea may use the ordered list of ideas to efficiently determine the most valuable ideas associated with the initial idea.

FIG. 1 provides an overview of a system 100 for analyzing user activity in a collaborative environment. Not all of the depicted components may be required, however, and some implementations may include additional components. Variations in the arrangement and type of the components may be made without departing from the spirit or scope of the claims as set forth herein. Additional, different or fewer components may be provided.

The system 100 may include one or more content providers 110A-N, such as decision making personnel of an organization, a service provider 130, such as a collaborative innovation interface provider, and one or more users 120A-N, such as employees of the organization, administrators of the system 100, or other parties authorized to use the service. The service provider 130 may provide an interface for collaborative innovation. Collaborative innovation may be the process of building and refining ideas, such as content, in a collaborative environment. The users 120A-N may provide ideas, refinements of ideas, rating of ideas, or generally any data that may assist the collaborative innovation process. The content providers 110A-N may provide initial items, or seed ideas, to begin the collaborative process and may review the results of the collaborative innovation process. Alternatively or in addition one or more of the users 120A-N may be authorized to provide initial items. One or more of the users 120A-N and/or the content providers 110A-N may be system administrators, also referred to as administrators.

In operation the service provider 130 may provide the content providers 110A-N with an interface for identifying an initial idea. The initial idea may be question whose answer is of value to one of the content providers 110A-N, such as the content provider A 110A. For example, an initial question may be "what activities would you like the social committee to sponsor?" Alternatively or in addition the initial idea may be a statement of opinion or fact. The service provider 130 may provide the content provider A 110A with an interface for identifying which users 120A-N the initial idea should be displayed to and/or which users 120A-N should be allowed to rate the idea or enhance the idea. An enhancement of an initial idea may be referred to as a response, revision, or primary response. An enhancement of a primary response may be referred to as a secondary response, and so on. The system 100 may allow the content provider A 110A to select one or more users 120A-N, or a group of users 120A-N.

Once an initial question has been created the service provider 130 may send a notification to the one or more users 120A-N that a new question is available, such as by emailing the users 120A-N. The service provider 130 may provide an interface displaying the initial ideas in the system 100 to the users 120A-N. The interface may allow the users 120A-N to filter the initial ideas based on one or more characteristics of the ideas. The users 120A-N may use the interface to select an initial idea. The interface for viewing and filtering initial ideas may be discussed in more detail in FIG. 4. If a user A 120A selects an initial idea, the service provider 130 may provide the user A 120A with an interface displaying detailed information regarding the initial idea. The interface displaying detailed initial idea information may be discussed in more detail in FIG. 5.

The service provider 130 may provide the users 120A-N with an interface for creating enhancements to the ideas and an interface for commenting on and rating ideas. The interface may display all of the ideas innovated from the initial item to the users 120A-N and may allow the users 120A-N to select and rate an idea. In the system 100, the display of all the ideas innovated from the initial item may be referred to as the collaborative innovation view. The initial item and the ideas innovated from the initial item may be represented in the collaborative innovation view as a graphical hierarchical structure. The graphical hierarchical structure may allow the users 120A-N to easily navigate, and rate, the ideas. The interface may further allow the users 120A-N to search and sort the ideas, based on one or more idea characteristics, such as the title of the idea. In the system 100 an idea which enhances an original idea or another idea may be referred to as a grape idea, or simply a grape. The interface for enhancing and rating ideas may be discussed in more detail in FIG. 6.

The users 120A-N may be able to configure an alert for one or more of selected ideas. The users 120A-N may be able to configure the alerts to notify the users 120A-N when an action is performed on the idea, such as an enhancement of an idea, a modification of an idea, the removal of an idea, or generally any action performed on an idea. The users 120A-N may be able to further configure an alert to include actions which are performed on ideas related to the one or more selected ideas. The users 120A-N may identify a relation threshold, which may identify the ideas related to the selected idea which should be included in the alert. For example, a user A 120A may wish to include all ideas which are enhancements of the selected idea, or children of the selected idea. Alternatively, the user A 120A may wish to include the ideas for which the selected idea is an enhancement of, or parent ideas, any ideas within one degree of separation from the selected idea, or generally ideas which are related to the selected idea. An alert may be provided to the users 120A-N via an email, a voicemail, a text message, an instant message, a popup message, or generally any message capable of communicating an alert to the users 120A-N. The alerts are discussed in more detail in FIGS. 15-16 below.

Once the period of time allocated to collaborating on an initial idea has expired, the service provider 130 may notify the content provider A 110A that the collaborative innovation process has completed. The service provider 130 may provide the content provider A 110A and/or the users 120A-N with an interface for viewing the results of the collaborative innovation process. The results may be displayed as an ordered list of ideas generated by the users 120A-N during the innovation process. The ideas may be ordered based on the ratings the ideas received from the users 120A-N. The service provider 130 may provide the content provider A 110A with an interface for filtering the results based on one or more characteristics of the users 120A-N who rated the ideas. In the system 100 the ideas receiving the highest ratings may be referred to as wine ideas, or simply wine. The interface for viewing collaborative innovation results may be discussed in FIG. 7.

The service provider 130 may provide the users 120A-N with an interface for viewing a summary of their activity with the service provider 130. The summary may include one or more graphs displaying the activity of the users 120A-N, such as a pie graph, a bar graph, or generally any graph capable of reporting the activity of the users 120A-N. The activity of the administrator, or any of the users 120A-N designated as excluded from the statistics, may be excluded from the one or more graphs. The interface may also allow the users 120A-N to view or modify their user profile. The interface for providing user activity data may be discussed in more detail in FIGS. 8 and 11.

The service provider 130 may provide an administrator interface to authorized content providers 110A-N and or users 120A-N, such as the content provider A 110A. The administrator interface may allow the content provider A 110A to add and/or remove users 120A-N and set the permissions of users 120AN. The permissions may include creating initial ideas, creating follow-up ideas, rating ideas, viewing ideas, or generally any permission that may be set in the system 100. The administrator interface is discussed in more detail in FIG. 9.

Alternatively or in addition the service provider 130 may provide an alternative administrator interface which allows an administrator to exclude the activity of one or more administrators, from the user activity data. Excluding the activity of the administrators from the user activity data allows the administrators to access the collaborative innovation system without affecting the user activity data. An alternative administrator interface is discussed in more detail in FIG. 9B. The steps of excluding the activity of an administrator from user activity data is discussed in more detail in FIGS. 12-14 below.

The service provider 130 may provide an administrator with reports indicating the effectiveness of the organization in collaborative innovation. The reports may analyze the user activity of the organization in the collaborative innovation system to determine organizational scores in key collaborative metrics such as a responsiveness score, a willingness score, a criticality score, and a creativity score. The service provider 130 may analyze the scores to generate a report indicating whether the organization is effectively utilizing the collaborative innovation system. The service provider 130 may determine whether any of the scores fail to meet an effectiveness threshold, and, if so, may provide suggestions on how the organization may improve the scores. Determining the effectiveness of the organization in collaborative innovation is discussed in more detail in FIGS. 17-18 below.

Figure 2:
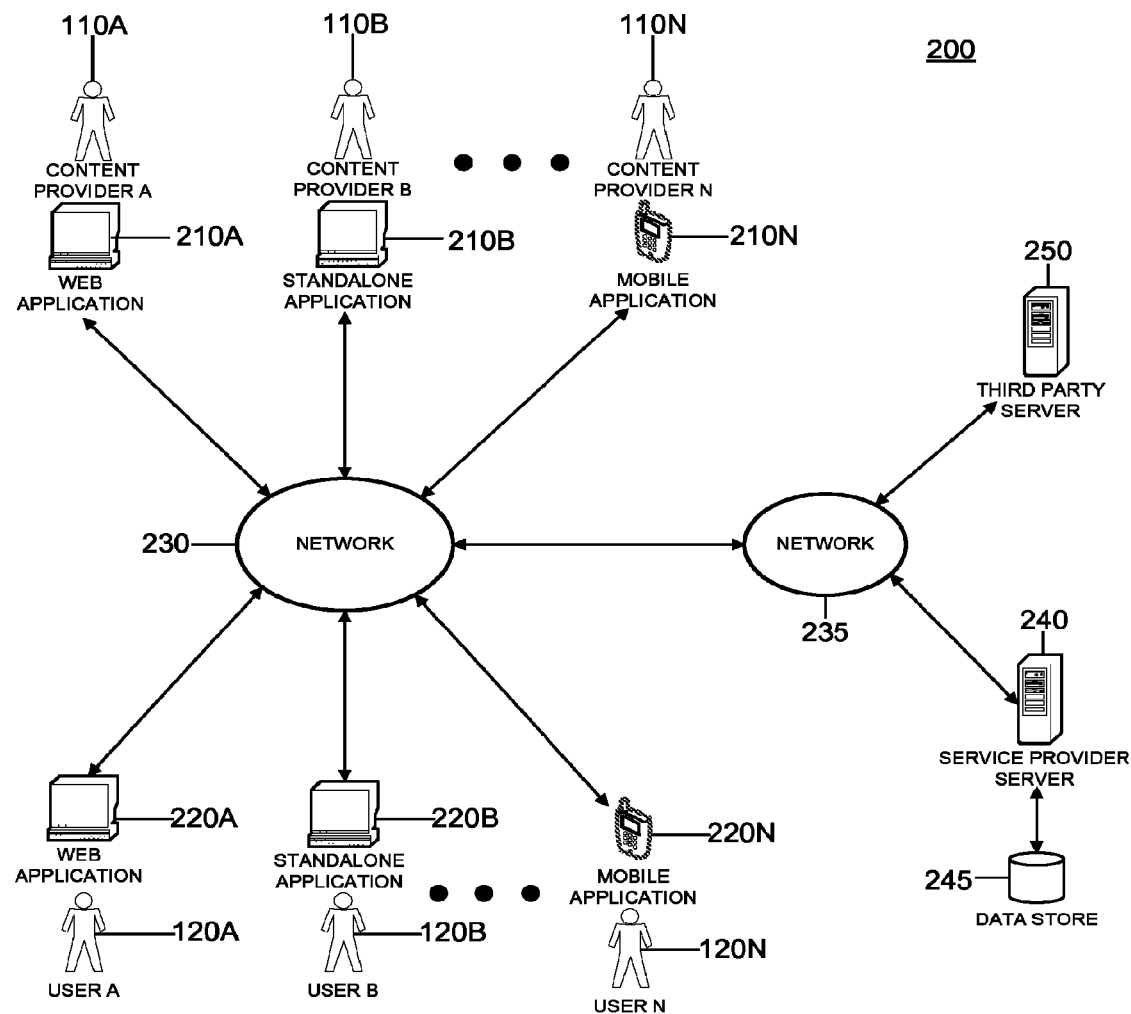
FIG. 2 is a block diagram of a network environment implementing the system of FIG. 1 or other systems for analyzing user activity in a collaborative environment.

FIG. 2 provides a simplified view of a network environment 200 implementing the system of FIG. 1 or other systems for analyzing user activity in a collaborative environment. Not all of the depicted components may be required, however, and some implementations may include additional components not shown in the figure. Variations in the arrangement and type of the components may be made without departing from the spirit or scope of the claims as set forth herein. Additional, different or fewer components may be provided.

The network environment 200 may include one or more web applications, standalone applications and mobile applications 210A-N, which may be client applications of the content providers 110A-N. The system 200 may also include one or more web applications, standalone applications, mobile applications 220A-N, which may be client applications of the users 120A-N. The web applications, standalone applications and mobile applications 210A-N, 220A-N, may collectively be referred to as client applications 210A-N, 220A-N. The system 200 may also include a network 230, a network 235, the service provider server 240, a data store 245, and a third party server 250.

Some or all of the service provider server 240, and third-party server 250 may be in communication with each other by way of network 235. The third-party server 250 and service provider server 240 may each represent multiple linked computing devices. Multiple distinct third party servers, such as the third-party server 250, may be included in the network environment 200. A portion or all of the third-party server 250 may be a part of the service provider server 240.

The data store 245 may be operative to store data, such as user information, data relating to ideas, or ratings of ideas of the users 120A-N. The data store 245 may include one or more relational databases or other data stores that may be managed using various known database management techniques, such as, for example, SQL and object-based techniques. Alternatively or in addition the data store 245 may be implemented using one or more of the magnetic, optical, solid state or tape drives. The data store 245 may be in communication with the service provider server 240. Alternatively or in addition the data store 245 may be in communication with the service provider server 240 through the network 235.

The networks 230, 235 may include wide area networks (WAN), such as the internet, local area networks (LAN), campus area networks, metropolitan area networks, or any other networks that may allow for data communication. The network 230 may include the Internet and may include all or part of network 235; network 235 may include all or part of network 230. The networks 230, 235 may be divided into sub-networks. The sub-networks may allow access to all of the other components connected to the networks 230, 235 in the system 200, or the sub-networks may restrict access between the components connected to the networks 230, 235. The network 235 may be regarded as a public or private network connection and may include, for example, a virtual private network or an encryption or other security mechanism employed over the public Internet, or the like.

The content providers 110A-N may use a web application 210A, standalone application 210B, or a mobile application 210N, or any combination thereof, to communicate to the service provider server 240, such as via the networks 230, 235. Similarly, the users 120A-N may use a web application 220A, a standalone application 220B, or a mobile application 220N to communicate to the service provider server 240, via the networks 230, 235.

The service provider server 240 may provide user interfaces to the content providers 110A-N via the networks 230, 235, through the web applications, standalone applications or mobile applications 210A-N. The service provider server 240 may also provide user interfaces to the users 120A-N via the networks 230, 235, through the web applications, standalone applications or mobile applications 220A-N. The user interfaces may be designed using ADOBE FLEX. The user interfaces may be initially downloaded when the applications 210A-N, 220A-N first communicate with the service provider server 240. The client applications 210A-N, 220A-N may download all of the code necessary to implement the user interfaces, but none of the actual data. The data may be downloaded from the service provider server 240 as needed.

The user interface may be developed using the singleton development pattern, utilizing the model locator found within the cairngorm framework. Within the singleton pattern there may be several data structures each with a corresponding data access object. The data structures may be structured to receive the information from the service provider server 240.

The web applications, standalone applications and mobile applications 210A-N, 220A-N may run on a device connected to the network 230 in any configuration that supports data transfer. This may include a data connection to the network 230 that may be wired or wireless. Any of the web applications, standalone applications and mobile applications 210A-N, 220A-N may individually be referred to as a client application. The web applications 210A, 220A may run on any platform that supports web content, such as a web browser or a computer, a mobile phone, personal digital assistant (PDA), pager, network-enabled television, digital video recorder, such as TIVO®, automobile and/or any appliance capable of data communications.

The standalone applications 210B, 220B may run on a machine that may have a processor, memory, a display, a user interface and a communication interface. The processor may be operatively connected to the memory, display and the interfaces and may perform tasks at the request of the standalone applications 210B, 220B or the underlying operating system. The memory may be capable of storing data. The display may be operatively connected to the memory and the processor and may be capable of displaying information to the content provider B 110B or the user B 120B. The user interface may be operatively connected to the memory, the processor, and the display and may be capable of interacting with a user B 120B or a content provider B 110B. The communication interface may be operatively connected to the memory, and the processor, and may be capable of communicating through the networks 230, 235 with the service provider server 240, and the third party server 250. The standalone applications 210B, 220B may be programmed in any programming language that supports communication protocols. These languages may include: SUN JAVA®, C++, C#, ASP, SUN JAVASCRIPT®, asynchronous SUN JAVASCRIPT®, or ADOBE FLASH ACTIONSCRIPT®, ADOBE FLEX, and PHP, amongst others.

The mobile applications 210N, 220N may run on any mobile device that may have a data connection. The data connection may be a cellular connection, a wireless data connection, an interne connection, an infra-red connection, a Bluetooth connection, or any other connection capable of transmitting data.

The service provider server 240 may include one or more of the following: an application server, a data store, such as the data store 245, a database server, and a middleware server. The application server may be a dynamic HTML server, such as using ASP, JSP, PHP, or other technologies. The service provider server 240 may co-exist on one machine or may be running in a distributed configuration on one or more machines. The service provider server 240 may collectively be referred to as the server. The service provider server 240 may implement a server side Wiki engine, such as ATLASSIAN CONFLUENCE. The service provider server 240 may receive requests from the users 120A-N and the content providers 110A-N and may provide data to the users 120A-N and the content providers 110A-N based on their requests. The service provider server 240 may communicate with the client applications 210A-N, 220A-N using extensible markup language (XML) messages.

The third party server 250 may include one or more of the following: an application server, a data source, such as a database server, and a middleware server. The third party server may implement any third party application that may be used in a collaborative innovation system, such as a user verification system. The third party server 250 may co-exist on one machine or may be running in a distributed configuration on one or more machines. The third party server 250 may receive requests from the users 120A-N and the content providers 110A-N and may provide data to the users 120A-N and the content providers 110A-N based on their requests.

Figure 23:
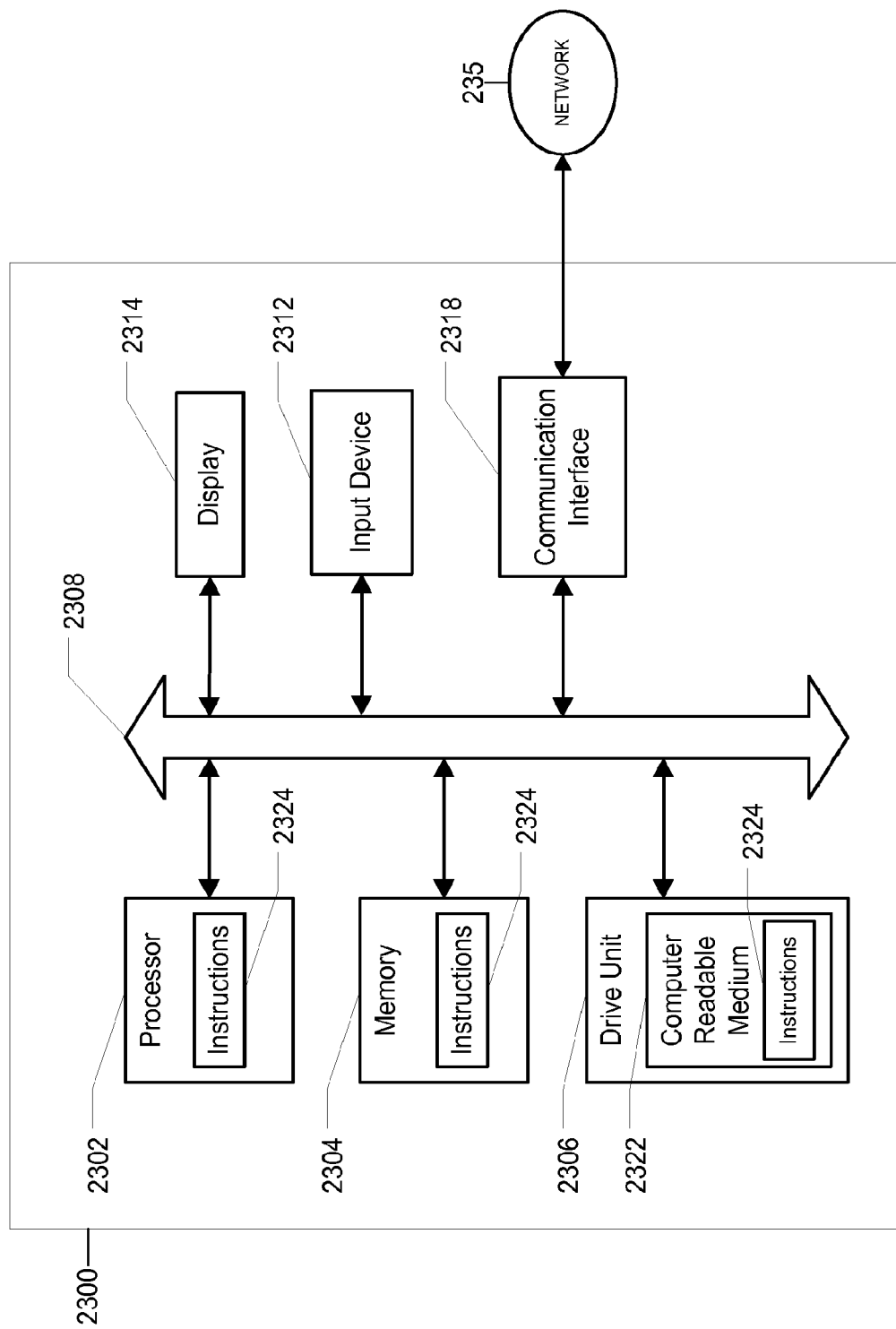
FIG. 23 is an illustration of a computer system that may be used in the systems of FIG. 2, or other systems for analyzing user activity in a collaborative environment.

The service provider server 240 and the third party server 250 may be one or more computing devices of various kinds, such as the computing device in FIG. 23. Such computing devices may generally include any device that may be configured to perform computation and that may be capable of sending and receiving data communications by way of one or more wired and/or wireless communication interfaces. Such devices may be configured to communicate in accordance with any of a variety of network protocols, including but not limited to protocols within the Transmission Control Protocol/Internet Protocol (TCP/IP) protocol suite. For example, the web applications 210A, 210A may employ HTTP to request information, such as a web page, from a web server, which may be a process executing on the service provider server 240 or the third-party server 250.

There may be several configurations of database servers, such as the data store 245, application servers, and middleware servers included in the service provider server 240, or the third party server 250. Database servers may include MICROSOFT SQL SERVER®, ORACLE®, IBM DB2® or any other database software, relational or otherwise. The application server may be APACHE TOMCAT®, MICROSOFT IIS®, ADOBE COLDFUSION®, or any other application server that supports communication protocols.

The middleware server may be any middleware that connects software components or applications.

The networks 230, 235 may be configured to couple one computing device to another computing device to enable communication of data between the devices. The networks 230, 235 may generally be enabled to employ any form of machine-readable media for communicating information from one device to another. Each of networks 230, 235 may include one or more of a wireless network, a wired network, a local area network (LAN), a wide area network (WAN), a direct connection such as through a Universal Serial Bus (USB) port, and the like, and may include the set of interconnected networks that make up the Internet. The networks 230, 235 may include any communication method by which information may travel between computing devices.

In operation the client applications 210A-N, 220A-N may make requests back to the service provider server 240. The service provider server 240 may access the data store 245 and retrieve information in accordance with the request. The information may be formatted as XML and communicated to the client applications 210A-N, 220A-N. The client applications 210A-N, 220A-N may display the XML appropriately to the users 120A-N, and/or the content providers 110A-N.

Figure 3:
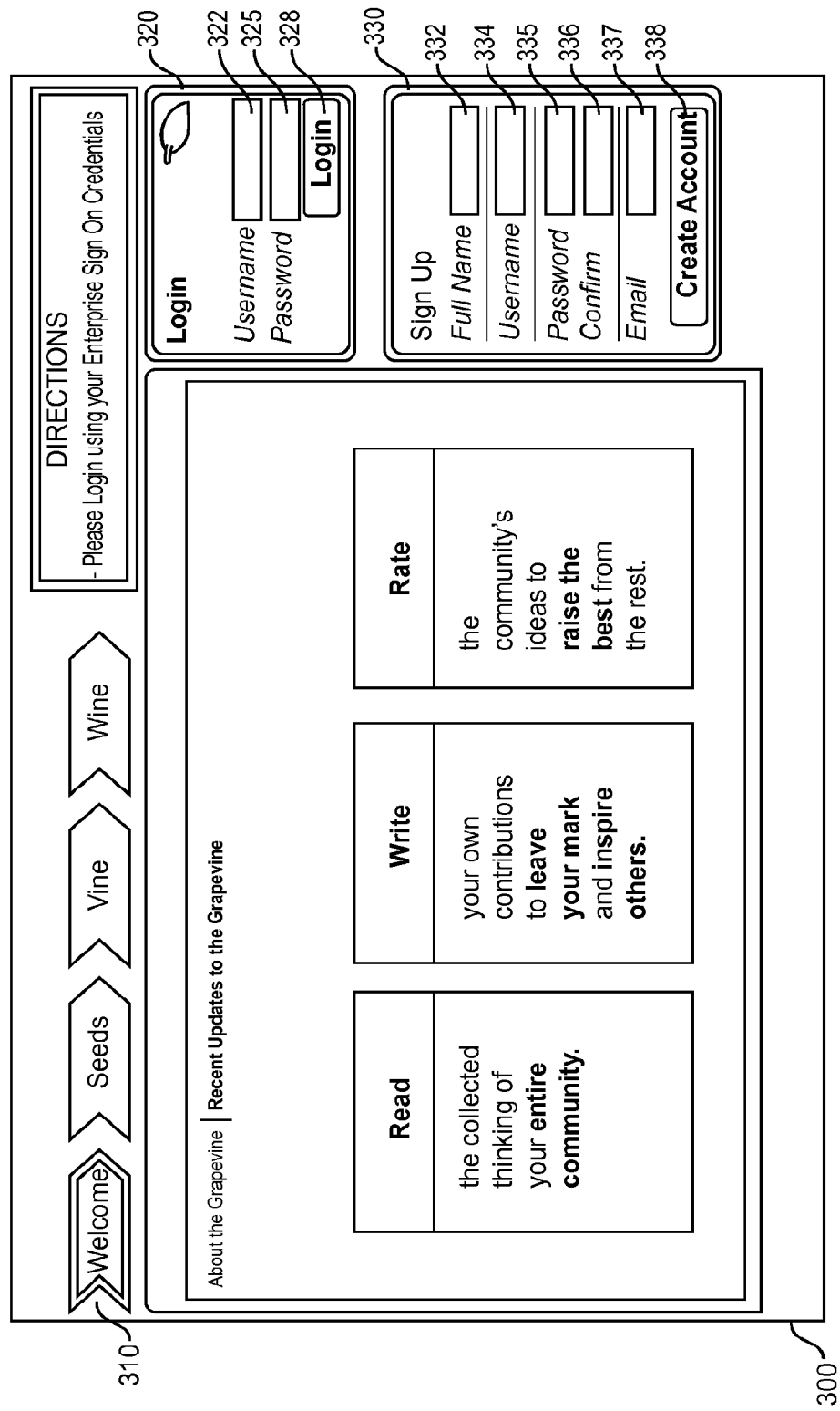
FIG. 3 is a screenshot of a user login interface in the system of FIG. 1, or other systems for analyzing user activity in a collaborative environment.

FIG. 3 is a screenshot of a user login interface 300 in the system of FIG. 1, or other systems for analyzing user activity in a collaborative environment. The system 100 may display the user login interface 300 to the user A 120A when the user A 120A first interacts with the system 100. The user A 120A may use the user login interface 300 to log into the system 100, or create a new account to access the system 100. The user login interface 300 may include a navigation bar 310, a login subsection 320, and a sign up subsection 330. The login subsection 320 may include a username field 322, a password field 325, and a login button 328. The sign up subsection 330 may include a full name field 332, a username field 334, a password field 335, a confirm password field 336, an email field 337, and a create account button 338.

In operation the user A 120A may enter their username in the username field 322 and their password in the password field 325. The user A 120A may then click on the login button 328 to login into the system 100. If the user A 120A does not already have an account the user A 120A may fill in the fields in the sign up subsection 330, and click on the create account button 338, to create a new account. The user A 120A may be granted immediate access to the system 100, or an administrator and/or one of the content providers 110A-N may need to approve of the user A 120A before the user A 120A is granted access to the system. In this instance the system 100 may notify the user A 120A when they have been granted access, such as an email notification. The navigation bar 310 displays the current screen the user A 120A is viewing. Alternatively or in addition there may be multiple user login interfaces 300. In this instance the system 100 may display a different user login interface 300 depending upon whether the user A 120A is an internal user of an organization or is a client of the organization.

Figure 3A:
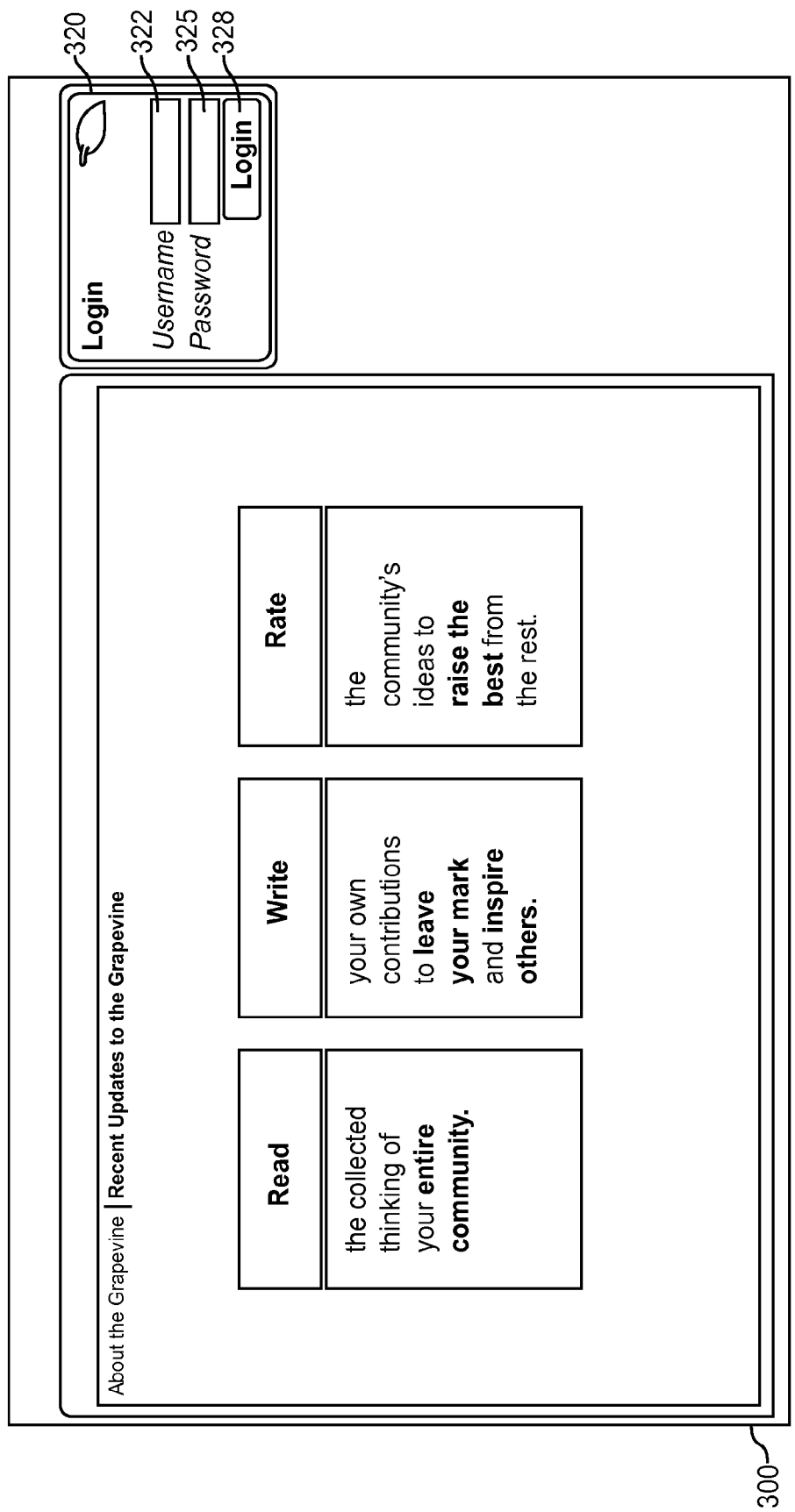
FIG. 3A is a screenshot of an alternative user login interface in the system of FIG. 1, or other systems for analyzing user activity in a collaborative environment.

FIG. 3A is a screenshot of an alternative user login interface 300 in the system of FIG. 1, or other systems for analyzing user activity in a collaborative environment. The system 100 may display the alternative user login interface 300 to the user A 120A when the user A 120A first interacts with the system 100. The user A 120A may use the alternative user login interface 300 to log into the system 100. The alternative user login interface 300 may include a login subsection 320. The login subsection 320 may include a username field 322, a password field 325, and a login button 328. In operation the user A 120A may enter their username in the username field 322 and their password in the password field 325. The user A 120A may then click on the login button 328 to login into the system 100.

Figure 4:
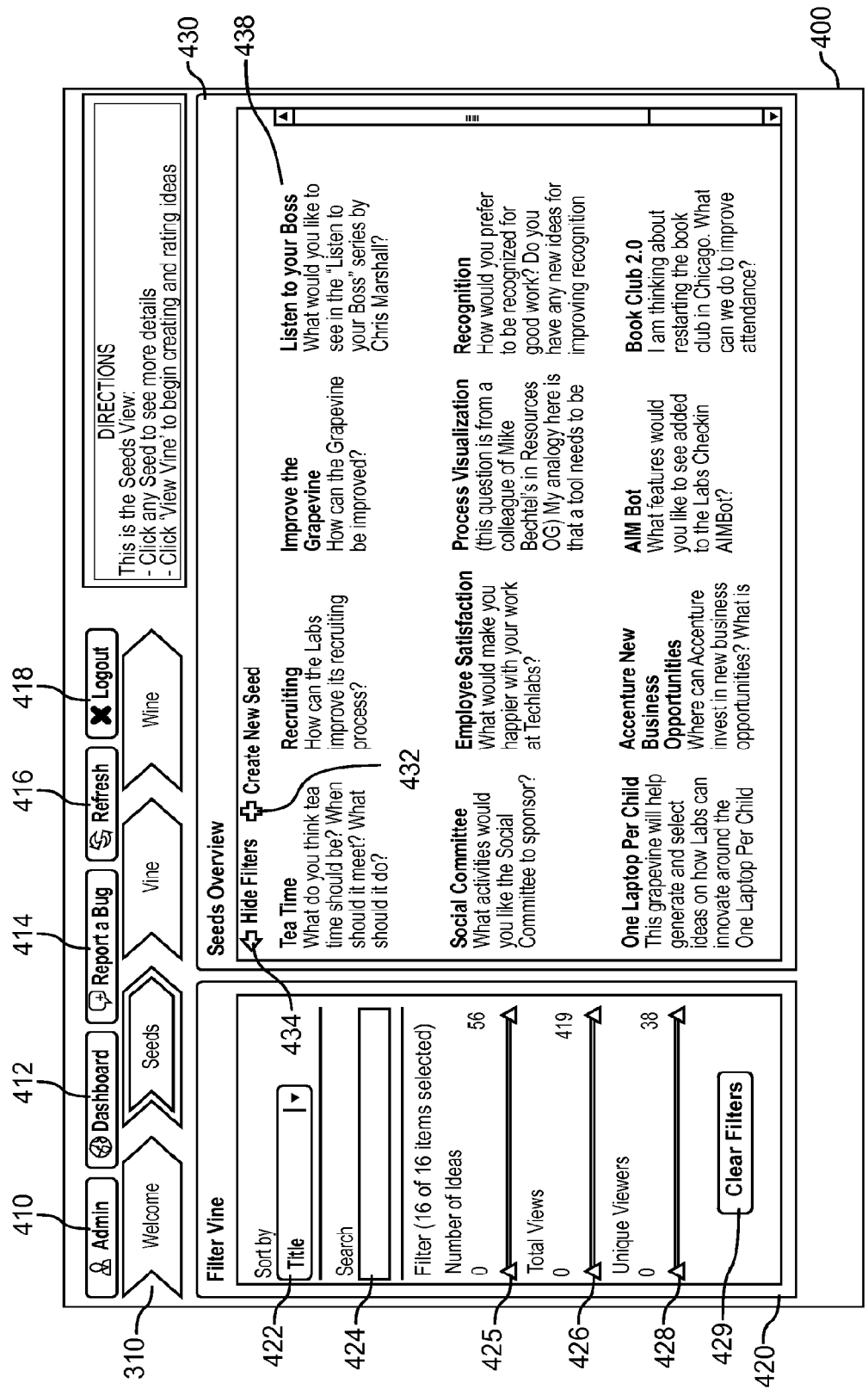
FIG. 4 is a screenshot of an initial item selection interface in the system of FIG. 1, or other systems for analyzing user activity in a collaborative environment.

FIG. 4 is a screenshot of an initial item selection interface 400 in the system of FIG. 1, or other systems for analyzing user activity in a collaborative environment. The system 100 may display the initial item selection interface 400 to the user A 120A after the user A 120A logs into the system 100. The user A 120A may use the initial item selection interface 400 to search, filter, and select one or more of the initial items. The initial item selection interface 400 may include a navigation bar 310, an admin button 410, a dashboard button 412, a report a bug button 414, a search button 416, a logout button 418, a filter subsection 420 and an initial item subsection 430. The filter subsection 420 may include a sort by selector 422, a search field 424, a number of ideas filter 425, a total views filter 426, a unique viewers filter 428 and a clear filters button 429. The initial item subsection 430 may include a create new seed button 432, a hide filters button 434, and initial items 438.

In operation, the user A 120A may click on the admin button 410 to view the admin interface. The user A 120A may need certain permissions to access the admin interface. The admin interface may be described in more detail in FIG. 9. The user A 120A may click on the dashboard button 412 to view the dashboard interface. The dashboard interface may be described in more detail in FIG. 8. The user A 120A may click on the refresh button 416 to refresh the data displayed in the initial item selection interface 400. The user A 120A may click on the logout button 418 to log out of the system 100.

The user A 120A may use the filter subsection 420 to sort and/or filter the initial items 438. The sort by selector 422 may be used to sort by one or more characteristics of the initial items 438, such as the title, creator, creation date, and number of grape ideas of the initial items 438. The search field 424 may be used to search the initial items 438. The filters 425, 426, 428, may be used to filter the seeds ideas 438. The clear filters button 429 may be used to reset the filters 425, 426,428.

The user A 120A may view one or more initial items 438 in the initial item subsection 430. The user A 120A may hide the filter subsection 420 by clicking on the hide filters button 434. The user A 120A may create a new initial item by clicking on the create new seed button 432. The user A 120A may be required to have certain permissions in order to create a new initial item. The user A 120A may click on one of the initial items 438 to view detailed information about the initial item. The detailed information screen may be discussed in more detail in FIG. 5.

Alternatively or in addition the initial item selection interface 400 may allow a user A 120A to flag an initial item for potential removal by an administrator. The administrator may review the initial item and determine whether to remove the initial item. There may be two types of seed creation modes, a crowd controlled mode, where any of the users 120A-N can create an initial item, and a managed mode, where only administrator users can create an initial item.

Figure 4A:
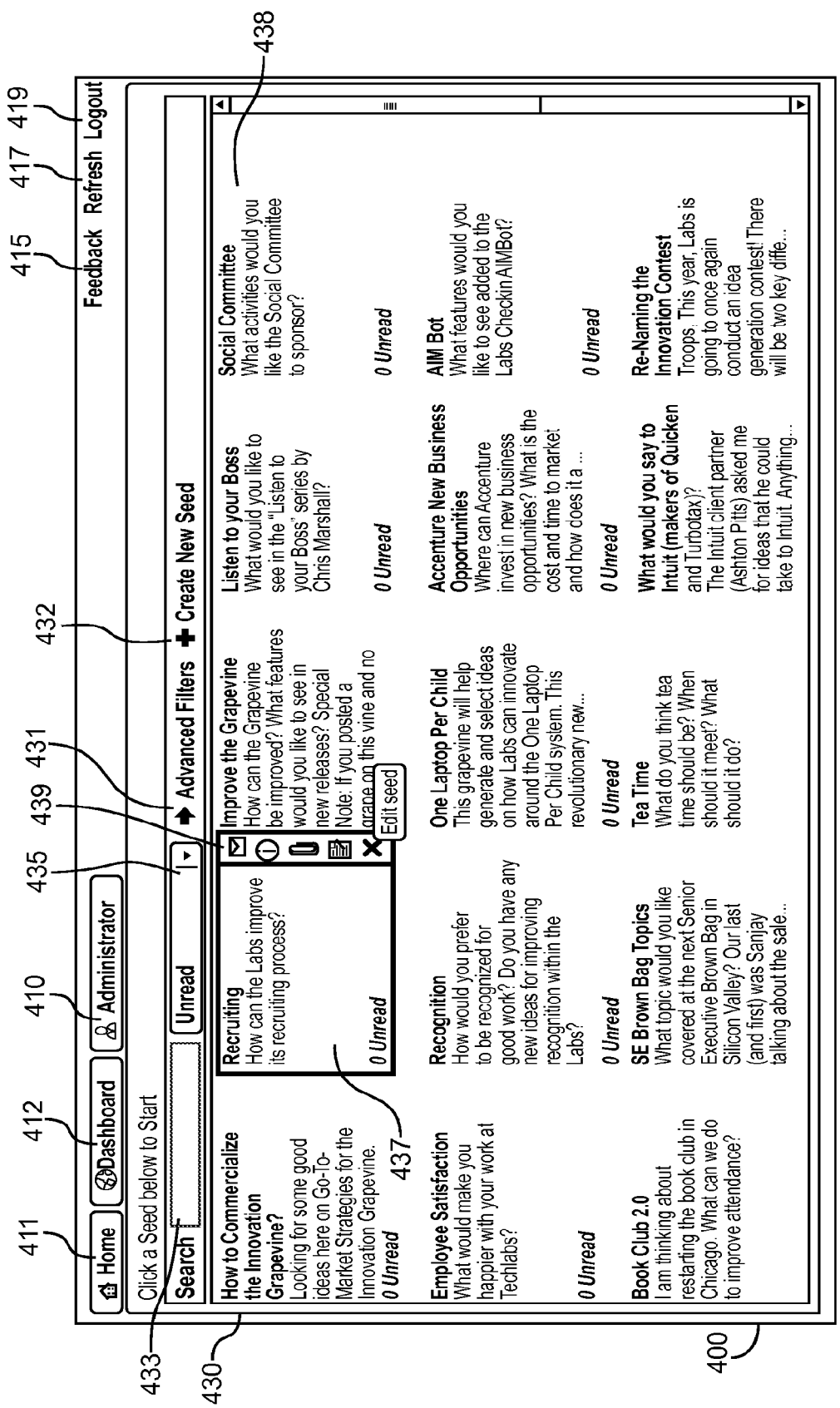
FIG. 4A is a screenshot of an alternative initial item selection interface in the system of FIG. 1, or other systems for analyzing user activity in a collaborative environment.

FIG. 4A is a screenshot of an alternative initial item selection interface 400 in the system of FIG. 1, or other systems for analyzing user activity in a collaborative environment. The system 100 may display the alternative initial item selection interface 400 to the user A 120A after the user A 120A logs into the system 100. The user A 120A may use the alternative initial item selection interface 400 to search, filter, and select one or more of the initial items. The initial item selection interface 400 may include an admin button 410, a dashboard button 412, a home button 411, a feedback link 415, a refresh link 417, a logout link 419, and an initial item subsection 430. The initial item subsection 430 may include an advanced filters button 431, a create new seed button 432, a search field 433, a search dropdown box 435, a selected initial item 437, an initial item action buttons 439, and initial items 438.

In operation, the user A 120A may click on the admin button 410 to view the admin interface. The user A 120A may need certain permissions to access the admin interface. The admin interface may be described in more detail in FIG. 9. The user A 120A may click on the dashboard button 412 to view the dashboard interface. The dashboard interface may be described in more detail in FIG. 8. The user A 120A may click on the refresh link 417 to refresh the data displayed in the initial item selection interface 400. The user A 120A may click on the logout button 418 to log out of the system 100. The user A 120A may click on the feedback link 415 to provide feedback on the system 100, such as to an administrator. The home button 411 may return the user to the user login interface 300. Alternatively or in addition the user A 120A may specify any screen or interface in the system 100 as a home screen. When the user A 120A clicks on the home button 411 the user A 120A may be displayed the specified home screen.

The user A 120A may view one or more initial items 438 in the initial item subsection 430. The user A 120A may view advanced filters, such as the filters in the filter subsection 420, by clicking on the advanced filters button 431. The user A 120A may create a new initial item by clicking on the create new seed button 432. The user A 120A may be required to have certain permissions in order to create a new initial item. The user A 120A may click on one of the initial items 438 to select an initial item and/or view detailed information about the initial item. The detailed information screen may be discussed in more detail in FIG. 5.

The selected item 437 may be an item selected by the user A 120A. When the user A 120A selects an item the user A 120A may use the selected item action buttons 439 to perform actions on the selected item 437. The actions may include emailing the item, receiving additional information on the item, attaching an item, such as a file, to the item, editing the item and deleting the item. If the user A 120A selects to edit the selected item 437 the user A 120A may be taken to the detailed information screen of FIG. 5.

The user A 120A may use the search field 433 to search for initial items. The user A 120A may use the search dropdown box 435 to filter the items searched, such as by only searching the unread items.

Figure 5:
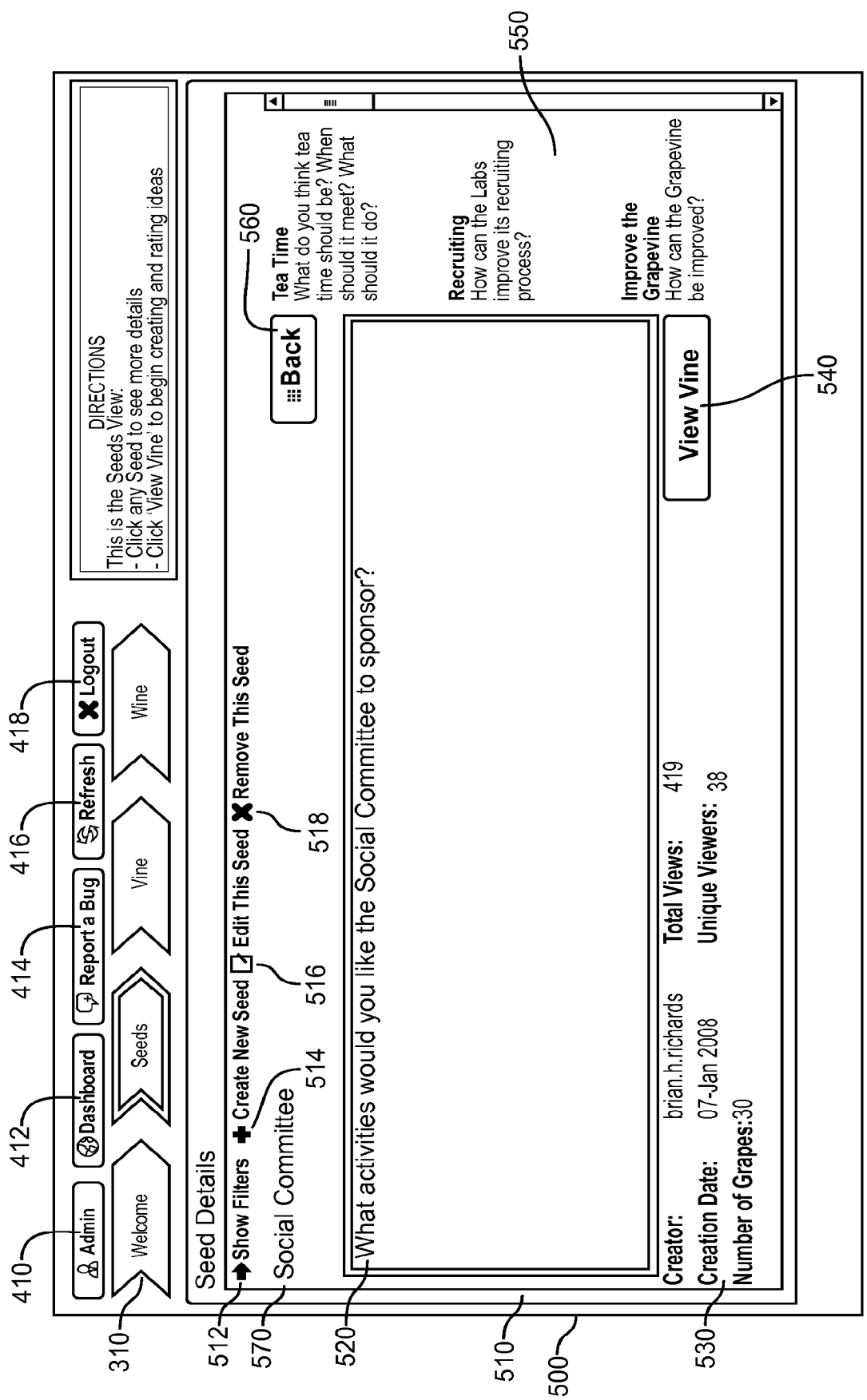
FIG. 5 is a screenshot of an initial item details screen in the system of FIG. 1, or other systems for analyzing user activity in a collaborative environment.

FIG. 5 is a screenshot of an initial item details screen 500 in the system of FIG. 1, or other systems for analyzing user activity in a collaborative environment. The system 100 may display the initial items details screen 500 to the user A 120A when the user A 120A clicks on one of the initial items 438 in the initial item subsection 430 of the initial item selection interface 400 in FIG. 4. The user A 120A may use the initial item details screen 500 to view detailed information regarding the selected initial item. The initial item details screen 500 may include a navigation bar 310, an admin button 410, a dashboard button 412, a report a bug button 414, a refresh button 416, a logout button 418, a seed details subsection 510, an initial item 520, a seed information subsection 530, a view vine button 540, an additional initial items subsection 550, a back button 560, and a seed title 570. The seed details subsection 510 may include a show filters button 512, a create new seed button 514, an edit this seed button 516, and a remove this seed button 518.

In operation the user A 120A may view detailed information about the initial item in the initial item information subsection 530. The detailed information may include the creator of the initial item, the creation date of the initial item, the number of grape ideas innovated from the initial item, the total number of views of the initial item and the number of unique viewers of the initial item. The user A 120A may use the show filters button 512 to view the current filter settings. The user A 120A may use the create new seed button 514 to create a new initial item. The initial item may be edited with the edit this seed button 516 and removed with the remove this seed button 518. The system 100 may require that the user A 120A have the appropriate permissions in order to add, edit, or delete an initial item. The user A 120A may view the details of another initial item by clicking on an initial item in the additional initial items subsection 550. The user A 120A may click on the back button 560 to return to the initial item selection interface 400 as discussed in FIG. 4. The user A 120A may click on the view vine button 540 to view the ideas innovated from the initial item in the initial item collaborative innovation screen 600 discussed in more detail in FIG. 6.

Figure 6:
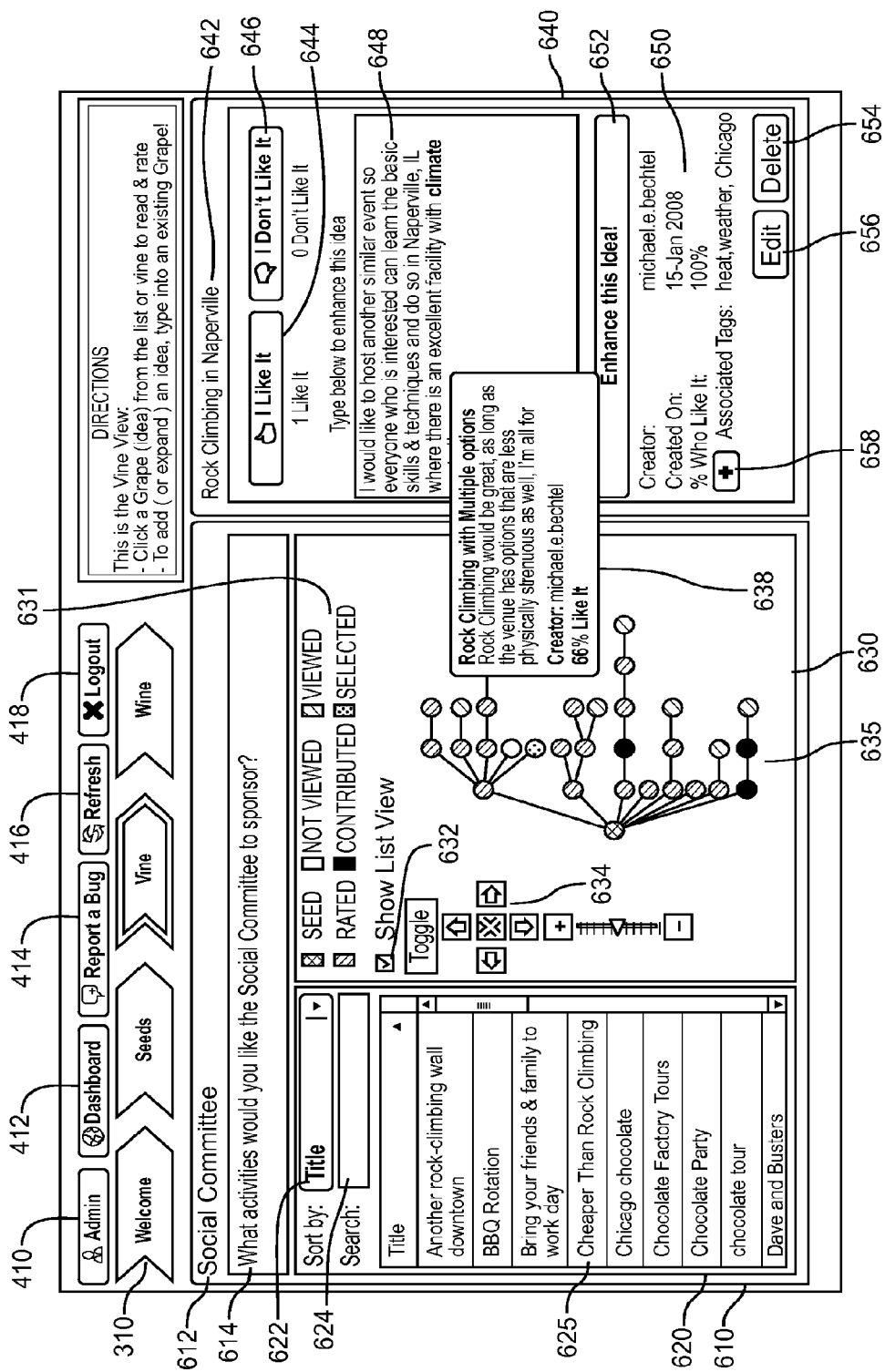
FIG. 6 is a screenshot of an initial item collaborative innovation screen in the system of FIG. 1, or other systems for analyzing user activity in a collaborative environment.

FIG. 6 is a screenshot of an initial item collaborative innovation screen 600 in the system of FIG. 1, or other systems for analyzing user activity in a collaborative environment. The system 100 may display the initial item collaborative innovation screen 600 to the user A 120A when the user A 120A clicks on the view vine button 540 in the initial item details screen 500, as discussed in FIG. 5. The user A 120A may use the initial item collaborative innovation screen 600 to view, add, and rate ideas that have been innovated from the initial item. The initial item collaborative innovation screen 600 may display a graphical depiction of the ideas in the form a tree. In the system 100, the graphical tree-like depiction may be referred to as a graphical hierarchical representation of the ideas. The initial item collaborative innovation screen 600 may include a navigation bar 310, an admin button 410, a dashboard button 412, a report a bug button 414, a refresh button 416, a logout button 418, an idea display section 610 and an idea modification section 640. The idea display section 610 may include an idea title 612, an initial item 614, an idea selector subsection 620 and a collaborative display subsection 630. The idea selector subsection 620 may include a sort by selector 622, a search field 624, and an idea list 625. The collaborative display subsection 630 may include a legend display 631, a show list view checkbox 632, a display modifier 634, a graphical collaborative display 635, and an idea detail display 638. The idea modification section 640 may include a selected idea title 642, a like button 644, a don't like button 646, an idea enhancement field 648, an enhance button 652, an idea information display 650, an add tag button 658, an edit button 656, and a delete button 654.

In operation the user A 120A may view a graphical display of the collaborative innovation for a selected initial item, also known as the graphical hierarchical representation of the ideas, in the graphical collaborative display 635. The graphical collaborative display 635 may display a visual representation of the collaborative innovation process. The user A 120A may modify the data that is displayed in the graphical collaborative display 635 by using the idea selector subsection 620. The user may view ideas in the idea list 625 and may change the ideas displayed in the idea list by using the sort by selector 622 and the search field 624.

The user A 120A may scroll and zoom in and zoom out of the graphical collaborative display 635 using the display modifier 634. The graphical collaborative display 635 may include one or more nodes representing ideas. The user A 120A may click on one of the nodes to view detailed information regarding the idea in the idea detail display 638. Alternatively or in addition the information in the idea detail display 638 may be automatically displayed when the user A 120A uses a pointing interface, such as a mouse, to hover over a node in the graphical collaborative display 635. The user A 120A may be able to easily move around the graphical collaborative display 635 at any zoom level. The user A 120A may zoom in and zoom out using the + and − buttons, or by using a mouse wheel. The legend display 631 may color code the ideas based on whether the user A 120A has contributed, viewed, selected, or rated the idea.

The user A 120A may use the idea modification section 640 to modify or enhance a selected idea. The user A 120A may click on the like it button 644 if they like the idea, or click on the don't like it button 646 if they don't like the idea. The user A 120A may create an idea enhancing the selected idea by entering the idea in the idea enhancement field 648 and clicking the enhance button 652. The idea added by the user A 120A may appear in the graphical collaborative display 635 as a node connected to the node representing the idea that was enhanced. The user A 120A may view details of the selected idea in the idea information display 650. The user A 120A may add a tag to the idea by clicking on the add tag button 658. The user A 120A may tag an idea with any searchable keywords. The user A 120A may edit the idea by clicking on the edit button 656 and may delete the selected idea by clicking on the delete button 654.

Figure 6A:
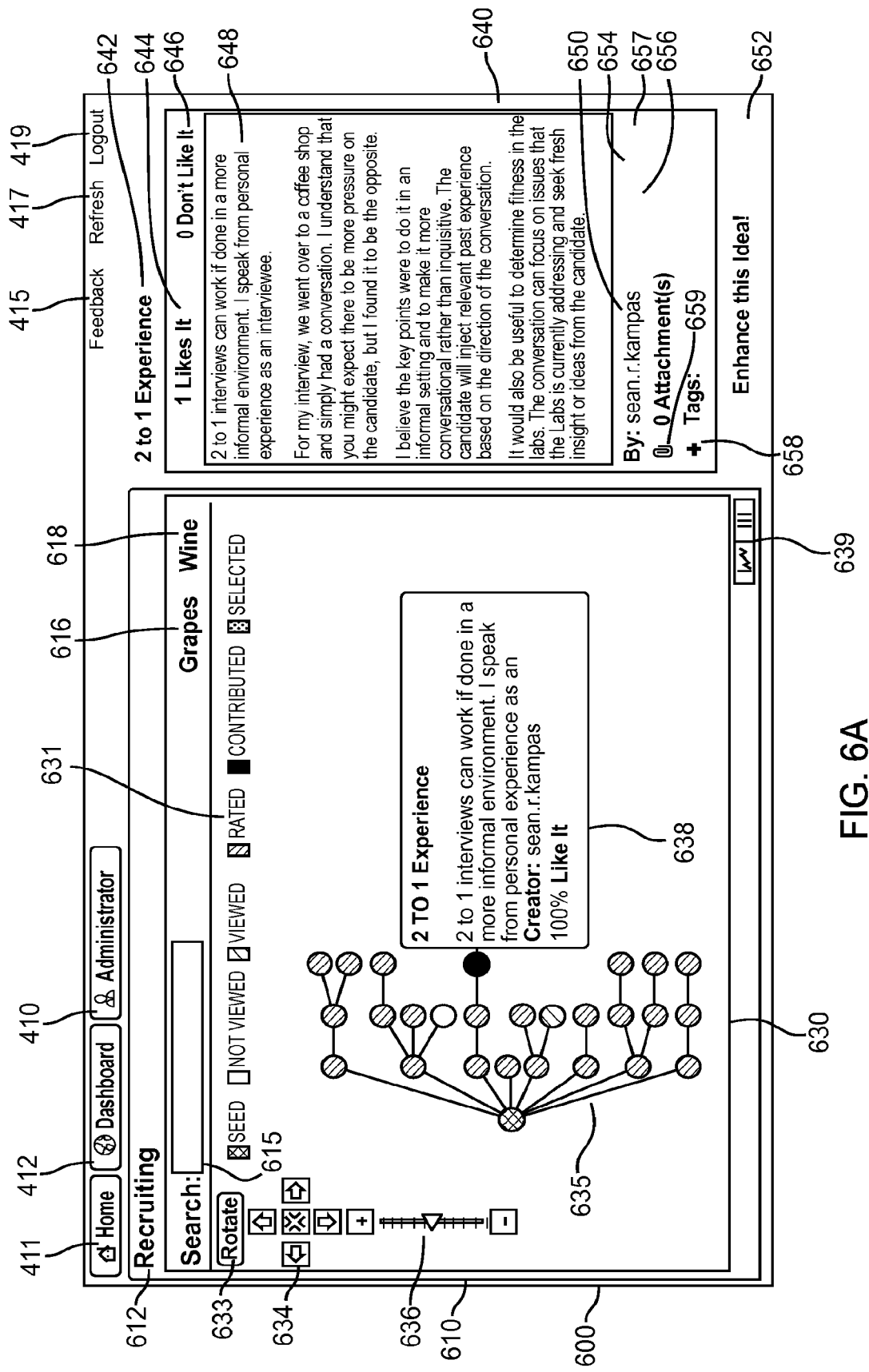
FIG. 6A is a screenshot of an alternative initial item collaborative innovation screen in the system of FIG. 1, or other systems for analyzing user activity in a collaborative environment.

FIG. 6A is a screenshot of an alternative initial item collaborative innovation screen 600 in the system of FIG. 1, or other systems for analyzing user activity in a collaborative environment. The system 100 may display the alternative initial item collaborative innovation screen 600 to the user A 120A when the user A 120A clicks on the view vine button 540 in the initial item details screen 500, as discussed in FIG. 5. The user A 120A may use the alternative initial item collaborative innovation screen 600 to view, add, and rate ideas that have been innovated from the initial item. The alternative initial item collaborative innovation screen 600 may display a graphical hierarchical representation of the ideas in the form of a tree-like structure. In the system 100, the graphical tree-like structure may be referred to as a graphical hierarchical representation of the ideas. The alternative initial item collaborative innovation screen 600 may include an admin button 410, a home button 411, a dashboard button 412, a feedback link 415, a refresh link 417, a logout link 419, an idea display section 610 and an idea modification section 640. The idea display section 610 may include an idea title 612, a search field 615, a grapes button 616, a wine button 618, and a collaborative display subsection 630. The collaborative display subsection 630 may include a legend display 631, a display modifier 634, a rotate button 633, a zoom bar 636, a graphical collaborative display 635, an idea detail display 638, and a list/graph toggle button 639. The idea modification section 640 may include a selected idea title 642, a like button 644, a don't like button 646, an idea enhancement field 648, an enhance button 652, an idea information display 650, an add tag button 658, an edit button 656, an add attachment button 659, an email button 657, and a delete button 654.

Figure 6B:
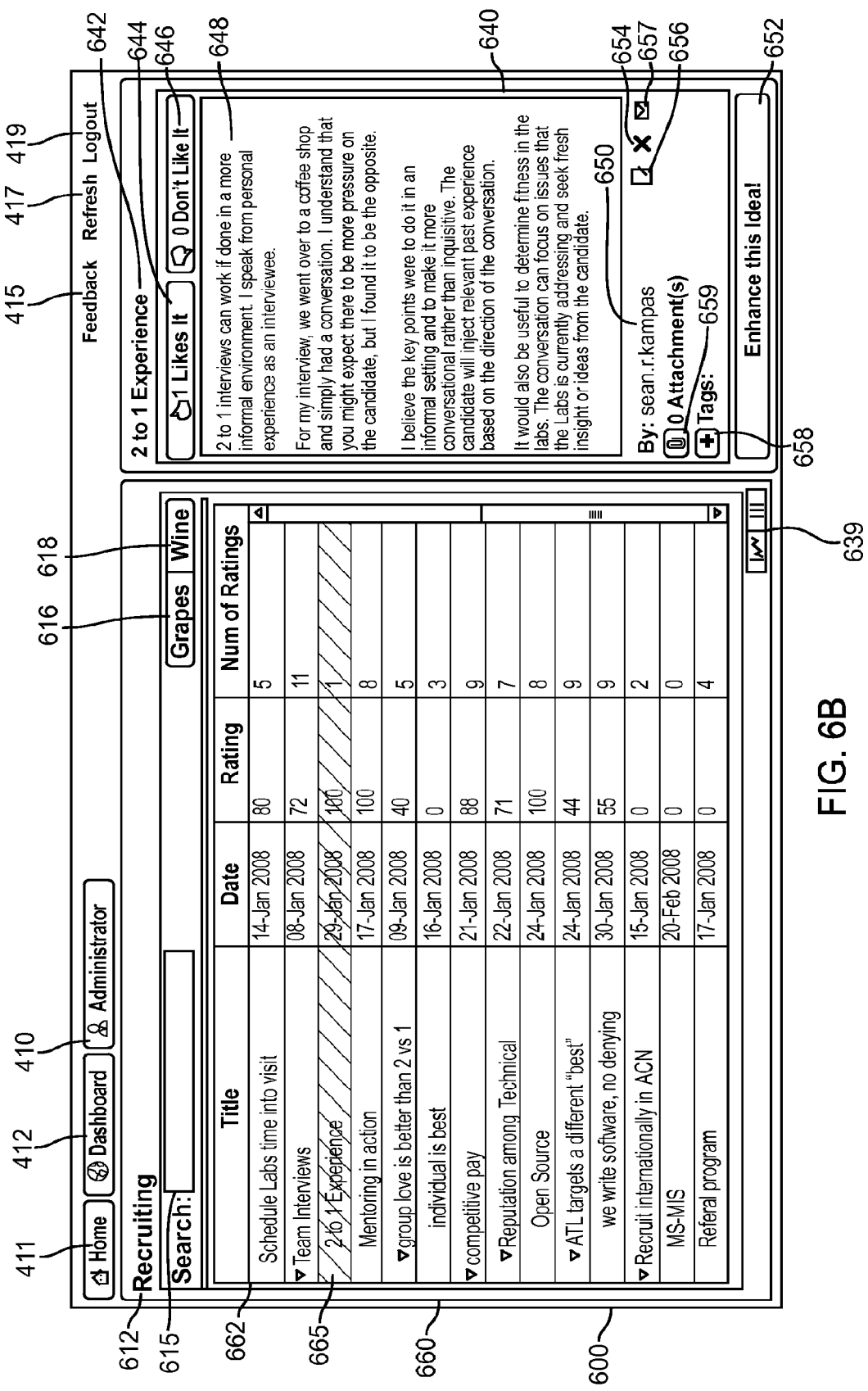
FIG. 6B is a screenshot of a list view in an alternative initial item collaborative innovation screen in the system of FIG. 1, or other systems for analyzing user activity in a collaborative environment.

In operation the user A 120A may view a graphical display of the collaborative innovation for a selected initial item, also known as the graphical hierarchical representation of the ideas, in the graphical collaborative display 635. The graphical collaborative display 635 may display a visual representation of the collaborative innovation process. The user A 120A may toggle between the list view display and the graph view display using the list/graph toggle button 639. FIG. 6B discusses the list view in more detail.

The user A 120A may move around the graphical collaborative display 635 using the display modifier 634. The user A 120A may zoom in and out of the graphical collaborative display using the zoom bar 636. The user A 120A may rotate the graphical collaborative display 635 using the rotate button 633. The graphical collaborative display 635 may include one or more nodes representing ideas. The user A 120A may click on one of the nodes to view detailed information regarding the idea in the idea detail display 638. Alternatively or in addition the information in the idea detail display 638 may be automatically displayed when the user A 120A uses a pointing interface, such as a mouse, to hover over a node in the graphical collaborative display 635. The legend display 631 may color code the ideas based on whether the user A 120A has contributed, viewed, selected, or rated the idea.

The user A 120A may use the idea modification section 640 to modify, enhance, or rate a selected idea. The user A 120A may click on the like it button 644 if they like the idea, or click on the don't like it button 646 if they don't like the idea. The user A 120A may create an idea enhancing the selected idea by entering the idea in the idea enhancement field 648 and clicking the enhance button 652. The idea added by the user A 120A may appear in the graphical collaborative display 635 as a node connected to the node representing the idea that was enhanced. The user A 120A may view details of the selected idea in the idea information display 650. The user A 120A may add a tag to the idea by clicking on the add tag button 658. The user A 120A may tag an idea with any searchable keywords. The user A 120A may add an attachment to the idea by clicking on the attachment button 659. The user A 120A may email the selected idea by clicking on the email button 657. The user A 120A may edit the idea by clicking on the edit button 656 and may delete the selected idea by clicking on the delete button 654.

The user A 120A may search through the ideas by using the search field 615. The user A 120A may toggle whether the only the best ideas are searched or whether all the ideas are searched by using the grapes button 616 and the wine button 618. If the user A 120A clicks on the wine button 618 the search may be limited to the best ideas. If the user A 120A clicks on the grapes button 616, the search may be expanded to all the ideas. FIG. 6 may use the term "grape" to refer to each of the individual ideas stemming from the initial ideas, the term "vine" to refer to all of the ideas stemming from an initial idea, and may use the word "wine" to refer to the best ideas stemming from the initial idea.

FIG. 6B is a screenshot of a list view in an alternative initial item collaborative innovation screen 600 in the system of FIG. 1, or other systems for analyzing user activity in a collaborative environment. The system 100 may display the alternative initial item collaborative innovation screen 600 to the user A 120A when the user A 120A clicks on the view vine button 540 in the initial item details screen 500, as discussed in FIG. 5. Alternatively or in addition the user A 120A may click on the list/graph toggle button 639 in FIG. 6A, to be displayed the list view in the alternative initial item collaborative innovation screen 600. The user A 120A may use the alternative initial item collaborative innovation screen 600 to view, add, and rate ideas that have been innovated from the initial item. The alternative initial item collaborative innovation screen 600 may display a graphical hierarchical representation of the ideas in the form a tree-like structure. In the system 100, the graphical tree-like structure may be referred to as a graphical hierarchical representation of the ideas. The alternative initial item collaborative innovation screen 600 may include an admin button 410, a home button 411, a dashboard button 412, a feedback link 415, a refresh link 417, a logout link 419, an idea display section 610 and an idea modification section 640. The idea display section 610 may include an idea title 612, a search field 615, a grapes button 616, a wine button 618, and a collaborative list subsection 660. The collaborative list subsection 660 may include an ideas table 662 and a selected idea 665. The idea modification section 640 may include a selected idea title 642, a like button 644, a don't like button 646, an idea enhancement field 648, an enhance button 652, an idea information display 650, an add tag button 658, an edit button 656, an add attachment button 659, an email button 657, and a delete button 654.

In operation the user A 120A may view a list of the ideas in the ideas table 662. The selected idea 665 may represent an idea the user A 120A selected from the ideas table. The selected idea 665 may be enhanced or rated in the idea modification subsection 640. The user A 120A may toggle to the graph view display by using the list/graph toggle button 639. FIG. 6A discusses the graph view in more detail. The ideas table 662 may display the ideas in a thread view. The thread view may first display an initial idea with the enhancements to the initial idea listed below the initial idea. Enhancements to the enhancements may be similarly situated below the idea and/or enhancement they were derived from.

The user A 120A may use the idea modification section 640 to modify, enhance, or rate a selected idea. The user A 120A may click on the like it button 644 if they like the idea, or click on the don't like it button 646 if they don't like the idea. The user A 120A may create an idea enhancing the selected idea by entering the idea in the idea enhancement field 648 and clicking the enhance button 652. The idea added by the user A 120A may appear in the graphical collaborative display 635 as a node connected to the node representing the idea that was enhanced. The user A 120A may view details of the selected idea in the idea information display 650. The user A 120A may add a tag to the idea by clicking on the add tag button 658. The user A 120A may tag an idea with any searchable keywords. The user A 120A may add an attachment to the idea by clicking on the attachment button 659. The user A 120A may email the selected idea by clicking on the email button 657. The user A 120A may edit the idea by clicking on the edit button 656 and may delete the selected idea by clicking on the delete button 654.

The user A 120A may search through the ideas by using the search field 615. The user A 120A may toggle whether the only the best ideas are searched or whether all the ideas are searched by using the grapes button 616 and the wine button 618. If the user A 120A clicks on the wine button 618 the search may be limited to the best ideas. If the user A 120A clicks on the grapes button 616, the search may be expanded to all the ideas. FIG. 6 may use the term "grape" to refer to each of the individual ideas stemming from the initial ideas, the term "vine" to refer to all of the ideas stemming from an initial idea, and may use the word "wine" to refer to the best ideas stemming from the initial idea.

Figure 7:
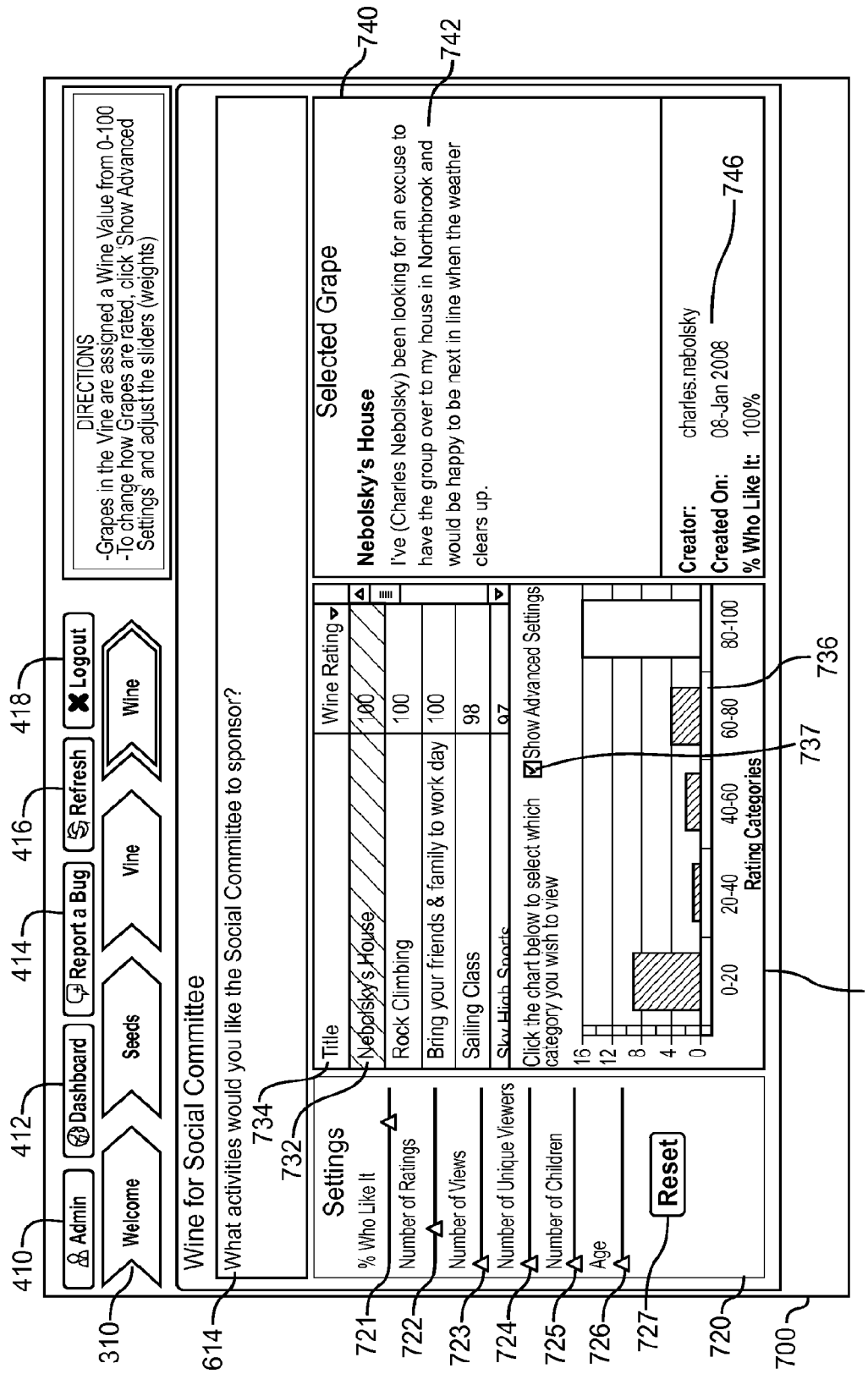
FIG. 7 is a screenshot of an initial item results screen in the system of FIG. 1, or other systems for analyzing user activity in a collaborative environment.

FIG. 7 is a screenshot of an initial item results screen 700 in the system of FIG. 1, or other systems for analyzing user activity in a collaborative environment. The system 100 may display the initial item results screen 700 to one of the content providers 110A-N, such as the content provider A 110A. The initial item results screen 700 may display a summary of the ideas that were innovated from the initial item. The ideas stemming from the initial item may be sorted based on the ratings received from the users 120A-N. The initial item results screen 700 may include a navigation bar 310, an admin button 410, a dashboard button 412, a report a bug button 414, a refresh button 416, a logout button 418, an initial item 614, a settings subsection 720, a summary subsection 730, and a selected idea subsection 740. The settings subsection 720 may include a like it selector 721, a number of ratings selector 722, a number of views selector 723, a number of unique viewers selector 724, a number of children selector 725, an age selector 726 and a reset button 727. The summary subsection 730 may include a rating category graph 736, an idea list 734, an advanced settings checkbox 737, and a selected idea 732. The selected idea subsection 740 may include a selected idea description display 742 and a selected idea details display 746.

The settings subsection 720 may be used to modify the weight given to each factor in the overall rating calculation. The selectors 721, 722, 723, 724, 725, 726 may be adjusted to change the weight afforded to each factor in the overall ratings calculations. The selectors 721, 722, 723, 724, 725, 726 may be reset by clicking on the reset button 727. The summary subsection 730 may display the ideas most highly rated by the users 120A-N in accordance with the weight of the factors indicated in the settings subsection 720. The user A 120A may use the advanced settings checkbox 737 to toggle the display of the settings subsection 720. The ratings category graph 736 may display ranges of the ratings for the selected initial item. The user A 120A may click on a bar in the ratings category graph 736 to change the range of ratings of the ideas displayed in the idea list 734.

The user A 120A may select an idea from the idea list 734 and view detailed information regarding the selected idea in the selected idea subsection 740. The user A 120A may view the description of the selected idea 732 in the selected idea description display 742. The user A 120A may view the details associated with the selected idea in the selected idea description display 746.

Figure 7A:
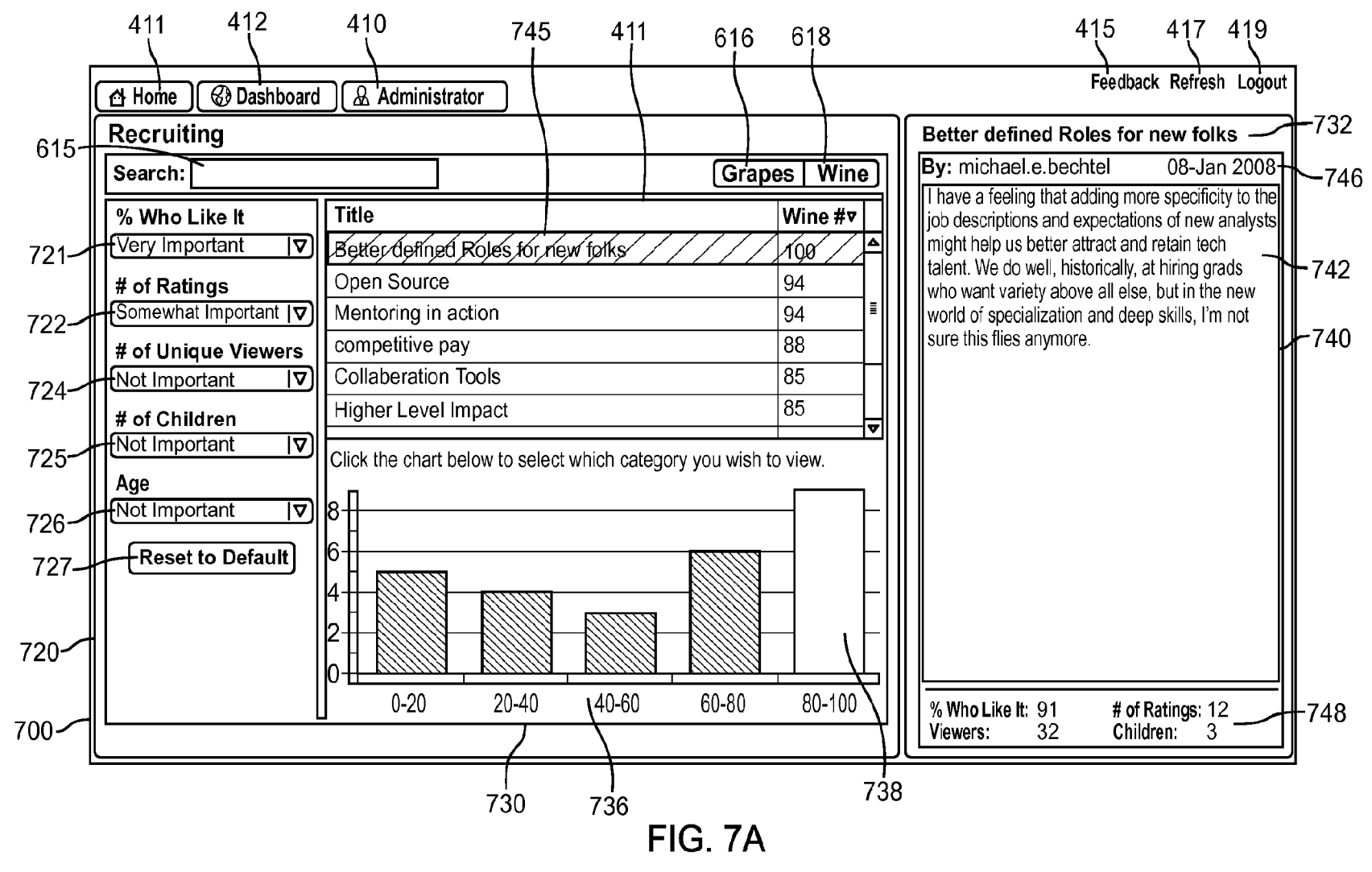

FIG. 7A is a screenshot of an alternative initial item results screen 700 in the system of FIG. 1, or other systems for analyzing user activity in a collaborative environment. The system 100 may display the alternative initial item results screen 700 to one of the content providers 110A-N, such as the content provider A 110A. The alternative initial item results screen 700 may display a summary of the ideas that were innovated from the initial item. The ideas stemming from the initial item may be sorted based on the ratings received from the users 120A-N. The initial item results screen 700 may include an admin button 410, a home button 411, a dashboard button 412, a feedback link 415, a refresh link 417, a logout link 419, a search field 615, a grapes button 616, a wine button 618, a settings subsection 720, a summary subsection 730, and a selected idea subsection 740. The settings subsection 720 may include a like it selector 721, a number of ratings selector 722, a number of unique viewers selector 724, a number of children selector 725, an age selector 726 and a reset button 727. The summary subsection 730 may include a rating category graph 736, an idea list 734, a selected rating bar 738, and a selected idea 732. The selected idea subsection 740 may include a selected idea 732, a selected idea description display 742, a selected idea details display 746, and a selected idea ratings display 748.

The settings subsection 720 may be used to modify the weight given to each factor in the overall rating calculation. The selectors 721, 722, 724, 725, 726 may be adjusted to change the weight afforded to each factor in the overall ratings calculations. The selectors 721, 722, 724, 725, 726 may be reset by clicking on the reset button 727. The summary subsection 730 may display the ideas most highly rated by the users 120A-N in accordance with the weight of the factors indicated in the settings subsection 720. The ratings category graph 736 may display ranges of the ratings for the selected initial item. The selected rating bar 738 in the ratings category graph 736 may be a bar selected by the user A 120A. The selected rating bar 738 in the ratings category graph 736 to change the range of ratings of the ideas displayed in the idea list 734.

The user A 120A may select an idea from the idea list 734 and view detailed information regarding the selected idea 732 in the selected idea subsection 740. The user A 120A may view the description of the selected idea 732 in the selected idea description display 742. The user A 120A may view the details associated with the selected idea 732, such as creation details, in the selected idea description display 746. The user A 120A may view ratings information of the selected idea 732 in the selected idea ratings display 748.

Figure 8:
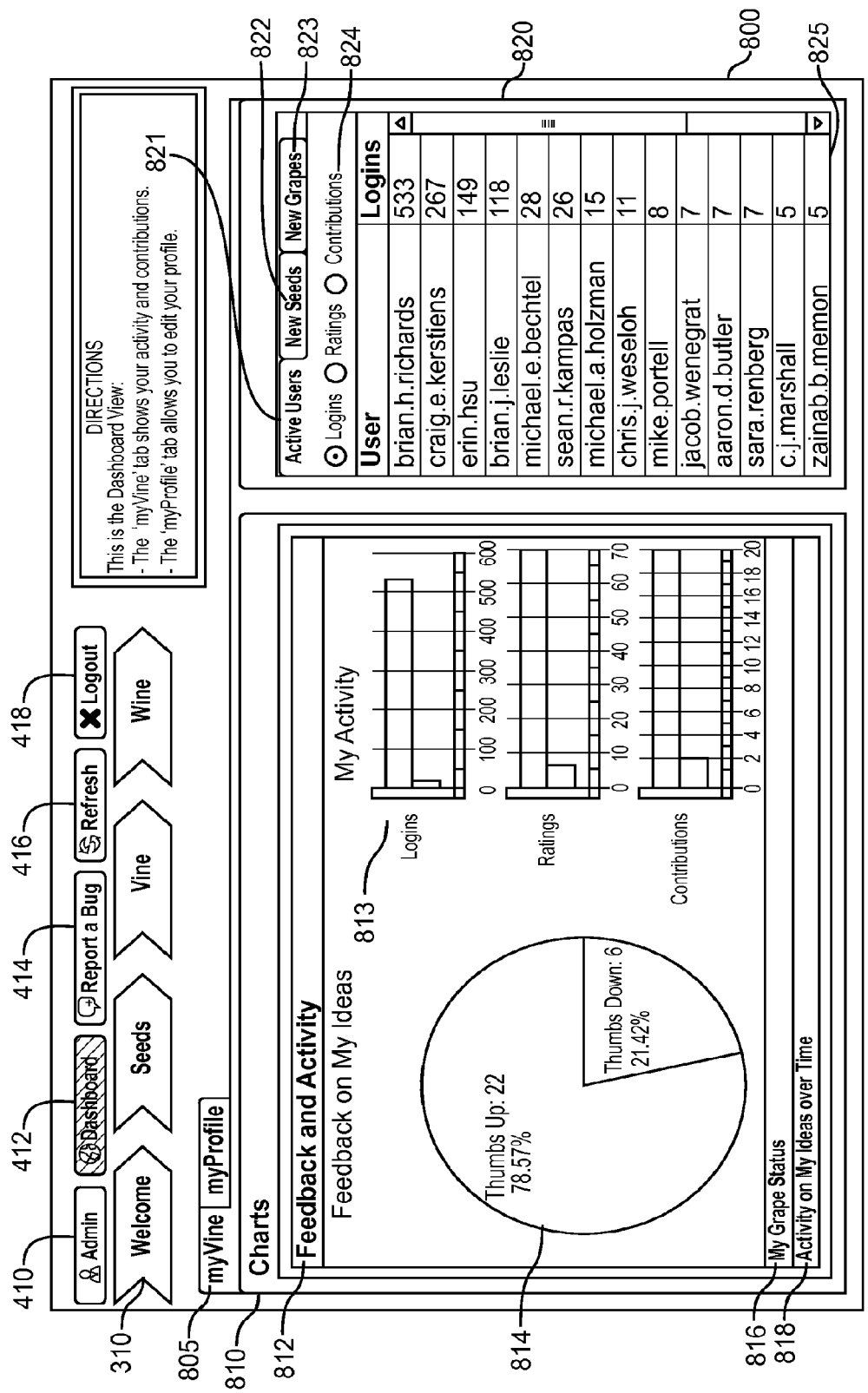
FIG. 8 is a screenshot of a user dashboard screen displaying the my vine tab in the system of FIG. 1, or other systems for analyzing user activity in a collaborative environment.

FIG. 8 is a screenshot of a user dashboard screen 800 in the system of FIG. 1, or other systems for analyzing user activity in a collaborative environment. The system 100 may display the user dashboard screen 800 to the user A 120A when the user A 120A clicks on the dashboard button 412. The user A 120A may use the user dashboard screen 800 to obtain a quick overview of recent changes that have occurred in the system 100. The user A 120A may also use the user dashboard screen 800 to view metrics regarding their use of the system 100 and the other users 120B-N use of the system 100. The user dashboard screen 800 may include a navigation bar 310, an admin button 410, a dashboard button 412, a report a bug button 414, a refresh button 416, a logout button 418, a vine tab 805, a charts subsection 810 and a user subsection 820. The charts subsection 810 may include a feedback and activity header 812, a grape status header 816, an activity header 818, a feedback graph 814, and an activity display 813. The user subsection 820 may include an active users tab 821, a new initial items tab 822, a new grape ideas tab 823, a display selector 824 and a user list 825.

In operation the user A 120A may view their activity in the charts subsection 810. The feedback graph 814 may display the number of ideas liked by the user A 120A and the number of ideas disliked by the user A 120A. The activity display 813 may display the activity of the user A 120A in the system 100. The activity display 813 may display the logins, ratings and contributions of the user A 120A. The user subsection 820 may display the activity of the other users 120B-N. The activity display 820 may display the logins, ratings and contributions of the other users 120B-N. The user A 120A may click on the new initial items tab 822 to view the new initial item activity or the user A 120A may click on the new grape ideas tab 823 to view the new grape idea activity.

The user A 120A may click on the grape status header 816 to view data associated with the status of their ideas. The status of the ideas may be used to provide feedback to the other users 120B-N. The status of the ideas may be published to the users 120A-N via email, text messaging, social network messaging, or generally any messaging system capable of communicating the ideas. The user A 120A may click on the activity header 818 to view the activity on their ideas over a period of time. The user A 120A may click on the myProfile tab in the vine tab 805 to view the data associated with their user profile.

Figure 8A:
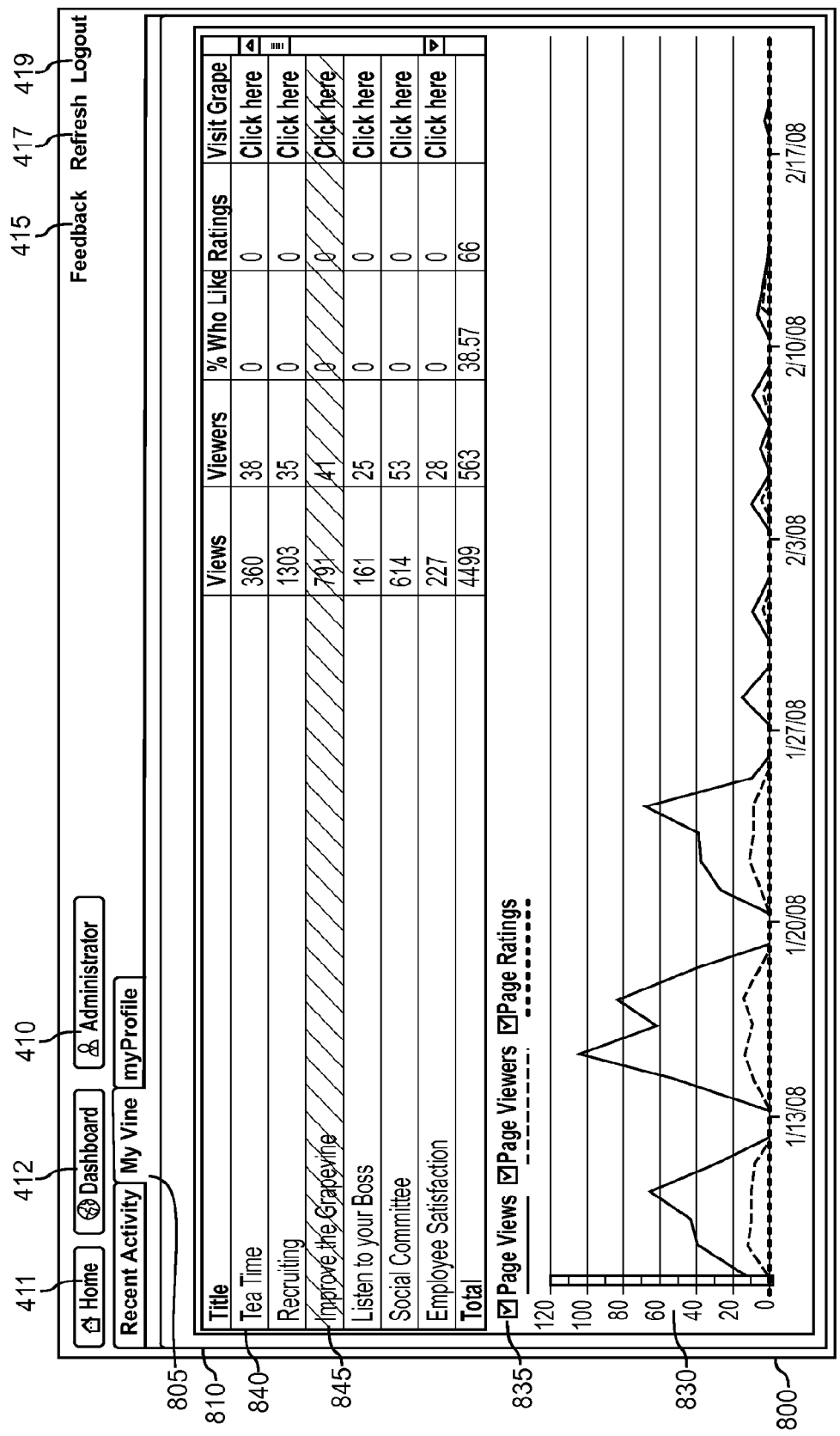
FIG. 8A is a screenshot of an alternative user dashboard screen displaying the my vine tab in the system of FIG. 1, or other systems for analyzing user activity in a collaborative environment.

FIG. 8A is a screenshot of an alternative user dashboard screen 800 displaying the my vine tab in the system of FIG. 1, or other systems for analyzing user activity in a collaborative environment. The system 100 may display the alternative user dashboard screen 800 to the user A 120A when the user A 120A clicks on the dashboard button 412. The user A 120A may use the alternative user dashboard screen 800 to obtain a quick overview of recent changes that have occurred in the system 100. The user A 120A may also use the alternative user dashboard screen 800 to view metrics regarding their use of the system 100 and the other users 120B-N use of the system 100. The alternative user dashboard screen 800 may include an admin button 410, a home button 411, a dashboard button 412, feedback link 415, a refresh link 417, a logout link 419, a vine tab 805, and charts subsection 810. The charts subsection 810 may include an initial item table 840, a selected initial item 845, a view graph 830 and view filters 835.

In operation the user A 120A may view their activity in the charts subsection 810. The initial item table 840 may display all of the initial items in the system 100 the user A 120A has provided responses or ratings for. Alternatively or in addition the initial item table 840 may display all of the initial items in the system 100. Alternatively or in addition the initial item table 840 may display all of the ideas in the system 100. The selected initial item 845 may be an initial item the user A 120A would like to view additional information for. The view graph 830, may display detailed information regarding the selected initial item 845. The user A 120A may user the view filters 835 to select on or more metrics of view for the selected item 845. For example, the user A 120A may view a graph of the page views for the selected item 845, the page viewers for the selected item 845, and/or the page ratings for the selected item 845. The user A 120A may click on the "click here" field in the "Visit Grape" column to view the associated initial item or idea.

Figure 9:
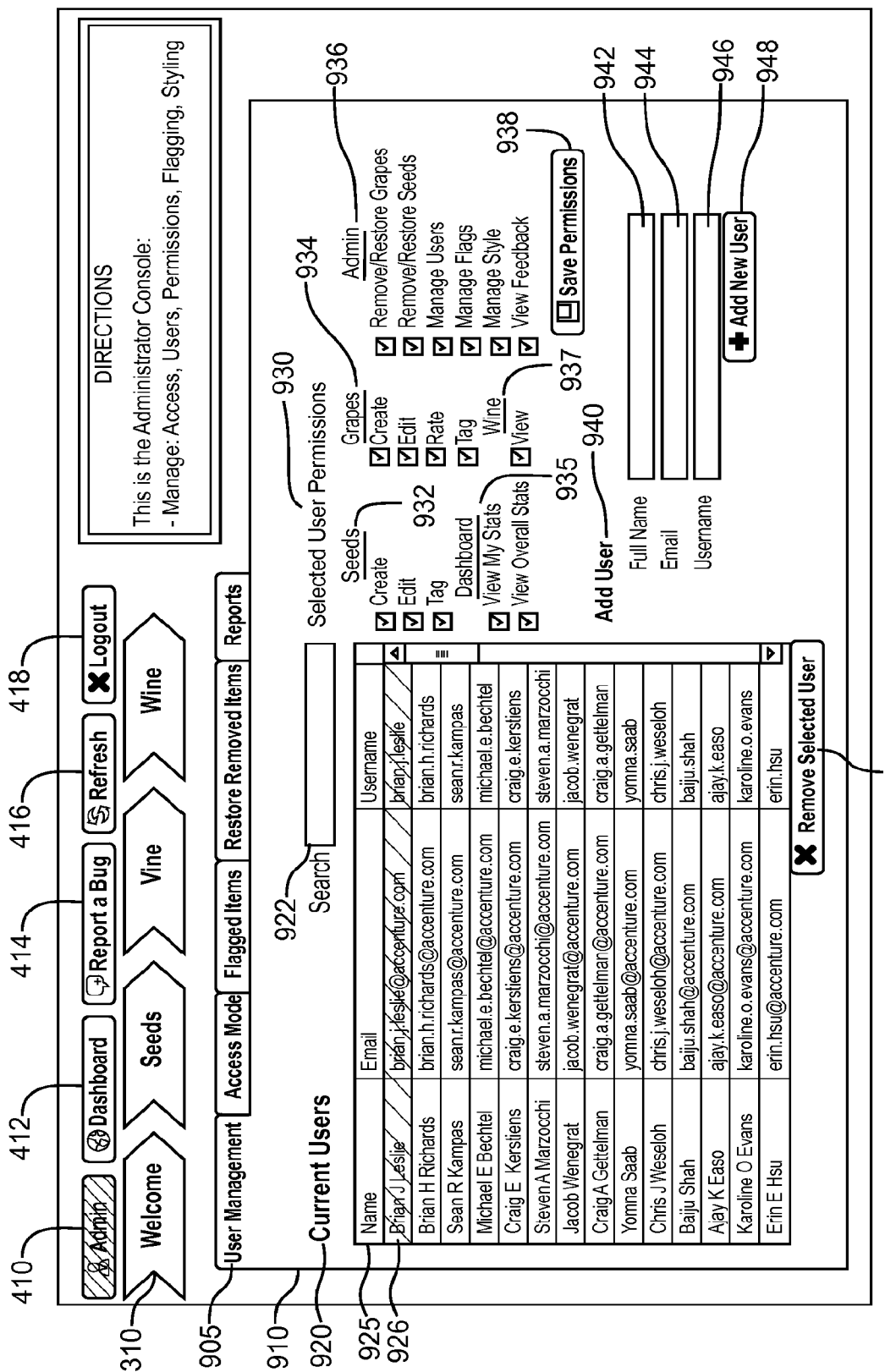
FIG. 9 is a screenshot of an administrator interface in the system of FIG. 1, or other systems for analyzing user activity in a collaborative environment.

FIG. 9 is a screenshot of an administrator interface 900 in the system of FIG. 1, or other systems for analyzing user activity in a collaborative environment. The system 100 may display the administrator interface 900 to the user A 120A when the user A 120A clicks on the admin button 410. The user A 120A may use the administrator interface 900 to view and modify the administrative data associated with the system 100. A user A 120A with administrator privileges may be taken directly to the administrator interface 900 upon logging into the system 100. The administrator interface 900 may include a navigation bar 310, an admin button 410, a dashboard button 412, a report a bug button 414, a refresh button 416, a logout button 418, an administrator tabset 905, a user management section 910, a current users subsection 920, a selected user permissions subsection 930, and an add user subsection 940. The current users subsection 920 may include a search field 922, a current users table 925, a selected user 926, and a remove selected user button 928. The selected users subsection 930 may include an initial items permissions 932, a grape ideas permissions 934, admin ideas permissions 936, and a save permissions button 938. The add user subsection 940 may include a full name field 942, an email field 944, a username field 946, and an add new user button 948. The administrator interface may be designed using ADOBE FLEX ACCORDION. Each accordion may contain controls similar in nature.

In operation one of the users 120A-N with administrator privileges, such as the user A 120A, may user the administrator interface 900 to modify or view the permissions of the users 120A-N. The user A 120A may search the current users table 925 by entering a name of a user in the search field 922. The user A 120A may remove the selected user 926 by clicking on the remove selected user button 928. The user A 120A may modify the permissions associated with the selected user 926 in the selected user permissions subsection 930. The user A 120A may select or deselect one or more of the initial item permissions 932, the grape idea permissions 934, the dashboard permissions 935, the admin permissions 936, and the wine permissions 937. The initial item permissions 932 may include create, edit, and tag permissions. The grape idea permissions 934 may include create, edit, rate, and tag permissions. The admin permissions 936 may include remove/restore grape ideas, remove/restore initial items, manage users, manage flags, manage style and view feedback permissions. The dashboard permissions 935 may include view my stats and view overall stats permissions. The wine permissions 937 may include view permissions. The user A 120A may affect the changes in permissions by clicking on the save permissions button 938.

The user A 120A may add a new user using the add user subsection 940. The user A 120A may enter the name of the new user in the name field 942, the email of the new user in the email field 944 and the username of the new user in the username field 946. The user A 120A may add the new user by clicking on the add new user button 948.

Alternatively or in addition the user A 120A may use the administrator interface 900 to change the color scheme or font size of the interface. The administrator interface 900 may also be used to generate reports. The administrator interface 900 may be used to add, change or remove branding, or generally add, change or remove any features of the system 100. The administrator interface 900 may be used to manage the access mode. The access mode may be open access, domain restricted access, admin added access, or admin approved access. If the system 100 is operating in open access any person may create an account and login. If the system 100 is operating in domain restricted access, only persons with email accounts in a certain domain may create an account and login. If the system 100 is operating in admin added mode, an administrator must add a user to a user list in order to grant access. If the system 100 is operating in admin approved mode an administrator must approve of a user's request for access to the system 100.

Figure 9A:
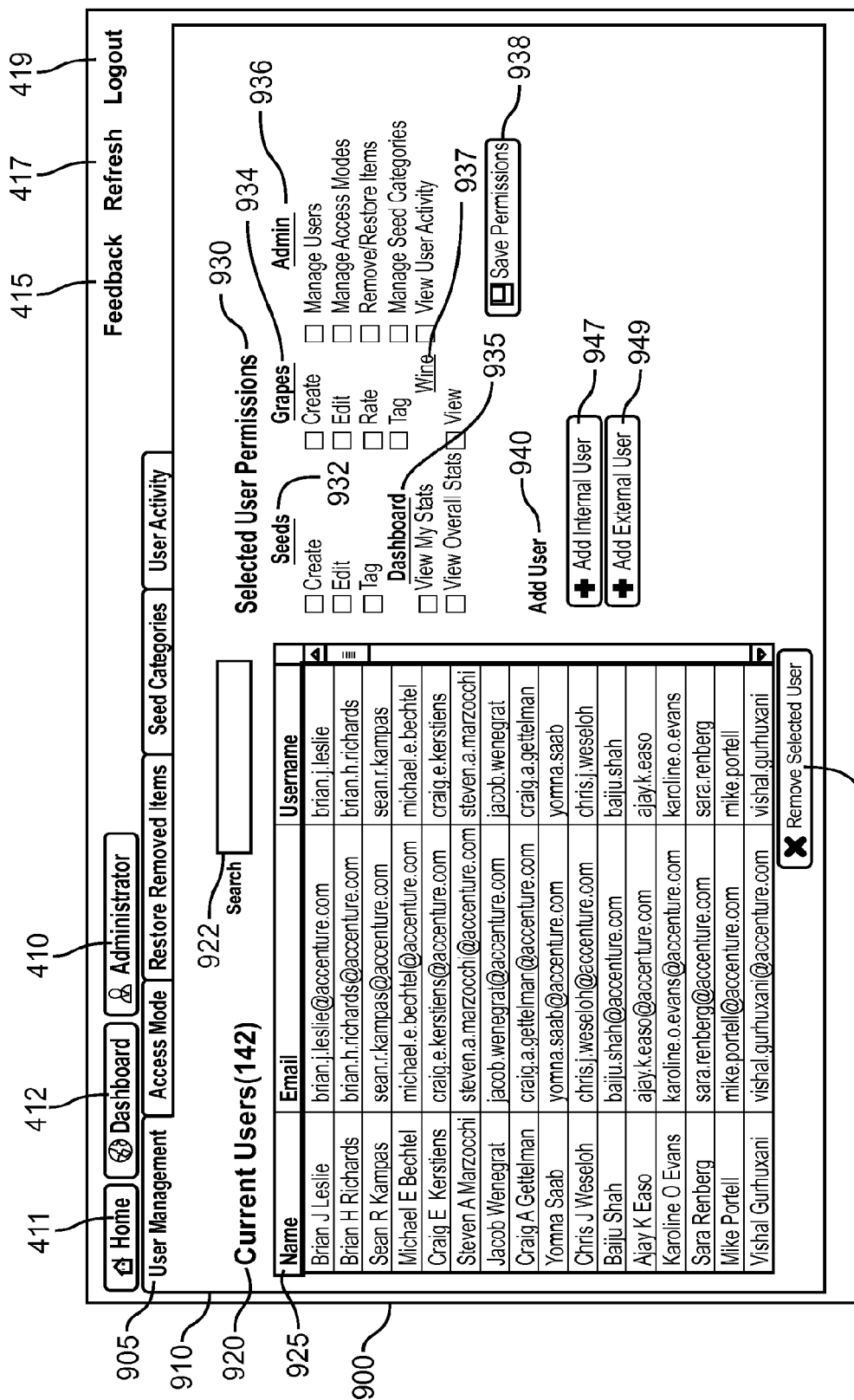
FIG. 9A is a screenshot of an alternative administrator interface in the system of FIG. 1, or other systems for analyzing user activity in a collaborative environment.

FIG. 9A is a screenshot of an alternative administrator interface 900 in the system of FIG. 1, or other systems for analyzing user activity in a collaborative environment. The system 100 may display the alternative administrator interface 900 to the user A 120A when the user A 120A clicks on the admin button 410. The user A 120A may use the alternative administrator interface 900 to view and modify the administrative data associated with the system 100. A user A 120A with administrator privileges may be taken directly to the alternative administrator interface 900 upon logging into the system 100. The alternative administrator interface 900 may include an admin button 410, a home button 411, a dashboard button 412, a feedback link 415, a feedback link 417, a logout link 419, an administrator tabset 905, a user management section 910, a current users subsection 920, a selected user permissions subsection 930, and a add user subsection 940. The current users subsection 920 may include a search field 922, a current users table 925, a selected user 926, and a remove selected user button 928. The selected users subsection 930 may include an initial items permissions 932, a grape ideas permissions 934, admin ideas permissions 936, and a save permissions button 938. The add user subsection 940 may include an add internal user button 947 and an add external user button 949. The administrator interface may be designed using ADOBE FLEX ACCORDION. Each accordion may contain controls similar in nature.

In operation one of the users 120A-N with administrator privileges, such as the user A 120A, may user the administrator interface 900 to modify or view the permissions of the users 120A-N. The user A 120A may search the current users table 925 by entering a name of a user in the search field 922. The user A 120A may remove the selected user 926 by clicking on the remove selected user button 928. The user A 120A may modify the permissions associated with the selected user 926 in the selected user permissions subsection 930. The user A 120A may select or deselect one or more of the initial item permissions 932, the grape idea permissions 934, the dashboard permissions 935, the admin permissions 936, and the wine permissions 937. The initial item permissions 932 may include create, edit, and tag permissions. The grape idea permissions 934 may include create, edit, rate, and tag permissions. The admin permissions 936 may include remove/restore grape ideas, remove/restore initial items, manage users, manage flags, manage style and view feedback permissions. The dashboard permissions 935 may include view my stats and view overall stats permissions. The wine permissions 937 may include view permissions. The user A 120A may affect the changes in permissions by clicking on the save permissions button 938.

The user A 120A may add a new user using the add user subsection 940. The user A 120A may click on the add internal user button 947 to add a new internal user and the add external user button 949 at add a new external user. An internal user may be a member of the organization or the collaborative environment while an external user may be a person external to the organization. The external users may, by default, be given more restrictive user permissions.

Alternatively or in addition the user A 120A may use the administrator interface 900 to change the color scheme or font size of the interface. The administrator interface 900 may also be used to generate reports. The administrator interface 900 may be used to add, change or remove branding, or generally add, change or remove any features of the system 100. The administrator interface 900 may be used to manage the access mode. The access mode may be open access, domain restricted access, admin added access, or admin approved access. If the system 100 is operating in open access any person may create an account and login. If the system 100 is operating in domain restricted access, only persons with email accounts in a certain domain may create an account and login. If the system 100 is operating in admin added mode, an administrator must add a user to a user list in order to grant access. If the system 100 is operating in admin approved mode an administrator must approve of a user's request for access to the system 100.

Figure 9B:
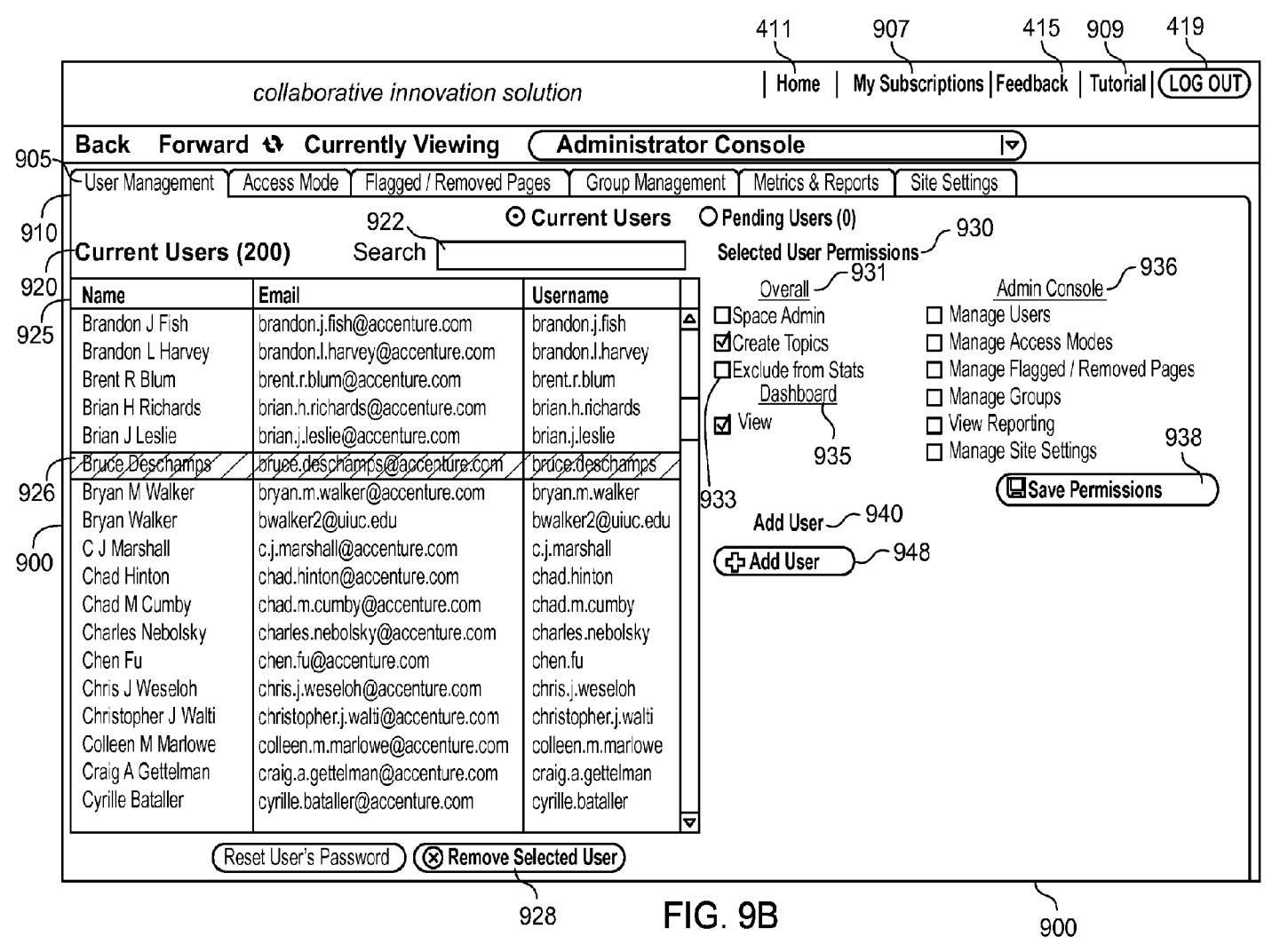

FIG. 9B is a screenshot of an alternative administrator interface 900 in the system of FIG. 1, or other systems for analyzing user activity in a collaborative environment. The user A 120A may use the alternative administrator interface 900 to exclude the activity of one or more administrators in the collaborative innovation system from the statistics derived from user activity data. A user A 120A with administrator privileges may be taken directly to the alternative administrator interface 900 upon logging into the system 100. The administrator interface 900 may include a home button 411, a my subscriptions link 907, feedback link 415, a tutorial link 909, a logout link 419, an administrator tabset 905, a user management section 910, a current users subsection 920, a selected user permissions subsection 930 and an add user subsection 940. The current users subsection 920 may include a search field 922, a current users table 925, a selected user 926, and a remove selected user button 928. The selected users subsection 930 may include an overall permissions 931, an exclude user checkbox 933, a dashboard permissions 935, an admin permissions 936, and a save permissions button 938. The add user subsection 940 may include an add user button 948. The administrator interface may be designed using ADOBE FLEX ACCORDION. Each accordion may contain controls similar in nature.

In operation one of the users 120A-N with administrator privileges, such as the user A 120A, may use the administrator interface 900 to modify or view the permissions of the users 120A-N. The user A 120A may search the current users table 925 by entering a name of a user in the search field 922. The user A 120A may remove the selected user 926 by clicking on the remove selected user button 928. The user A 120A may modify the permissions associated with the selected user 926 in the selected user permissions subsection 930. The user A 120A may select or deselect one or more of the overall permissions 931, the dashboard permissions 935 and the admin permissions 936. The overall permissions 931 may include a space admin, create topics, and exclude user permissions. The user A 120A may select the exclude user permission by clicking on the exclude user checkbox 933. The exclude user permission may cause the activity of the selected user 926 from being included in statistics related to user activity, such as reports and scores. The admin permissions 936 may include manage users, manage access modes, manage flagged/removed pages, manage groups, view reporting, and manage site settings permissions. The dashboard permissions 935 may include view permissions. The user A 120A may affect the changes in permissions by clicking on the save permissions button 938.

Figure 10:
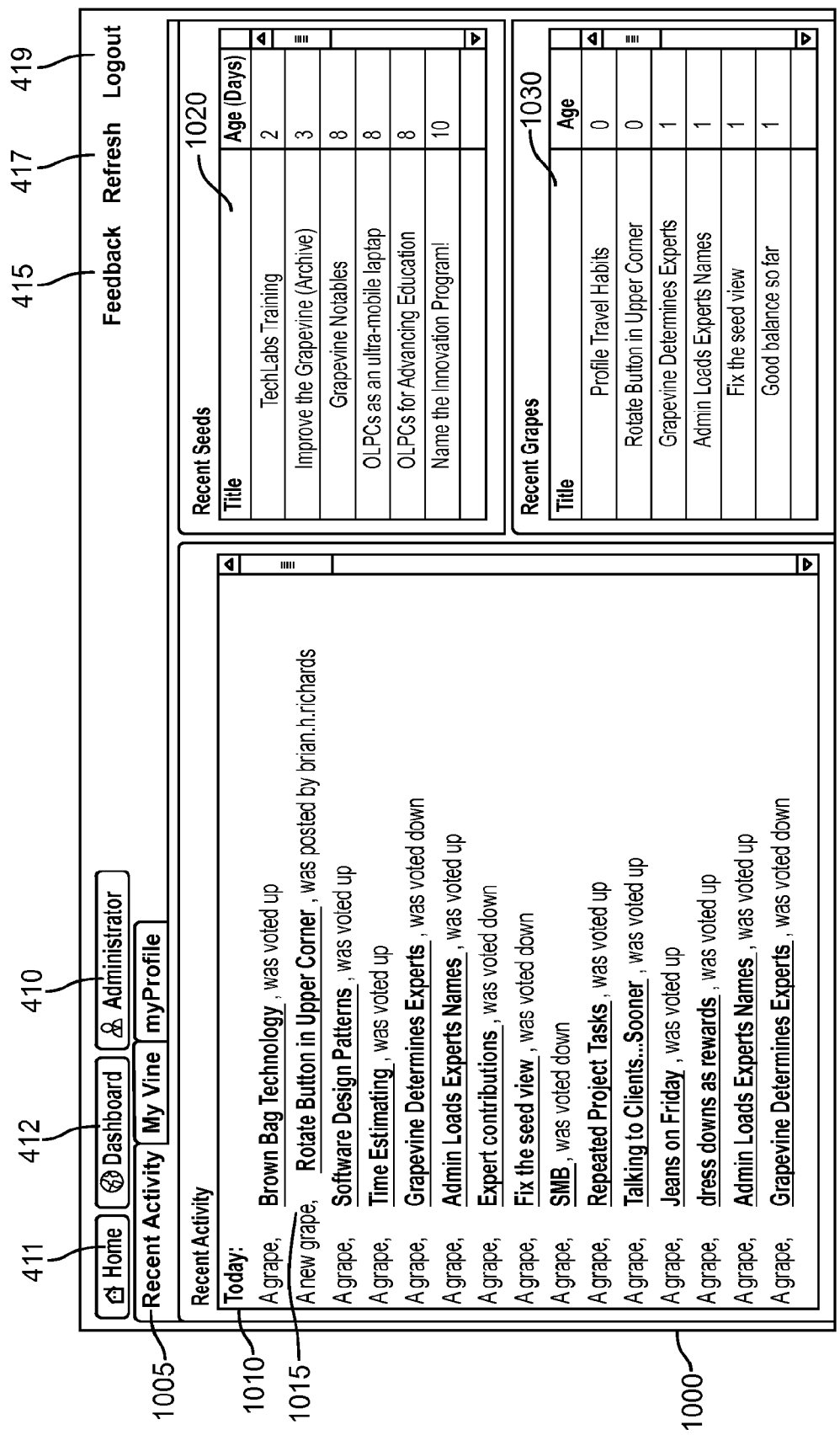
FIG. 10 is a screenshot of a recent activity screen in the system of FIG. 1, or other systems for analyzing user activity in a collaborative environment.

FIG. 10 is a screenshot of a recent activity screen 1000 in the system of FIG. 1, or other systems for analyzing user activity in a collaborative environment. The system 100 may display the recent activity screen 1000 to the user A 120A when the user A 120A clicks on the dashboard button 412 and the clicks on the recent activity tab 1005. Alternatively or in addition the system 100 may display the recent activity screen 1000 to the user A 120A when the user A 120A clicks on the dashboard button 412. The user A 120A may use the recent activity screen 1000 to view the recent activity in the system 100. The recent activity screen 1000 may include an admin button 410, a home button 411, a dashboard button 412, feedback link 415, a refresh link 417, a logout link 419, a recent activity display 1010, a recent seed table 1020 and a recent grape table 1030. The recent activity display 1010 may include a list of items or ideas.

In operation, the user A 120A may view the activity of the idea in the system in the recent activity display 1010. The recent activity display 1010 may indicate when a particular idea has received many positive ratings, or when a particular idea has received many negative ratings. The recent activity display 1010 may display the ideas, the activity on the ideas, and any associated information, such as the person who posted the idea. The user A 120A may click on one of the ideas to view the idea.

The recent seeds table 1020 may display the recent initial items added to the system 100. The user A 120A may click on one of the initial items to view the initial item. The recent seeds table 1020 may also display the age of the initial item. The recent grapes table 1030 may display the recent ideas added to the system. The recent grapes table 1030 may display the age of the ideas, such as in days. The user A 120A may click on one of the ideas to view, enhance, or rate the idea.

Figure 11:
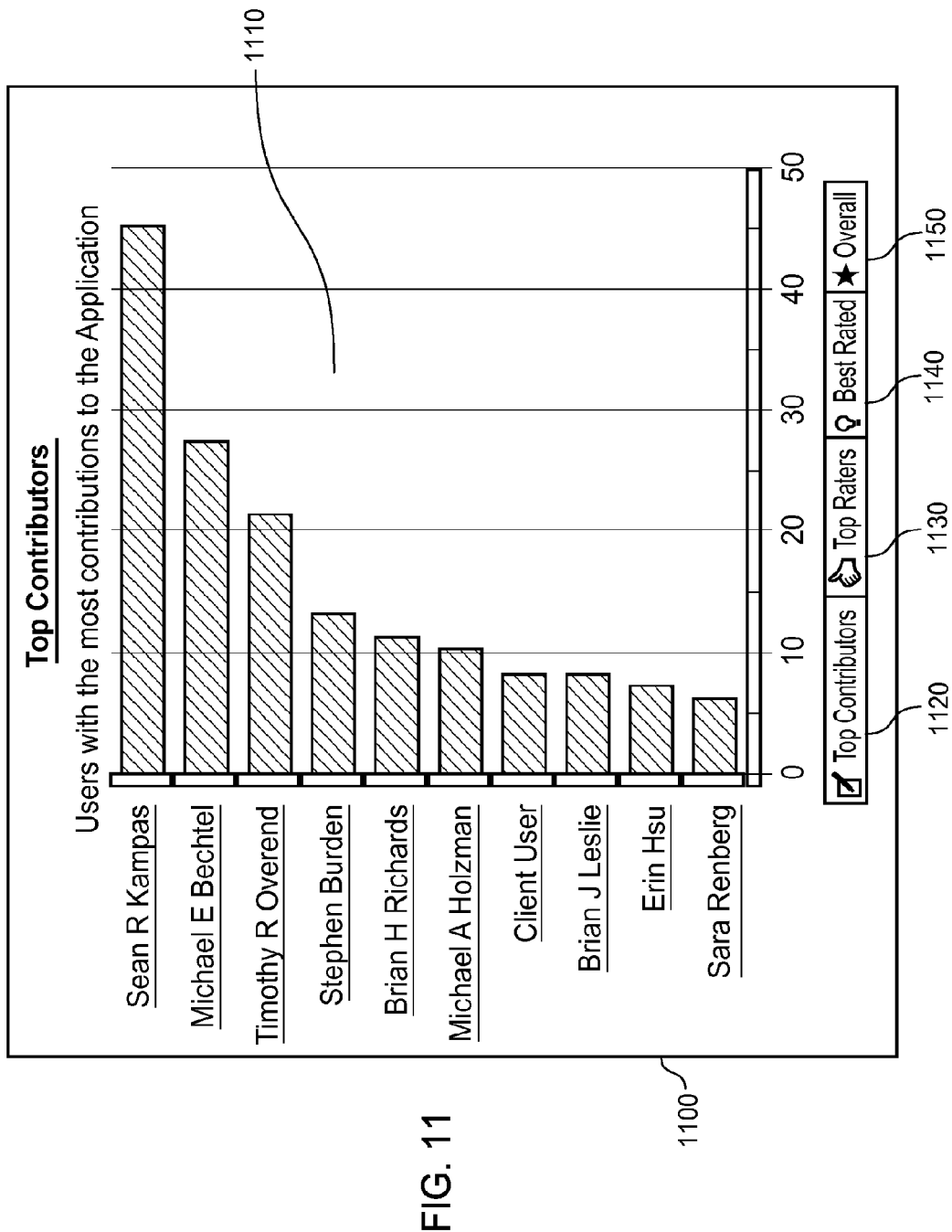
FIG. 11 is a screenshot of a reporting screen in the system of FIG. 1, or other systems for analyzing user activity in a collaborative environment.

FIG. 11 is a screenshot of a reporting screen 1100 in the system of FIG. 1, or other systems for analyzing user activity in a collaborative environment. The reporting screen 1100 includes a graphical representation 1110, a top contributors button 1120, a top raters button 1130, a best rated button 1140, and an overall button 1150. The system 100 may transform user activity data into the graphical representation 1110, and may provide the graphical representation 1110 to an administrator. The user activity data displayed in the graphical representation 1110 may exclude the activity of any users associated with an indication of exclusion. For example, if the exclude user checkbox 933 is selected in FIG. 9B, the activity of the selected user 926 may be excluded from the graphical representation 1110. The administrator may click on the top contributors button 1120, top raters button 1130, best rated button 1140 and overall button 1150 to change the user activity data displayed in the graphical representation 1110.

Figure 12:
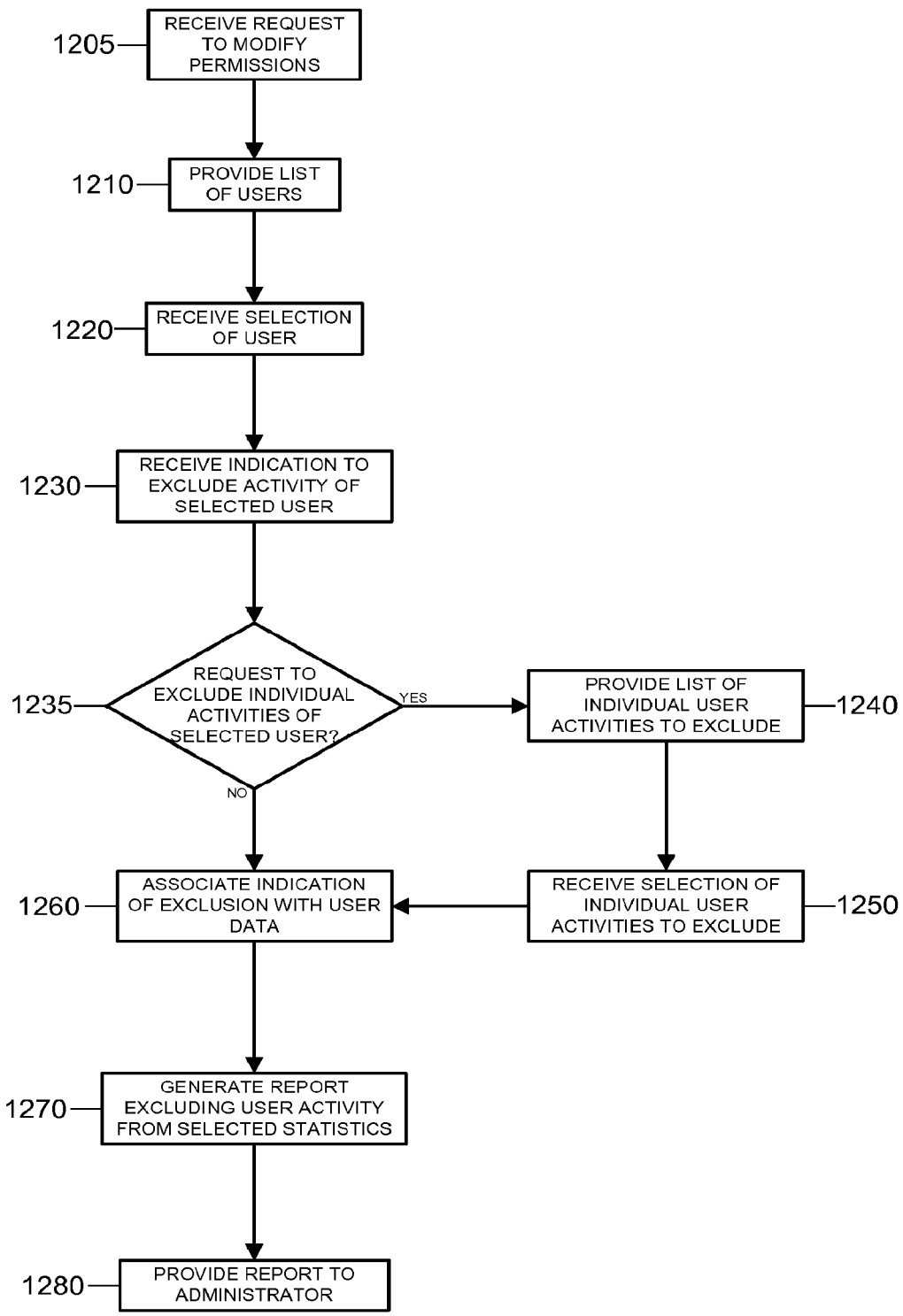
FIG. 12 is a flowchart illustrating the operations of excluding the activity of a user from reports derived from user activity data in the system of FIG. 1, or other systems for analyzing user activity in a collaborative environment.

FIG. 12 is a flowchart illustrating the operations of excluding the activity of a user from reports derived from user activity data in the system of FIG. 1, or other systems for analyzing user activity in a collaborative environment. The steps of FIG. 12 are described as being performed by the service provider server 240. However, the steps may be performed by the operating system of the service provider server 240, a processor of the service provider server 240, any other hardware component of the server 240, or any combination thereof. Alternatively the steps may be performed by an external hardware component, an external software process, or any combination thereof.

At step 1205, the service provider server 240 receives a request to modify user permissions, such as a request received from a device of an administrator. At step 1210, the service provider server 240 provides a list of users in the system 100, such as the user table 925, to the device of the administrator. At step, 1220, the service provider server 240 receives a selection a user from the administrator, via the device of the administrator. For example, the administrator may select a user from the user table 925 in the alternative administrator interface 900 of FIG. 9B. Alternatively, the administrator may select multiple users from the user table 925. At step 1230, the service provider server 240 receives an indication that the activity of the selected user should be excluded from the user activity data. For example, the administrator may check on the exclude user checkbox 933 in the alternative administrator interface 900 of FIG. 9B.

At step 1235, the service provider server 240 may determine whether the administrator has requested to exclude individual activities of the user from the user activity data, as opposed to excluding all activities of the user from the user activity data. For example, the administrator may wish to exclude the viewing activity of the selected user from the user activity data, but not the rating activity of the selected user. The alternative administrator interface 900 of FIG. 9B may include a checkbox for requesting to exclude individual activities of the user from the user activity data. In this example, the administrator may click on the checkbox to request excluding individual activities of the selected user from user activity data.

If, at step 1235, the service provider server 240 receives a request to exclude individual activities of the selected user from the user activity data, the service provider server 240 moves to step 1240. At step 1240, the service provider server 240 retrieves a list of individual user activities. The individual user activities may include viewing a page, viewing an idea, rating an idea, contributing an idea, or generally any action that can be performed by a user in a collaborative innovation system. At step 1250, the service provider server 240 may receive a selection of one or more individual activities of the user to exclude from the user activity data.

If, at step 1235, the service provider server 240 does not receive a request to exclude individual activities of the selected user from the user activity data, the service provider server 240 moves to step 1260. At step 1260, the service provider server 240 may associate an exclusion indication, such as an exclusion flag, to the data describing the selected user in the data store 245. If individual user activities were selected for exclusion, the service provider server 240 may include an indication of exclusion for each excluded activity.

At step 1270, the service provider server 240 may generate one or more reports describing the activity of the users in the collaborative innovation system. The reports may exclude the activity of any user whose user data is associated with an indication of exclusion. Alternatively, the service provider server 240 may generate one or more scores based on views or ratings. The scores may exclude the views or ratings of any user whose user data is associated with an indication of exclusion. At step 1280, the service provider server 240 may provide the report to the administrator, such as via the device of the administrator.

Figure 13:
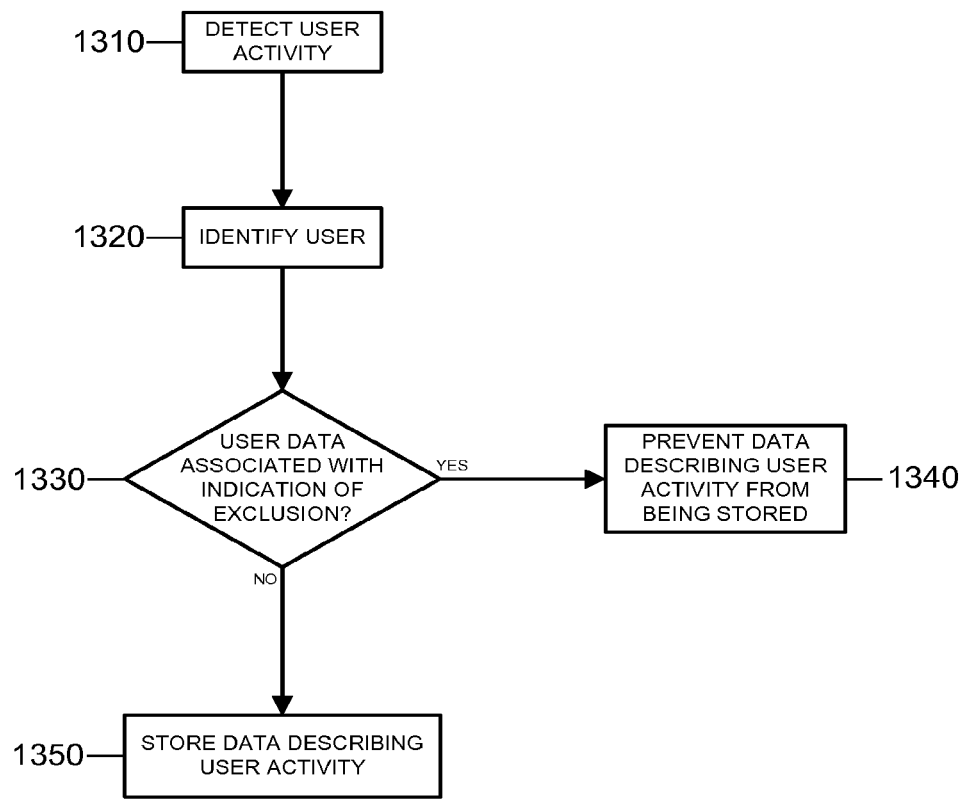
FIG. 13 is a flowchart illustrating the operations of preventing activity of a user from being stored in the system of FIG. 1, or other systems for analyzing user activity in a collaborative environment.

FIG. 13 is a flowchart illustrating the operations of preventing activity of a user from being stored in the system of FIG. 1, or other systems for analyzing user activity in a collaborative environment. The steps of FIG. 13 are described as being performed by the service provider server 240. However, the steps may be performed by the operating system of the service provider server 240, a processor of the service provider server 240, any other hardware component of the server 240, or any combination thereof. Alternatively the steps may be performed by an external hardware component, an external software process, or any combination thereof.

At step 1310, the service provider server 240 may detect user activity in the collaborative innovation system. For example, one of the users 120A-N may be viewing an idea, rating an idea, creating an idea, or may generally be performing any action relevant to the collaborative innovation system. The service provider server 240 may detect user activity by monitoring log files, or log tables stored in the data store 245. The service provider server 240 may add a row to a log table in the data store 245 for each activity or action performed by the users 120A-N. At step 1320, the service provider server 240 may identify the user who is engaging in the activity. At step 1330, the service provider server 240 may determine whether user data describing the user has been associated with an indication of exclusion. The user data may be stored in a user table in the data store 245. An indication of exclusion may indicate that the activity of the user should be excluded or removed from the log table and any other data describing the activity of the users 120A-N.

If, at step 1330, the service provider server 240 determines that the user data has been associated with an indication of exclusion, the service provider server moves to step 1340. At step 1340, the service provider server 240 prevents the activity of the user from being stored in the data store 245, such as in a log table of the data store 245. Since the activity of the user is not stored in the data store 245, the user can access the site without affecting the statistics, scores, or other metrics associated with user activity in the collaborative innovation system.

If, at step 1330, the service provider server 240 determines that the user data has not been associated with an indication of exclusion, the service provider server 240 moves to step 1350. At step 1350, the service provider server 240 stores data describing the activity of the user in the data store 245, such as in a log table of the data store 245. Since data describing the activity of the user is stored in the data store 245, the data can be used for determining statistics, scores, or other metrics associated with user activity in the collaborative innovation system. However, the activity of the user can be excluded from the statistics, scores or other metrics at the time the statistics, scores or other metrics are determined, as discussed in more detail in FIG. 14 below.

Figure 14:
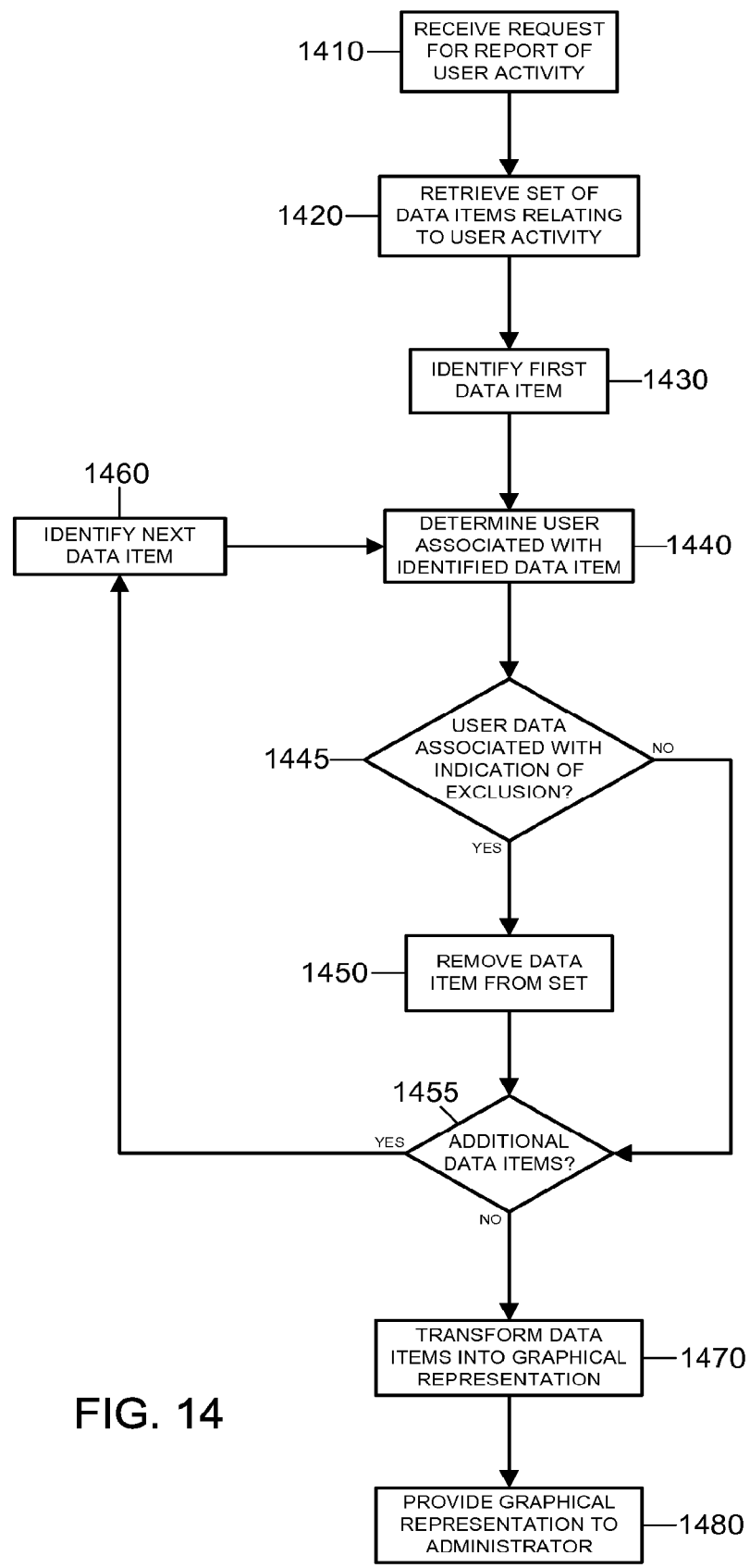
FIG. 14 is a flowchart illustrating the operations of excluding the activity of a user from reporting data in the system of FIG. 1, or other systems for analyzing user activity in a collaborative environment.

FIG. 14 is a flowchart illustrating the operations of excluding the activity of a user from reporting data in the system of FIG. 1, or other systems for analyzing user activity in a collaborative environment. The steps of FIG. 14 are described as being performed by the service provider server 240. However, the steps may be performed by the operating system of the service provider server 240, a processor of the service provider server 240, any other hardware component of the server 240, or any combination thereof. Alternatively the steps may be performed by an external hardware component, an external software process, or any combination thereof.

At step 1410, the service provider server 240 may receive a request for a report of user activity. The requested user activity may include one or more of usage statistics of the users 120A-N, such as page views, scores or ratings of ideas provided by the users 120A-N, or generally any information describing the activity of the users 120A-N in the collaborative innovation system. At step 1420, the service provider server 240 may retrieve a set of data items describing the activity of the users 120A-N in the collaborative innovation system. The set of data items may describe page views of the users 120A-N, ratings provided by the users 120A-N, ideas or other content provided by the users 120A-N, or generally any data items describing activity of the users 120A-N in the collaborative innovation system.

At step 1430, the service provider server 240 may identify the first data item from the set of data items. At step 1440, the service provider server 240 may determine the user associated with the identified data item. The user associated with the identified data item may be the user who performed the activity described by the data item. At step 1445, the service provider server 240 determines whether user data describing the determined user is associated with an indication of exclusion. If the user data of the user is associated with an indication of exclusion, the service provider server 240 moves to step 1450. At step 1450, the service provider server 240 removes the data item from the set of data items. By removing the data item from the set of data items, the service provider server 240 can prevent the activity of the user from being included in the requested report.

If, at step 1445, the service provider server 240 determines that the user data is not associated with an indication of exclusion, the service provider server 240 moves to step 1455. At step 1455, the service provider server 240 determines whether there are additional data items in the set of data items. If the service provider server 240 determines there are additional data items in the set of data items, the service provider server 240 moves to step 1460. At step 1460, the service provider server 240 identifies the next data item in the set of data items. The service provider server 240 repeats steps 1440-1455 for each remaining data item in the set of data items.

Once all of the data items have been processed, the service provider server 240 moves to step 1470. At step 1470, the service provider server 240 transforms the data items into a graphical representation, such as the graph in FIG. 11. At step 1480, the service provider server 240 provides the graphical representation in a report to an administrator, such as via a device of the administrator.

Figure 15:
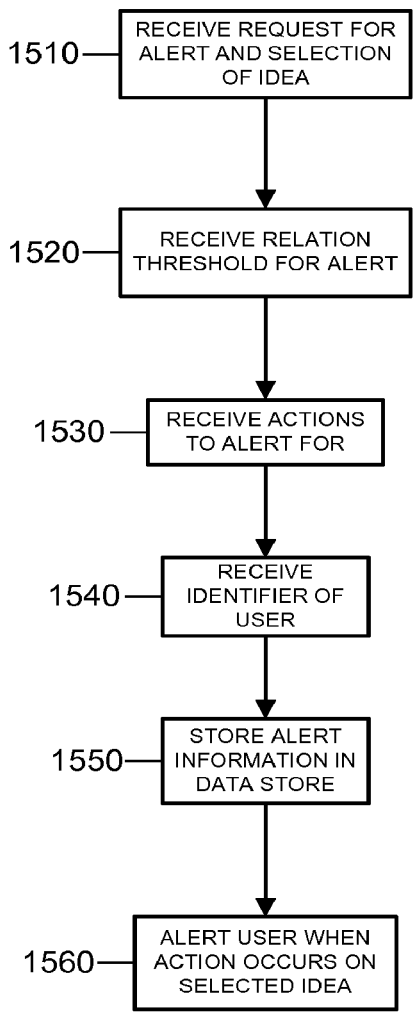
FIG. 15 is a flowchart illustrating the operations of creating an alert in the system of FIG. 1, or other systems for analyzing user activity in a collaborative environment.

FIG. 15 is a flowchart illustrating the operations of creating an alert in the system of FIG. 1, or other systems for analyzing user activity in a collaborative environment. The steps of FIG. 15 are described as being performed by the service provider server 240. However, the steps may be performed by the operating system of the service provider server 240, a processor of the service provider server 240, any other hardware component of the server 240, or any combination thereof. Alternatively the steps may be performed by an external hardware component, an external software process, or any combination thereof.

At step 1510, the service provider server 240 receives a request for an alert from a user and a selection of content, such as an idea, associated with the alert. For example, the user may wish to be alerted to actions performed on the idea, such as when another user enhances the idea. At step 1520, the service provider server 240 may receive a relation threshold from the user. The relation threshold may identify ideas related to the selected idea for which the user would also like to be alerted to. For example, the user may wish to be alerted to actions performed on the selected idea, and actions performed on any ideas related to the selected idea. Alternatively the relation threshold may describe a specific relationship between the selected idea and related ideas, such as child ideas, parent ideas, or generally any relationship between the selected idea and related ideas. The graphical collaborative display 635 of FIG. 6 provides a visual depiction of relationships between multiple ideas.

At step 1530, the service provider server 240 receives an indication of actions to be alerted for. The actions may describe activity related to the selected idea the user wishes to be alerted for, such as enhancements to the idea, modifications to the idea, deletion of the idea, or generally any action which may be performed on the idea. For example, in the graphical collaborative display 635 of FIG. 6, an enhancement to an idea may occur when another idea is built off of the idea.

At step 1540, the service provider server 240 may receive an identifier for alerting the user. The identifier may be any information which allows the service provider server 240 to provide the alerts to the user. For example, the identifier may be an email address of the user, a phone number of the user, an instant messenger identifier of the user, a social network identifier of the user, such as a FACEBOOK® identifier, or generally any identifier which allows the service provider server 240 to provide an alert to the user. At step 1550, the service provider server 240 stores the alert and the associated data, such as the relation threshold, the actions, and the identifier, in the data store 245. At step 1560, the service provider server 240 provides an alert to the user when one of the actions identified by the user occurs on the selected content. Alternatively or in addition the service provider server 240 may provide the alert to the user when an action occurs on content related to the selected content which satisfies the relation threshold. The steps of providing an alert are discussed in more detail in FIG. 16 below.

Figure 16:
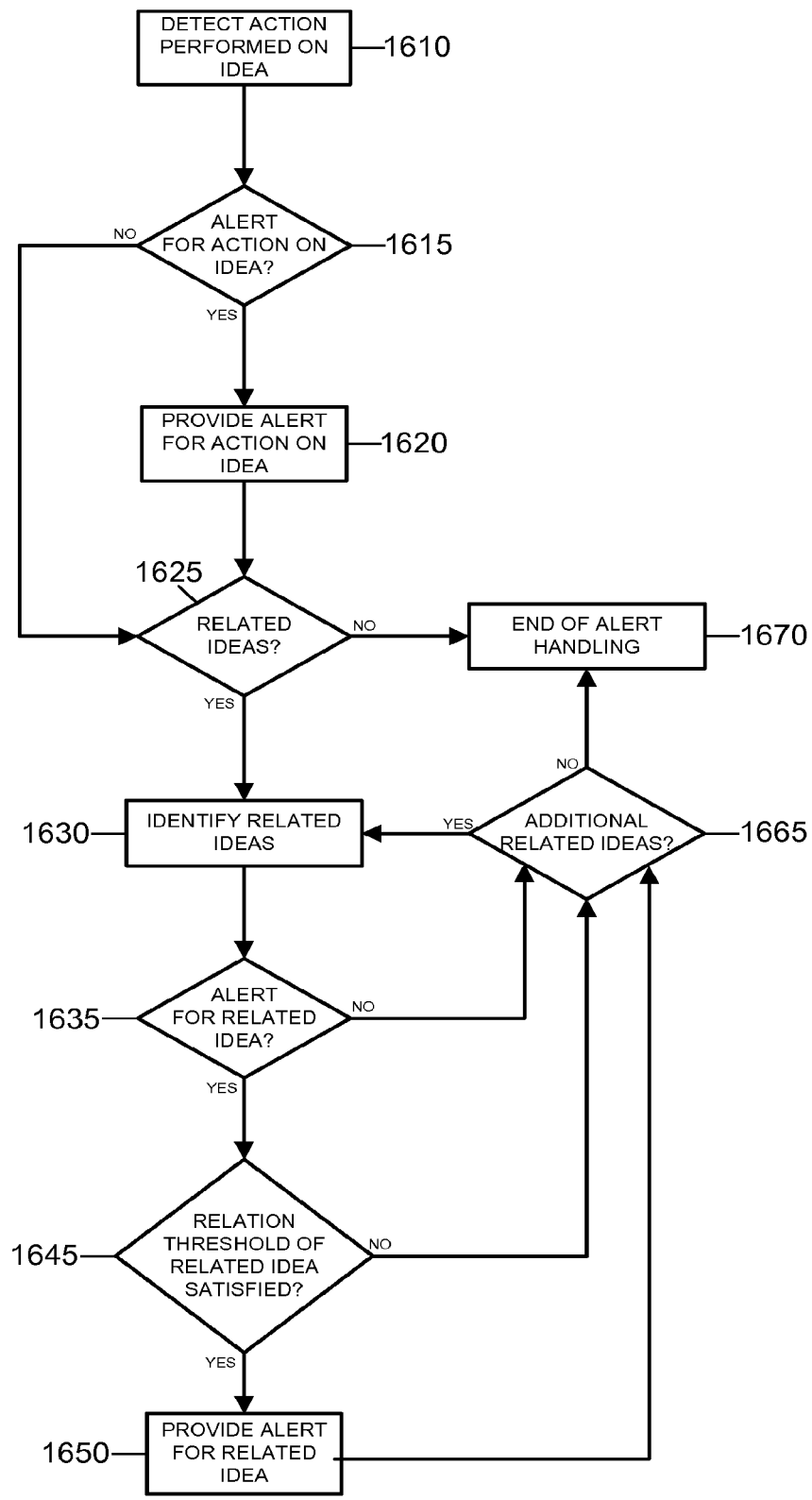
FIG. 16 is a flowchart illustrating the operations of alerting a user in the system of FIG. 1, or other systems for analyzing user activity in a collaborative environment.

FIG. 16 is a flowchart illustrating the operations of alerting a user in the system of FIG. 1, or other systems for analyzing user activity in a collaborative environment. The steps of FIG. 16 are described as being performed by the service provider server 240. However, the steps may be performed by the operating system of the service provider server 240, a processor of the service provider server 240, any other hardware component of the server 240, or any combination thereof. Alternatively the steps may be performed by an external hardware component, an external software process, or any combination thereof.

At step 1610, the service provider server 240 detects an action performed on content, such as an idea, in the collaborative innovation system. The action performed on the idea may include modifying the idea, enhancing the idea, or deleting the idea. At step 1615, the service provider server 240 determines whether at least one alert is associated with the idea and the action performed on the idea in the data store 245. For example, if the idea was deleted, the service provider server 240 may determine whether at least one user requested to be alerted to a deletion of the idea. If, at step 1615, the service provider server 240 determines that at least one alert is associated with the idea in the data store 245, the service provider server 240 moves to step 1620. At step 1620, the service provider server 240 retrieves the alert from the data store 245 and provides the alert to the user via the identifier associated with the alert. For example, if the identifier is an email address, the service provider server 240 may email the alert to the user.

If, at step 1615, the service provider server 240 determines that there is no alert associated with the idea and the action performed on the idea, the service provider server 240 moves to step 1625. At step 1625, the service provider server 240 determines whether there are any ideas related to the idea the action was performed on. For example, the service provider server 240 may determine whether there are any child ideas, parent ideas, or ideas otherwise related to the idea the action was performed on. If, at step 1625, the service provider server 240 determines that related ideas exist in the collaborative innovation system, the service provider server 240 moves to step 1630. At step 1630, the service provider server 240 identifies all of the ideas related to the idea the action was performed on. At step 1635, the service provider server 240 determines whether an alert is associated with a related idea in the data store 245 for the action performed on the idea. For example, if the idea was deleted, the service provider server 240 may determine whether there is an alert associated with the related idea for the action of deletion.

If, at step 1635, the service provider server 240 determines that an alert exists for the action and the related idea, the service provider server 240 moves to step 1645. At step 1645, the service provider server 240 determines whether the relationship between the idea the action was performed on and the related idea satisfies the relation threshold for the alert of the related idea. For example, if the relation threshold of the alert indicates that the user should be alerted to actions performed on any child ideas, and the related idea is a parent of the idea the action was performed on, then the relation threshold would be satisfied by the relationship between the related idea and the idea the action was performed on. If, at step 1645, the service provider server 240 determines that the relationship between the related idea and the idea the action was performed on satisfies the relation threshold for the alert, then the service provider server 240 moves to step 1650.

At step 1650, the service provider server 240 provides the alert to the user based on the relation threshold of the related idea. Since the alert is associated with the related idea, and not the idea the action was performed on, the alert may include an indication of the relationship between the idea the action was performed on and the related idea. For example, if the idea the action was performed on is a child idea to the related idea, then the service provider server 240 may include a notification with the alert indicating that idea the action was performed on is a child of the idea associated with the alert.

If, at step 1635, the service provider server 240 determines that there is no alert associated with the related idea, or if, at step 1645, the service provider server 240 determines that the alert threshold is not satisfied by the relationship between the idea the action was performed on and the related idea, then the service provider server 240 moves to step 1665. At step 1665, the service provider server 240 determines whether there are any additional related ideas. If, at step 1665, the service provider server 240 determines that there are additional related ideas, then the service provider server 240 repeats steps 1630-1650 for each additional related idea. Once the service provider server 240 processes all of the related ideas, the service provider server 240 moves to step 1670. At step 1670, the alert handling operation is complete.

Figure 17:
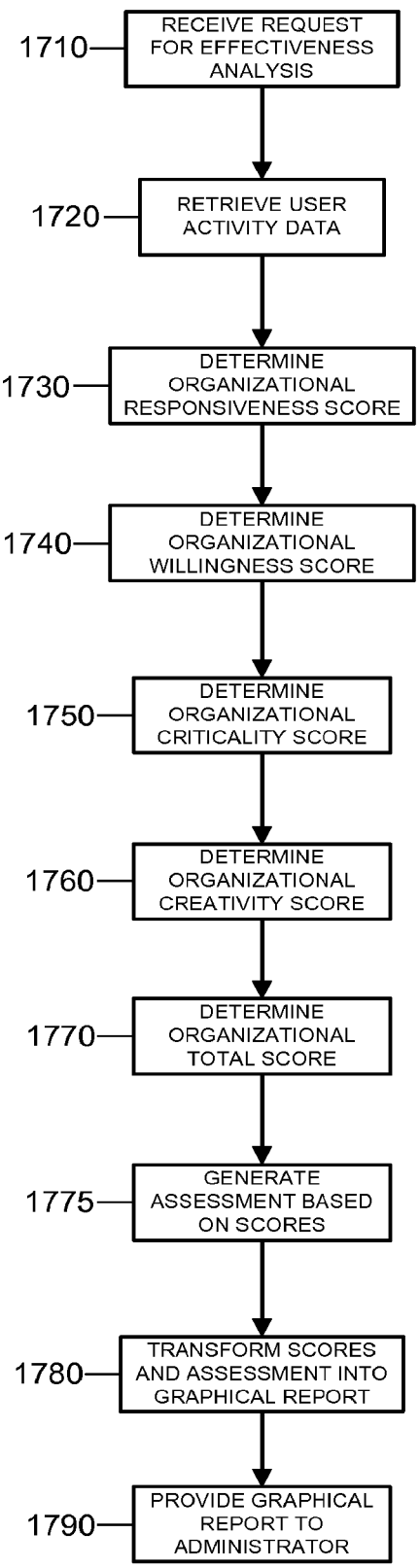
FIG. 17 is a flowchart illustrating the operations of determining the effectiveness of an organization in a collaborative environment in the system of FIG. 1 or other systems for analyzing user activity in a collaborative environment.

FIG. 17 is a flowchart illustrating the operations of determining the effectiveness of an organization in a collaborative environment in the system of FIG. 1 or other systems for analyzing user activity in a collaborative environment. The steps of FIG. 17 are described as being performed by the service provider server 240. However, the steps may be performed by the operating system of the service provider server 240, a processor of the service provider server 240, any other hardware component of the server 240, or any combination thereof. Alternatively the steps may be performed by an external hardware component, an external software process, or any combination thereof.

At step 1710, the service provider server 240 receives a request for an organizational effectiveness analysis. For example, an administrator may click on a link in one of the screens illustrated in FIGS. 3-11 to request an organizational effectiveness analysis. The organizational effectiveness analysis may indicate the effectiveness of the organization in participating in a collaborative environment. For example, a collaborative innovation system may be deployed for an organization on a trial basis. Upon the completion of the trial basis, an administrator may request an organizational effectiveness analysis to determine whether the organization was able to effectively utilize the collaborative innovation system.

At step 1720, the service provider server 240 retrieves the user activity data for users of the organization. The user activity data may describe the number of users who were invited to access the collaborative environment, the number of users who accessed the collaborative environment, the number of users who read at least one idea in the collaborative environment, the number of users who rated at least one idea in the collaborative environment, and the number of users who contributed at least one idea to the collaborative environment. At step 1730, the service provider server 240 determines an organizational responsiveness score. The organizational responsiveness score may represent the responsiveness of the users in the organization to an invitation to participate in a collaborative environment. The organizational responsiveness score may be determined by dividing the number of users who entered the collaborative innovation environment by the number of users who were invited to participate in the collaborative environment.

At step 1740, the service provider server 240 may determine an organizational willingness score. The organizational willingness score may indicate the willingness of the users of the organization to participate in the collaborative environment. The organizational willingness score may be determined by dividing the number of users who read at least one idea in the collaborative environment by the number of users who entered the collaborative environment. At step 1750, the service provider server 240 may determine the organizational criticality score. The organizational criticality score may represent whether the users of the organization are critical of ideas provided by other users. The service provider server 240 may determine the organizational criticality score by dividing the number of users who rated at least one idea in the collaborative environment by the number of users who viewed at least one idea in the collaborative environment.

At step 1760, the service provider server 240 may determine the organizational creativity score. The organizational creativity score may represent the creativeness of the users in the organization. The organizational creativity score may be determined by dividing the number of users who created at least one idea in the collaborative environment by the number of users who entered into the collaborative environment. Alternatively or in addition each of the scores may be multiplied by one hundred in order to represent the scores as percentages. At step 1770, the service provider server 240 may determine an organizational total score based on the organizational responsiveness score, the organizational willingness score, the organizational criticality score, and the organizational creativity score. For example, the organizational total score may be determined by adding each of the individual scores. Alternatively or in addition the organizational total score may be determined by multiplying each of the organizational scores by a weight, such as 0.25, and then summing the weighted organizational scores.

At step 1775, the service provider server 240 may generate an assessment based on the organizational scores. The assessment may describe the readiness of the organization for effectively utilizing a collaborative innovation system and may include the organizational total score. In generating the assessment the service provider server 240 may compare the organizational scores of the organization with organizational scores of organizations effectively utilizing a collaborative environment. For example, if the organizational scores of the organization are within a threshold, such as ten percent, of the organizational scores of organizations effectively utilizing a collaborative environment, then the service provider server 240 may determine that the organization effectively utilized the collaborative environment. Alternatively or in addition, the service provider server 240 may identify organizational score thresholds which indicate whether an organization is effectively utilizing a collaborative environment. For example, if the organizational scores are percentages, then scores above sixty percent may indicate that the organization is effectively utilizing a collaborative environment. The service provider server 240 may only compare the organizational total score of the organization to other organizations, or may compare each of the individual organizational scores to other organizations.

Alternatively or in addition, if the organizational total score, or any of the other organizational scores, do not meet the thresholds utilized by the service provider server 240, then the assessment may include an indication of the scores that are deficient along with suggestions on how to improve the scores. For example, the service provider server 240 may recommend that the organization implement an incentive program to encourage users to engage in a collaborative environment. At step 1780, the service provider server 240 may transform the assessment and the scores into a graphical report. The graphical report may include the assessment and may display the scores in a graphical form, such as a bar graph. The graphical report may also include the scores of other organizations that were analyzed, which may provide the administrator with a graphical depiction of the effectiveness of the organization as compared to other organizations.

Alternatively or in addition, the service provider server 240 may determine the organizational total score for the organization and may display the organizational total score to an administrator of an organization. In this example, the service provider server 240 may not use thresholds or may not compare the scores of the organization against other organizations.

Figure 18:
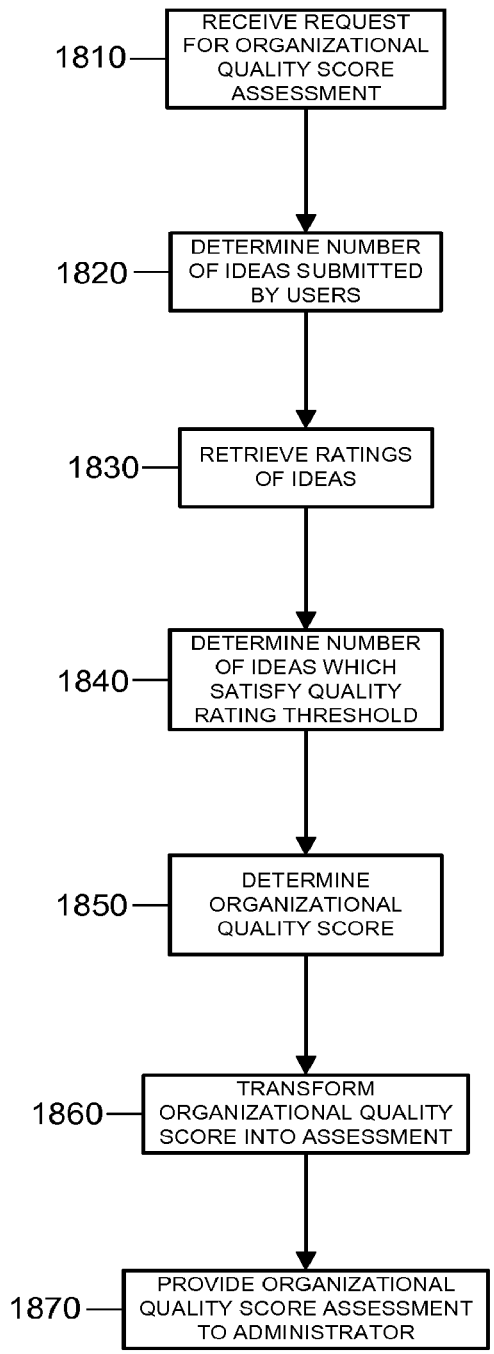
FIG. 18 is a flowchart illustrating the operations of determining an organizational quality score in the system of FIG. 1, or other systems for analyzing user activity in a collaborative environment.

FIG. 18 is a flowchart illustrating the operations of determining an organizational quality score in the system of FIG. 1, or other systems for analyzing user activity in a collaborative environment. The steps of FIG. 18 are described as being performed by the service provider server 240. However, the steps may be performed by the operating system of the service provider server 240, a processor of the service provider server 240, any other hardware component of the server 240, or any combination thereof. Alternatively the steps may be performed by an external hardware component, an external software process, or any combination thereof.

At step 1810, the service provider server 240 may receive a request for an organizational quality score assessment, such as from an administrator. For example, an administrator may click on a link in one of the screens illustrated in FIGS. 3-11 to request an organizational quality score assessment. The organizational quality score assessment may indicate the quality of the ideas generated by the organization in the collaborative environment. At step 1820, the service provider server 240 may determine the number of ideas submitted by the users of the organization in the collaborative environment. At step 1830, the service provider server 240 may retrieve the rating of each idea from the data store 245. At step 1840, the service provider server 240 may determine the number of ideas whose rating satisfies a quality rating threshold. For example, the quality rating threshold may be satisfied by any idea whose rating is greater than fifty. At step 1850, the service provider server 240 may determine the organizational quality score by dividing the number of ideas whose rating satisfied the rating threshold by the total number of ideas submitted. The service provider server 240 may multiply the result by one hundred.

At step 1860, the service provider server 240 may transform the organizational quality score into an assessment. The assessment may include a graphical representation of the organization's quality score and the quality scores of other organizations. At step 1860, the service provider server 240 may provide the organizational quality score and assessment to the administrator, such as via a device of the administrator.

Figure 19:
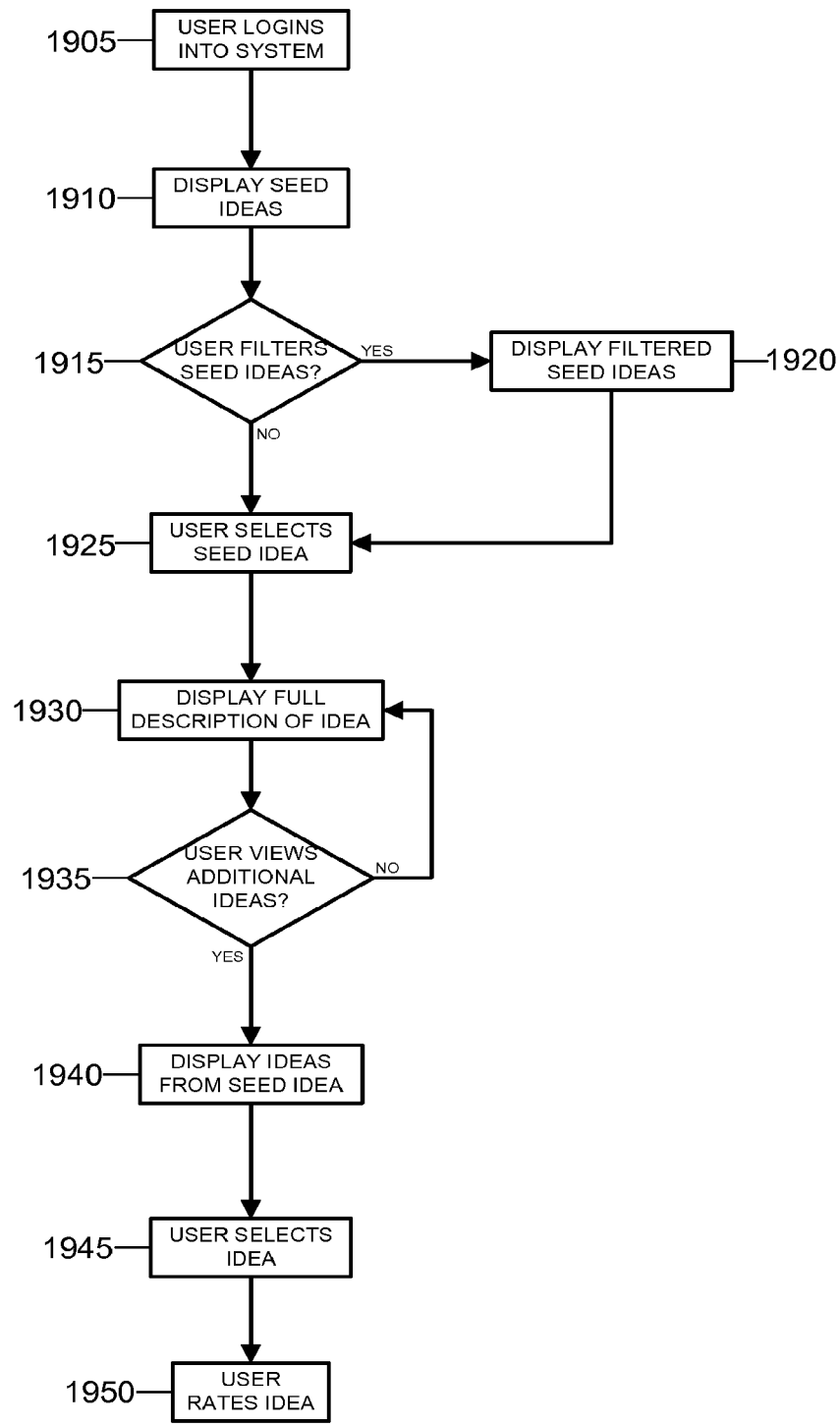
FIG. 19 is a flowchart illustrating the operations of rating an idea in the system of FIG. 1, or other systems for analyzing user activity in a collaborative environment.

FIG. 19 is a flowchart illustrating the operations of rating an idea in the system of FIG. 1, or other systems for analyzing user activity in a collaborative environment. The steps of FIG. 19 are described as being performed by the service provider server 240. However, the steps may be performed by the operating system of the service provider server 240, a processor of the service provider server 240, any other hardware component of the server 240, or any combination thereof. Alternatively the steps may be performed by an external hardware component, an external software process, or any combination thereof.

At step 1905, one of the users 120A-N, such as the user A 120A, may log into the service provider server 240, such as by using the user login interface 300. At step 2010, the service provider server 240 may display the existing initial items to the user A 120A, such as in the initial item selection interface 400. At step 1915, the user A 120A may use the initial item selection interface 400 to filter the one or more displayed initial items. If the user A 120A chooses to filter the initial items then the service provider server 240 moves to step 1920. At step 1920, the service provider server 240 displays the filtered initial items to the user A 120A.

If the user A 120A does not filter the initial items at step 1915, the service provider server 240 moves to step 1925. At step 1925, the user A 120A may use the initial item selection interface 400 to select an initial item. At step 1930, the service provider server 240 may display the full description of the idea selected by the user A 120A, such as through the initial item details screen 500. At step 1935, the user A 120A may view the ideas innovated from the selected initial item. If, at step 1935, the user A 120A does not choose to view the ideas innovated from the selected initial item, the service provider server 240 may return to step 1930. If, at step 1935, the user A 120A chooses to view the ideas innovated from the selected initial item, the service provider server 240 may move to step 1940.

At step 1940, the service provider server 240 may display the ideas innovated from the initial item, such as via the initial item collaborative innovation screen 600. The ideas may be displayed as a tree-like structure in the graphical collaborative display 635. Each idea on the graphical collaborative display may be represented by a node, and each node may be connected via a link to the idea it was innovated from. At step 1945, the user A 120A may select an idea in the graphical collaborative display 635 of the initial item collaborative innovation screen 600. At step 1950, the user A 120A may indicate whether they like or dislike the idea, such as by clicking on the like it button 644 or the don't like it button 646. The service provider server 240 may store whether the user A 120A likes or dislikes the selected idea in the data store 245. The data describing whether the user A 120A likes or dislikes the idea may be used to determine the rating of the idea.

Figure 20:
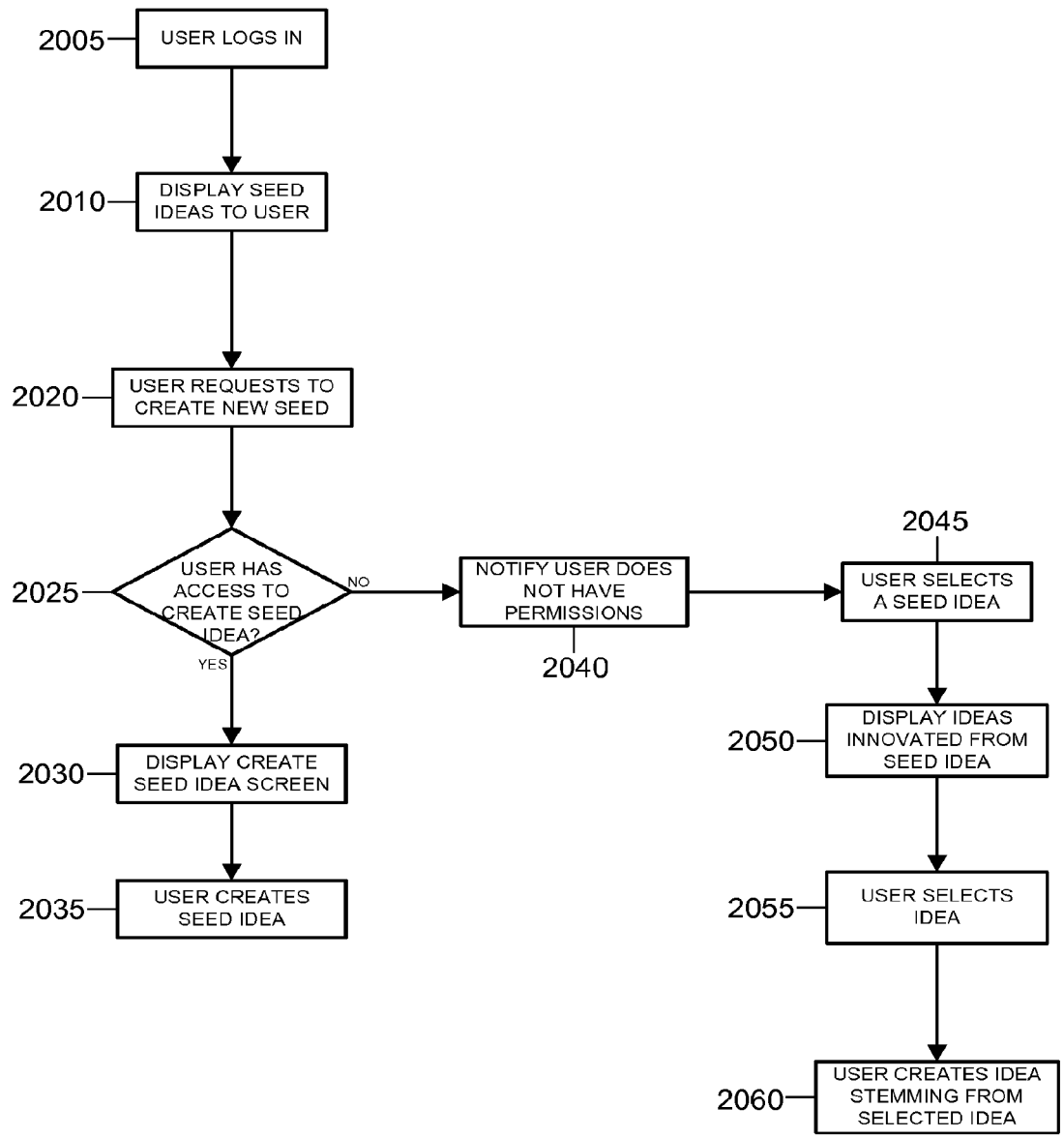
FIG. 20 is a flowchart illustrating the operations of creating an idea in the system of FIG. 1, or other systems for analyzing user activity in a collaborative environment.

FIG. 20 is a flowchart illustrating the operations of creating an idea in the system of FIG. 1, or other systems for analyzing user activity in a collaborative environment. The steps of FIG. 20 are described as being performed by the service provider server 240. However, the steps may be performed by the operating system of the service provider server 240, a processor of the service provider server 240, any other hardware component of the server 240, or any combination thereof. Alternatively the steps may be performed by an external hardware component, an external software process, or any combination thereof.

At step 2005, one of the content providers 110A-N or one of the users 120A-N, such as the user A 120A, may log into the service provider server 240, such as via the user login interface 300. The service provider server 240 may display the existing initial items to the user A 120A, such as via the initial item selection interface 400. At step 2020, the user A 120A may request to create a new initial item, such as via the initial item selection interface 400. At step 2025, the service provider server 240 may determine whether the user A 120A has sufficient permissions to create a new initial item. If the service provider server 240 determines the user A 120A has sufficient permissions to create a new initial item, the service provider server 240 may move to step 2030. At step 2030, the service provider server 240 may display a create initial item interface to the user A 120A. The create initial item interface may allow the user A 120A to create one or more initial items. At step 2035, the user A 120A may use the create new initial item interface to create a new initial item.

If, at step 2025, the service provider server 240 determines that the user A 120A does not have sufficient permissions to create a new initial item, the service provider server 240 may move to step 2040. At step 2040, the service provider server 240 may notify the user A 120A that the user A 120A does not have the necessary permissions to create an initial item. The service provider server 240 may then display the initial item selection interface 400, where the user may create an idea innovated from an existing idea or initial item. At step 2045, the user A 120A may select an initial item, such as from the initial item selection interface 400. At step 2050, the service provider server 240 may display ideas innovated from the selected initial item, such as via the graphical collaborative display 635 of the initial item collaborative innovation screen 600. At step 2055, the user A 120A may select an idea the initial item collaborative innovation screen 600. The selected idea may be the initial item, or any idea innovated from the initial item. At step 2060, the user A 120A may create an idea innovated from the selected idea, such as by entering the idea into the idea enhancement field 648 and clicking the enhance button 652. Alternatively or in addition, an idea innovated from another idea may also be referred to as an enhancement of the initial idea.

Figure 21:
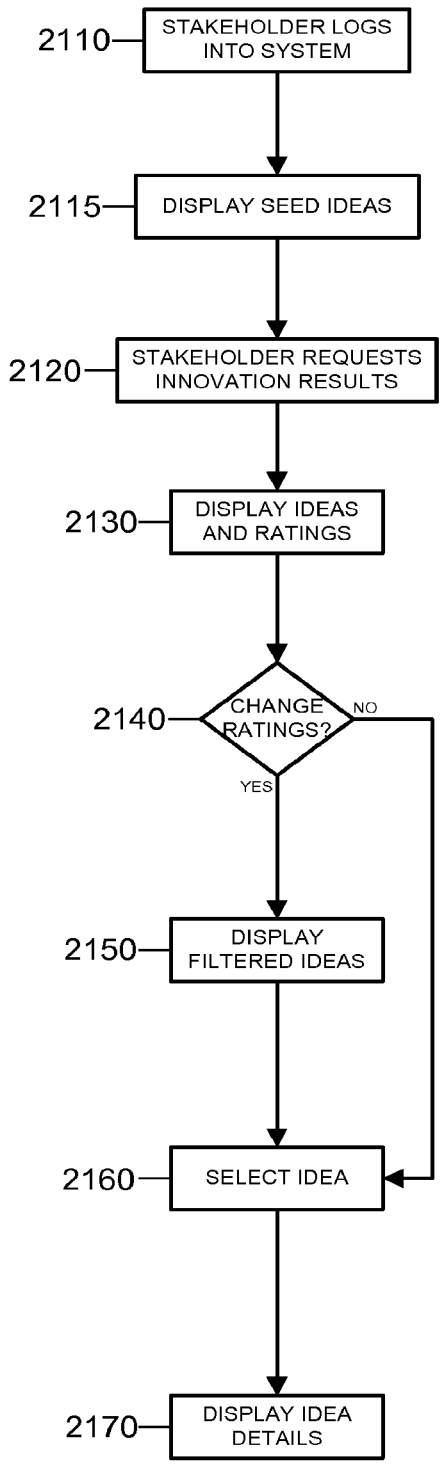
FIG. 21 is a flowchart illustrating the operations of viewing an initial item summary in the system of FIG. 1, or other systems for analyzing user activity in a collaborative environment.

FIG. 21 is a flowchart illustrating the operations of viewing an initial item summary in the system of FIG. 1, or other systems for analyzing user activity in a collaborative environment. The steps of FIG. 21 are described as being performed by the service provider server 240. However, the steps may be performed by the operating system of the service provider server 240, a processor of the service provider server 240, any other hardware component of the server 240, or any combination thereof. Alternatively the steps may be performed by an external hardware component, an external software process, or any combination thereof.

At step 2110 one of the content providers 110A-N, such as the content provider A 110A, may log into the service provider server 240, such as via the user login interface 300. Alternatively or in addition, one of the users 120A-N with proper permissions may log into the service provider server 240. At step 2115, the service provider server 240 may display the initial items to the content provider A 110A, such as via the initial item selection interface 400. At step 2120, the content provider A 110A may select an initial item and request to view the collaborative innovation results associated with the initial item.

At step 2130, the service provider server 240 may display the results of the collaborative innovation process for the selected initial item. The results may be displayed as an ordered list of innovated ideas ordered based on the ratings received from the users 120A-N. Alternatively or in addition the ratings received from the users 120A-N may be used as one factor in an overall ratings calculation for each idea. Additional factors used in the ratings calculation may include the number of ratings the idea received, the number of views the idea received, the number of unique viewers of the idea, or generally any factor that may indicate the value of the idea. At step 2140, the content provider A 11 OA may change the weight applied to each factor incorporated in such a ratings calculation. If, at step 2140, the content provider A 110A selects to change the weight applied to each factor in the ratings calculation, the service provider server 240 may move to step 2150. At step 2150, the service provider server 240 may re-calculate the rating of the ideas displayed in the results list in accordance with the weight for each factor identified by the content provider A 110A. If, at step 2140, the content provider A 110A does not choose to re-weight the factors used in the rating calculation, the service provider server 240 may move to step 2160.

At step 2160, the content provider A 110A may select an idea displayed in the results list. At step 2170, the service provider server 240 may display the details associated with the idea to the content provider A 110A. The details may include a description of the idea, the rating of the idea, the date the idea was created, the creator of the idea, or generally any information that may be of value to the content provider A 110A.

Figure 22:
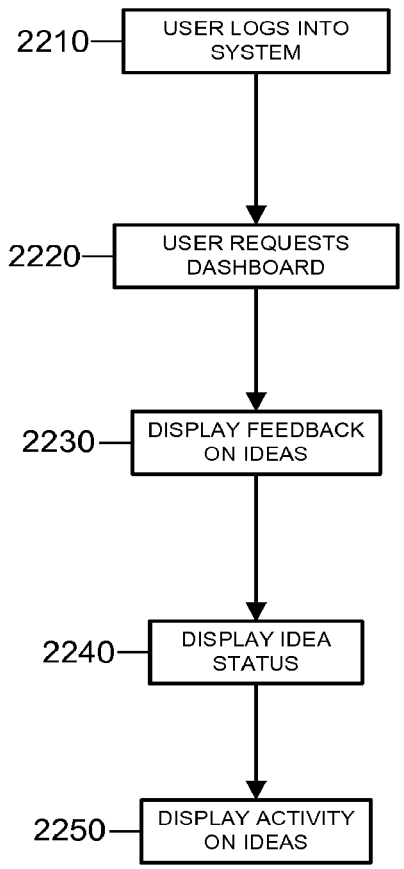
FIG. 22 is a flowchart illustrating the operations of displaying user dashboard information in the system of FIG. 1, or other systems for analyzing user activity in a collaborative environment.

FIG. 22 is a flowchart illustrating the operations of displaying user dashboard information in the system of FIG. 1, or other systems for analyzing user activity in a collaborative environment. The steps of FIG. 22 are described as being performed by the service provider server 240. However, the steps may be performed by the operating system of the service provider server 240, a processor of the service provider server 240, any other hardware component of the server 240, or any combination thereof. Alternatively the steps may be performed by an external hardware component, an external software process, or any combination thereof.

At step 2210, the user A 120A may log into the service provider server 240, such as via the user login interface 300. At step 2220, the user A 120A may request to view the user dashboard screen 800, such as by clicking on the dashboard button 412. At step 2230, the service provider server 240 may display the feedback on ideas given by the user A 120A, such as via the user dashboard screen 800. The feedback on ideas given by the user A 120A may be displayed in one or more graphs, such as the feedback graph 814. At step 2240, the service provider server 240 may display the idea status of the user A 120A, such as the current ideas of the user A 120A and/or the historical ideas of the user A 120A. At step 2250, the service provider server 240 may display the activity on the ideas of the user A 120A. The activity on the ideas of the user A 120A may be displayed as one or more graphs. The activity on the ideas of the user A 120A may include data describing the feedback given by the other users 120B-N on the ideas of the user A 120A. The user A 120A may use the data displayed by the user dashboard screen 800 to manage their interactions with the service provider server 240.

FIG. 23 illustrates a computer system 2300, which may represent a service provider server 240, a third party server 250, the client applications 210A-N, 220A-N, or any of the other computing devices referenced herein. The computer system 2300 may include a set of instructions 2324 that may be executed to cause the computer system 2300 to perform any one or more of the methods or computer based functions disclosed herein. The computer system 2300 may operate as a standalone device or may be connected, e.g., using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 2300 may also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions 2324 (sequential or otherwise) that specify actions to be taken by that machine. In a particular embodiment, the computer system 2300 may be implemented using electronic devices that provide voice, video or data communication. Further, while a single computer system 2300 may be illustrated, the term "system" shall also be taken to include any collection of systems or subsystems that individually or jointly execute a set, or multiple sets, of instructions to perform one or more computer functions.

As illustrated in FIG. 23, the computer system 2300 may include a processor 2302, such as, a central processing unit (CPU), a graphics processing unit (GPU), or both. The processor 2302 may be a component in a variety of systems. For example, the processor 2302 may be part of a standard personal computer or a workstation. The processor 2302 may be one or more processors, digital signal processors, application specific integrated circuits, field programmable gate arrays, servers, networks, digital circuits, analog circuits, combinations thereof, or other now known or later developed devices for analyzing and processing data. The processor 2302 may implement a software program, such as code generated manually (i.e., programmed).

The computer system 2300 may include a memory 2304 that can communicate via a bus 2308. The memory 2304 may be a main memory, a static memory, or a dynamic memory. The memory 2304 may include, but may not be limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one case, the memory 2304 may include a cache or random access memory for the processor 2302. Alternatively or in addition, the memory 2304 may be separate from the processor 2302, such as a cache memory of a processor, the system memory, or other memory. The memory 2304 may be an external storage device or database for storing data. Examples may include a hard drive, compact disc ("CD"), digital video disc ("DVD"), memory card, memory stick, floppy disc, universal serial bus ("USB") memory device, or any other device operative to store data. The memory 2304 may be operable to store instructions 2324 executable by the processor 2302. The functions, acts or tasks illustrated in the figures or described herein may be performed by the programmed processor 2302 executing the instructions 2324 stored in the memory 2304. The functions, acts or tasks may be independent of the particular type of instructions set, storage media, processor or processing strategy and may be performed by software, hardware, integrated circuits, firmware, micro-code and the like, operating alone or in combination. Likewise, processing strategies may include multiprocessing, multitasking, parallel processing and the like.

The computer system 2300 may further include a display 2314, such as a liquid crystal display (LCD), an organic light emitting diode (OLED), a flat panel display, a solid state display, a cathode ray tube (CRT), a projector, a printer or other now known or later developed display device for outputting determined information. The display 2314 may act as an interface for the user to see the functioning of the processor 2302, or specifically as an interface with the software stored in the memory 2304 or in the drive unit 2306.

Additionally, the computer system 2300 may include an input device 2312 configured to allow a user to interact with any of the components of system 2300. The input device 2312 may be a number pad, a keyboard, or a cursor control device, such as a mouse, or a joystick, touch screen display, remote control or any other device operative to interact with the system 2300.

The computer system 2300 may also include a disk or optical drive unit 2306. The disk drive unit 2306 may include a computer-readable medium 2322 in which one or more sets of instructions 2324, e.g. software, can be embedded. Further, the instructions 2324 may perform one or more of the methods or logic as described herein. The instructions 2324 may reside completely, or at least partially, within the memory 2304 and/or within the processor 2302 during execution by the computer system 2300. The memory 2304 and the processor 2302 also may include computer-readable media as discussed above.

The present disclosure contemplates a computer-readable medium 2322 that includes instructions 2324 or receives and executes instructions 2324 responsive to a propagated signal; so that a device connected to a network 235 may communicate voice, video, audio, images or any other data over the network 235. Further, the instructions 2324 may be transmitted or received over the network 235 via a communication interface 2318. The communication interface 2318 may be a part of the processor 2302 or may be a separate component. The communication interface 2318 may be created in software or may be a physical connection in hardware. The communication interface 2318 may be configured to connect with a network 235, external media, the display 2314, or any other components in system 2300, or combinations thereof. The connection with the network 235 may be a physical connection, such as a wired Ethernet connection or may be established wirelessly as discussed below. Likewise, the additional connections with other components of the system 2300 may be physical connections or may be established wirelessly. In the case of a service provider server 240 or the content provider servers 110A-N, the servers may communicate with users 120A-N through the communication interface 2318.

The network 235 may include wired networks, wireless networks, or combinations thereof. The wireless network may be a cellular telephone network, an 802.11, 802.16, 802.20, or WiMax network. Further, the network 235 may be a public network, such as the Internet, a private network, such as an intranet, or combinations thereof, and may utilize a variety of networking protocols now available or later developed including, but not limited to TCP/IP based networking protocols.

The computer-readable medium 2322 may be a single medium, or the computer-readable medium 2322 may be a single medium or multiple media, such as a centralized or distributed database, and/or associated caches and servers that store one or more sets of instructions. The term "computer-readable medium" may also include any medium that may be capable of storing, encoding or carrying a set of instructions for execution by a processor or that may cause a computer system to perform any one or more of the methods or operations disclosed herein.

The computer-readable medium 2322 may include a solid-state memory such as a memory card or other package that houses one or more non-volatile read-only memories. The computer-readable medium 2322 also may be a random access memory or other volatile re-writable memory. Additionally, the computer-readable medium 2322 may include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that may be a tangible storage medium. Accordingly, the disclosure may be considered to include any one or more of a computer-readable medium or a distribution medium and other equivalents and successor media, in which data or instructions may be stored.

Alternatively or in addition, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system may encompass software, firmware, and hardware implementations.

The methods described herein may be implemented by software programs executable by a computer system. Further, implementations may include distributed processing, component/object distributed processing, and parallel processing. Alternatively or in addition, virtual computer system processing maybe constructed to implement one or more of the methods or functionality as described herein.

Although components and functions are described that may be implemented in particular embodiments with reference to particular standards and protocols, the components and functions are not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations described herein are intended to provide a general understanding of the structure of various embodiments. The illustrations are not intended to serve as a complete description of all of the elements and features of apparatus, processors, and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

The above disclosed subject matter is to be considered illustrative, and not restrictive, and the appended claims are intended to cover all such modifications, enhancements, and other embodiments, which fall within the true spirit and scope of the description. Thus, to the maximum extent allowed by law, the scope is to be determined by the broadest permissible interpretation of the following claims and their equivalents, and shall not be restricted or limited by the foregoing detailed description.

We claim:

1. A computer-implemented method for analyzing the effectiveness of an organization in a collaborative environment, the method comprising:

receiving, by a processor from a device of a user, a request to analyze an organization's effectiveness in utilization of a collaborative environment;

retrieving, by the processor from a data store, for users of the organization, a number of users invited to participate in the collaborative environment, a number of users who entered into the collaborative environment, a number of users who read at least one item in the collaborative environment, a number of users who rated at least one idea in the collaborative environment, and a number of users who contributed at least one idea to the collaborative environment;

determining, by the processor, an organizational responsiveness score that represents the responsiveness of the users in the organization to an invitation to participate in the collaborative environment;

determining, by the processor, an organizational willingness score that represents the willingness of the users in the organization to participate in the collaborative environment;

determining, by the processor, an organizational criticality score that represents whether the users of the organization are critical of ideas provided by other users;

determining, by the processor, an organizational creativity score that represents the creativeness of the users in the organization;

determining, by the processor, an organizational total score based on the organizational responsiveness score, the organizational willingness score, the organizational criticality score, and the organizational creativity score; and providing, by the processor, the organizational total score to the user via the device of the user.

2. The computer implemented method of claim 1 further comprising:
    determining the organizational responsiveness score based on dividing the number of users who entered into the collaborative environment by the number of users invited to participate in the collaborative environment;
    determining the organizational willingness score based on dividing the number of users who read at least one item by the number of users who entered into the collaborative environment;
    determining the organizational criticality score based on dividing the number of users who rated at least one idea in the collaborative environment by the number of users who read at least one item in the collaborative environment;
    determining the organizational creativity score based on dividing the number of users who contributed at least one idea to the collaborative environment by the number of users who entered into the collaborative environment.

3. The computer implemented method of claim 1 further comprising:
    transforming, by the processor, the organizational scores into an assessment, wherein the assessment indicates that the organization is effective in the collaborative environment if the organizational scores satisfy an effectiveness threshold, otherwise the assessment indicates that the organization is not effective in the collaborative environment; and
    providing, by the processor, the assessment to the user via the device of the user.

4. The computer-implemented method of claim 1 further comprising generating an assessment based on the organizational scores, wherein the assessment further includes at least one suggestion indicating how the organization can improve the scores.

5. The computer-implemented method of claim 4, wherein the suggestion comprises a description of an incentive program to encourage users to engage in the collaborative environment.

6. The computer-implemented method of claim 1 further comprising generating an assessment based on the organizational scores by comparing the organizational scores of the organization with organizational scores of other organizations that are effectively utilizing a collaborative environment.

7. The computer-implemented method of claim 6, wherein the organizational total score of the organization is compared to the other organizations or each of the individual organizational scores are compared to the other organizations.

8. The computer-implemented of claim 1 further comprising, transforming the organizational scores into a graphical report which displays:
    the organizational scores in a graphical form, or
    the organizational scores in a graphical form and scores of other organizations to provide a graphical depiction of the effectiveness of the organization as compared to the other organizations.

9. A system for analyzing the effectiveness of an organization in a collaborative environment, the system comprising:
    one or more processors or circuits, wherein said one or more processors or circuits are operable to:
        receive from a device of a user, a request to analyze an organization's effectiveness in utilization of a collaborative environment;
        retrieve from a data store, for users of the organization, a number of users invited to participate in the collaborative environment, a number of users who entered into the collaborative environment, a number of users who read at least one item in the collaborative environment, a number of users who rated at least one idea in the collaborative environment, and a number of users who contributed at least one idea to the collaborative environment;
        determine an organizational responsiveness score that represents the responsiveness of the users in the organization to an invitation to participate in the collaborative environment;
        determine an organizational willingness score that indicates the willingness of the users in the organization to participate in the collaborative environment;
        determine an organizational criticality score that represents whether the users of the organization are critical of ideas provided by other users;
        determine an organizational creativity score that represents the creativeness of the users in the organization;
        determine an organizational total score based on the organizational responsiveness score, the organizational willingness score, the organizational criticality score, and the organizational creativity score; and
        provide the organizational total score to the user via the device of the user.

10. The system of claim 9 wherein the one or more processors or circuits are further operable to:
    determine the organizational responsiveness score based on dividing the number of users who entered into the collaborative environment by the number of users invited to participate in the collaborative environment;
    determine the organizational willingness score based on dividing the number of users who read at least one item by the number of users who entered into the collaborative environment;
    determine the organizational criticality score based on dividing the number of users who rated at least one idea in the collaborative environment by the number of users who read at least one item in the collaborative environment;
    determine the organizational creativity score based on dividing the number of users who contributed at least one idea to the collaborative environment by the number of users who entered into the collaborative environment.

11. The system of claim 9 wherein the one or more processors or circuits are further operable to:
    transform the organizational scores into an assessment, wherein the assessment indicates that the organization is effective in the collaborative environment if the organizational scores satisfy an effectiveness threshold, otherwise the assessment indicates that the organization is not effective in the collaborative environment; and
    provide the assessment to the user via the device of the user.

12. The system of claim 9, wherein the one or more processors or circuits are further operable to generate an assessment based on the organizational scores, wherein the assessment further includes at least one suggestion indicating how the organization can improve the scores.

13. The system of claim 12, wherein the suggestion comprises a description of an incentive program to encourage users to engage in the collaborative environment.

14. The system of claim 9 wherein the one or more processors or circuits are further operable to generate an assessment based on the organizational scores by comparing the organizational scores of the organization with organizational scores of other organizations that are effectively utilizing a collaborative environment.

15. The system of claim 14, wherein the organizational total score of the organization is compared to the other organizations or each of the individual organizational scores are compared to the other organizations.

16. The system of claim 9 wherein the one or more processors or circuits are further operable to transform the organizational scores into a graphical report which displays:
the organizational scores in a graphical form, or
the organizational scores in a graphical form and scores of other organizations to provide a graphical depiction of the effectiveness of the organization as compared to the other organizations.

17. A non-transitory computer readable medium for analyzing the effectiveness of an organization in a collaborative environment, the non-transitory computer readable medium comprising instructions for:
receiving, by a processor from a device of a user, a request to analyze an organization's effectiveness in utilization of a collaborative environment;
retrieving, by the processor from a data store, for users of the organization, a number of users invited to participate in the collaborative environment, a number of users who entered into the collaborative environment, a number of users who read at least one item in the collaborative environment, a number of users who rated at least one idea in the collaborative environment, and a number of users who contributed at least one idea to the collaborative environment;
determining, by the processor, an organizational responsiveness score that represents the responsiveness of the users in the organization to an invitation to participate in the collaborative environment;
determining, by the processor, an organizational willingness score that indicates the willingness of the users in the organization to participate in the collaborative environment;
determining, by the processor, an organizational criticality score that represents whether the users of the organization are critical of ideas provided by other users;
determining, by the processor, an organizational creativity score that represents the creativeness of the users in the organization;
determining, by the processor, an organizational total score based on the organizational responsiveness score, the organizational willingness score, the organizational criticality score, and the organizational creativity score; and
providing, by the processor, the organizational total score to the user via the device of the user.

18. The non-transitory computer readable medium of claim 17 further comprising:
determining the organizational responsiveness score based on dividing the number of users who entered into the collaborative environment by the number of users invited to participate in the collaborative environment;
determining the organizational willingness score based on dividing the number of users who read at least one item by the number of users who entered into the collaborative environment;
determining the organizational criticality score based on dividing the number of users who rated at least one idea in the collaborative environment by the number of users who read at least one item in the collaborative environment;
determining the organizational creativity score based on dividing the number of users who contributed at least one idea to the collaborative environment by the number of users who entered into the collaborative environment.

19. The non-transitory computer readable medium of claim 17 further comprising:
transforming, by the processor, the organizational scores into an assessment, wherein the assessment indicates that the organization is effective in the collaborative environment if the organizational scores satisfy an effectiveness threshold, otherwise the assessment indicates that the organization is not effective in the collaborative environment; and
providing, by the processor, the assessment to the user via the device of the user.

20. The non-transitory computer readable medium of claim 17 further comprising generating an assessment based on the organizational scores, wherein the assessment further includes at least one suggestion indicating how the organization can improve the scores.

21. The non-transitory computer readable medium of claim 20, wherein the suggestion comprises a description of an incentive program to encourage users to engage in the collaborative environment.

22. The non-transitory computer readable medium of claim 17 further comprising generating an assessment based on the organizational scores by comparing the organizational scores of the organization with organizational scores of other organizations that are effectively utilizing a collaborative environment.

23. The non-transitory computer readable medium of claim 22, wherein the organizational total score of the organization is compared to the other organizations or each of the individual organizational scores are compared to the other organizations.

24. The non-transitory computer readable medium of claim 17 further comprising, transforming the organizational scores into a graphical report which displays:
the organizational scores in a graphical form, or
the organizational scores in a graphical form and scores of other organizations to provide a graphical depiction of the effectiveness of the organization as compared to the other organizations.

* * * * *

UNITED STATES PATENT AND TRADEMARK OFFICE
CERTIFICATE OF CORRECTION

PATENT NO. : 8,930,520 B2  
APPLICATION NO. : 14/136821  
DATED : January 6, 2015  
INVENTOR(S) : Bechtel et al.

Page 1 of 1

It is certified that error appears in the above-identified patent and that said Letters Patent is hereby corrected as shown below:

In the Specification

Column 4, line 4, after "user activity in" replace "realtime" with --real-time--.

Column 9, line 12, after "connection, an" replace "interne" with --internet--.

Column 20, line 55, after "designed using" replace "ADOBE" with --ADOBE®--.

Column 21, line 61, before "FLEX ACCORDION." replace "ADOBE" with --ADOBE®--.

Signed and Sealed this
Thirteenth Day of October, 2015

Michelle K. Lee
*Director of the United States Patent and Trademark Office*